United States Patent
Trivedi et al.

(10) Patent No.: US 12,499,394 B2
(45) Date of Patent: Dec. 16, 2025

(54) FOUNDATION APPLICATIONS AS AN ACCELERATOR PROVIDING WELL DEFINED EXTENSIBILITY AND COLLECTION OF SEEDED TEMPLATES FOR ENHANCED USER EXPERIENCE AND QUICKER TURNAROUND

(71) Applicant: Honeywell International Inc., Charlotte, NC (US)

(72) Inventors: Ishit Trivedi, Bangalore (IN); Sanjaykumar Sharanappa Patil, Pleasanton, CA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 7 days.

(21) Appl. No.: 17/662,131

(22) Filed: May 5, 2022

(65) Prior Publication Data
US 2022/0358434 A1    Nov. 10, 2022

Related U.S. Application Data

(60) Provisional application No. 63/185,074, filed on May 6, 2021.

(51) Int. Cl.
*G06Q 10/0631* (2023.01)
*G06Q 10/0639* (2023.01)

(52) U.S. Cl.
CPC . *G06Q 10/06313* (2013.01); *G06Q 10/06393* (2013.01)

(58) Field of Classification Search
CPC ................... G06Q 10/06313; G06Q 10/06393
See application file for complete search history.

(56) References Cited

U.S. PATENT DOCUMENTS

| | | | | | |
|---|---|---|---|---|---|
| 8,032,409 | B1 * | 10/2011 | Mikurak | ................ | G06Q 30/00 705/14.39 |
| 8,374,894 | B2 * | 2/2013 | Weinstock | ............ | G06Q 10/02 705/5 |
| 10,354,207 | B2 * | 7/2019 | Mijares | ................... | E21B 43/00 |
| 10,600,012 | B2 * | 3/2020 | Peterson | ............ | G06Q 10/0635 |

(Continued)

FOREIGN PATENT DOCUMENTS

CN    114648202 A  *  6/2022  ......... G06F 3/04815

OTHER PUBLICATIONS

Ehrenfellner, "User Interface Development and Data Visualization for Building Monitoring Systems" (2012) (https://www.researchgate.net/publication/231178325_User_Interface_Development_and_Data_Visualization_for_Building_Monitoring_Systems) (Year: 2012).*

*Primary Examiner* — Sujay Koneru
(74) *Attorney, Agent, or Firm* — ALSTON & BIRD LLP

(57) ABSTRACT

Various embodiments described herein relate to foundation applications comprising a framework which can be extended to provide a domain-specific application. In this regard, a foundation application comprising a plurality of predefined core services is generated. An extension request is received that comprises an addition or modification to data associated with a selected template. In response to the extension request, output data is determined based on the addition or the modification to the data associated with the selected template. A visualization comprising an indication of the output data is provided at an electronic interface of the foundation application.

19 Claims, 43 Drawing Sheets

(56) References Cited

U.S. PATENT DOCUMENTS

| | | | | |
|---|---|---|---|---|
| 2003/0014442 | A1* | 1/2003 | Shiigi | G06F 8/20 715/255 |
| 2005/0165909 | A1* | 7/2005 | Cromer | H04W 8/18 709/219 |
| 2007/0233541 | A1* | 10/2007 | Schorr | G06Q 10/06 705/7.17 |
| 2008/0320476 | A1* | 12/2008 | Wingard | G06F 15/17375 718/101 |
| 2011/0044291 | A1* | 2/2011 | Omar | H04W 60/04 370/332 |
| 2012/0066019 | A1* | 3/2012 | Hinshaw | G06Q 10/06 705/7.23 |
| 2014/0316837 | A1* | 10/2014 | Fosburgh | G06Q 10/06312 705/7.22 |
| 2014/0337863 | A1* | 11/2014 | Rusu | G06Q 10/06 719/318 |
| 2015/0142498 | A1* | 5/2015 | Remacle | G06Q 10/06313 705/7.23 |
| 2015/0286969 | A1* | 10/2015 | Warner | G06Q 10/0633 705/7.27 |
| 2016/0131388 | A1* | 5/2016 | Eiynk | G05B 15/02 707/728 |
| 2016/0371616 | A1* | 12/2016 | Nicholas | G01D 3/08 |
| 2017/0125073 | A1* | 5/2017 | Palmer | G11C 19/00 |
| 2017/0214541 | A1* | 7/2017 | Brun | G06F 8/34 |
| 2019/0102465 | A1* | 4/2019 | Yang | G06F 16/9537 |
| 2019/0102753 | A1* | 4/2019 | Harrison | H04L 67/125 |
| 2019/0121336 | A1* | 4/2019 | Xin | F03D 80/50 |
| 2021/0034581 | A1* | 2/2021 | Boven | G06N 3/08 |
| 2022/0309079 | A1* | 9/2022 | Kurniawan | H04L 12/12 |

* cited by examiner

FOUNDATION APPLICATIONS AS AN ACCELERATOR PROVIDING WELL DEFINED EXTENSIBILITY AND COLLECTION OF SEEDED TEMPLATES FOR ENHANCED USER EXPERIENCE AND QUICKER TURNAROUND

CROSS-REFERENCE TO RELATED APPLICATIONS

This application is a continuation of and claims priority to U.S. Provisional Application No. 63/185,074, filed May 6, 2021, and titled "Foundation Applications As An Accelerator Providing Well Defined Extensibility And Collection Of Seeded Templates For Enhanced User Experience And Quicker Turnaround," the contents of which are incorporated herein by reference in their entirety.

TECHNICAL FIELD

The present disclosure relates generally to real-time asset and process management, and more particularly to extensible foundation applications providing real-time asset and process management.

BACKGROUND

Various industries include a large amount of assets, such as interconnected devices and/or equipment at one or multiple locations, such as industrial plants, warehouses, and/or buildings. Such industries may monitor and gauge efficiency of their respective assets and/or confirm that the assets are functioning properly by utilizing software, along with a digital representation of their respective assets, for performing data analytics and/or other processes related to the assets.

However, industries may each have specific needs and requirements for managing assets and processes related to operations, energy, sustainability, worker productivity, and/or other processes. In this regard, building unique software solutions for many industries to address general requirements as well as these unique circumstances is time consuming and inefficient, leading to an increase in development cycle time, and resulting in issues, such as faults, failures, or inefficiencies of assets going undetected while the solution is under development.

BRIEF SUMMARY

In accordance with some embodiments, a method is performed. The method includes generating a foundation application comprising a plurality of predefined core services, the predefined core services managing a plurality of assets and the predefined core services comprising one or more templates associated with at least one asset of the plurality of assets. The method also includes receiving an extension request, the extension request comprising an addition or modification to data associated with a selected template of the one or more templates. The method also includes, in response to the extension request, determining output data based on the addition or the modification to the data associated with the selected template. The method also includes providing a visualization at an electronic interface of the foundation application, the visualization comprising an indication of the output data.

In some embodiments of the method, the visualization comprises a plurality of widgets, each widget being associated with one or more predefined core services of the plurality of the predefined core services.

In some embodiments of the method, one or more widgets of the plurality of widgets comprises an indication of real-time data associated with one or more assets.

In some embodiments of the method, at least one widget of the plurality of widgets is selectable.

In some embodiments of the method, the providing of the visualization comprises providing a first view associated with the plurality of assets, and in response to a selection of the at least one widget, providing a second view comprising performance data associated with a subset of the plurality assets associated with an asset site.

In some embodiments of the method, the performance data comprises one or more key performance indicators associated with the asset site.

In some embodiments of the method, the determining of the output data further comprises generating a workflow for the foundation application based on the extension request. In some embodiments of the method, the determining of the output data further comprises determining whether criteria associated with the workflow meets a predefined condition. In some embodiments of the method, the determining of the output data further comprises, in an instance in which the criteria meets the predefined condition, causing actuation of one or more assets of the plurality of assets or a data transformation associated with one or more assets of the plurality of assets, based on the workflow.

In some embodiments of the method, the extension request comprises an indication of an onboarding of an asset, and the determining of the output data comprises, in response to the extension request, identifying real-time data associated with the asset. In some embodiments of the method, the determining of the output data further comprises providing an indication of the real-time data at the electronic interface of the foundation application.

In some embodiments of the method, the determining of the output data comprises generating at least one asset template for the asset, the at least one asset template defining one or more properties and one or more point roles for the asset.

In some embodiments of the method, the determining of the output data further comprises generating, based on the extension request, at least one rule associated with one or more assets of the plurality of assets for the foundation application.

In some embodiments of the method, the extension request defines parameters of the at least one rule, the parameters being based on inputs received at the electronic interface of the foundation application.

In some embodiments of the method, the determining of the output data comprises determining whether a condition associated with the at least one rule is met based on real-time data associated with the one or more assets. In some embodiments of the method, the determining of the output data comprises, in an instance in which the condition associated with the at least one rule is determined to be met, executing at least one predefined action associated with the at least one rule.

In some embodiments of the method, the executing of the at least one predefined action comprises causing transmission of a notification indicative of the condition of the at least one rule being met.

In some embodiments of the method, the executing of the at least one predefined action comprises causing actuation of one or more assets of the plurality of assets.

In some embodiments of the method, the determining of the output data comprises generating, based on the extension request, at least one alert associated with one or more assets of the plurality of assets for the foundation application, the at least one alert defining at least one data trend.

In some embodiments of the method, the determining of the output data further comprises accessing real-time data associated with the one or more assets of the plurality of assets. In some embodiments of the method, the determining of the output data further comprises identifying an instance of the data trend based on the real-time data. In some embodiments of the method, the determining of the output data further comprises causing transmission of a notification indicative of the data trend.

In some embodiments of the method, the determining of the output data further comprises applying a transformation on the data associated with the selected template based on the extension request, the visualization comprising an indication of a result of the transformation.

In some embodiments of the method, the extension request is received in response to an input to the electronic interface of the foundation application. In some embodiments of the method, the predefined core services further manage one or more processes of a domain associated with the foundation application.

In accordance with some embodiments, a system is provided. The system includes a processor and a memory that stores executable instructions that, when executed by the processor, cause the processor to generate a foundation application comprising a plurality of predefined core services, the predefined core services managing a plurality of assets and the predefined core services comprising one or more templates associated with at least one asset of the plurality of assets. The executable instructions, when executed by the processor, also cause the processor to receive an extension request, the extension request comprising an addition or modification to data associated with a selected template of the one or more templates. The executable instructions, when executed by the processor, also cause the processor to, in response to the extension request, determine output data based on the addition or the modification to the data associated with the selected template. The executable instructions, when executed by the processor, also cause the processor to provide a visualization at an electronic interface of the foundation application, the visualization comprising an indication of the output data.

In some embodiments of the system, the visualization comprises a plurality of widgets, each widget being associated with one or more predefined core services of the plurality of the predefined core services.

In some embodiments of the system, one or more widgets of the plurality of widgets comprises an indication of real-time data associated with one or more assets.

In some embodiments of the system, at least one widget of the plurality of widgets is selectable.

In some embodiments of the system, the executable instructions that cause the processor to provide the visualization also cause the processor to provide a first view associated with the plurality of assets, and in response to a selection of the at least one widget, provide a second view comprising performance data associated with a subset of the plurality assets associated with an asset site.

In some embodiments of the system, the performance data comprises one or more key performance indicators associated with the asset site.

In some embodiments of the system, the executable instructions that cause the processor to determine the output data further cause the processor to generate a workflow for the foundation application based on the extension request. In some embodiments of the system, the executable instructions that cause the processor to determine the output data further cause the processor to determine whether criteria associated with the workflow meets a predefined condition. In some embodiments of the system, the executable instructions that cause the processor to determine the output data further cause the processor to, in an instance in which the criteria meets the predefined condition, cause actuation of one or more assets of the plurality of assets or a data transformation associated with one or more assets of the plurality of assets, based on the workflow.

In some embodiments of the system, the extension request comprises an indication of an onboarding of an asset, and the executable instructions that cause the processor to determine the output data also cause the processor to, in response to the extension request, identify real-time data associated with the asset. In some embodiments of the system, the executable instructions that cause the processor to determine the output data further cause the processor to provide an indication of the real-time data at the electronic interface of the foundation application.

In some embodiments of the system, the executable instructions that cause the processor to determine the output data further cause the processor to generate at least one asset template for the asset, the at least one asset template defining one or more properties and one or more point roles for the asset.

In some embodiments of the system, the executable instructions that cause the processor to determine the output data further cause the processor to generate, based on the extension request, at least one rule associated with one or more assets of the plurality of assets for the foundation application.

In some embodiments of the system, the extension request defines parameters of the at least one rule, the parameters being based on inputs received at the electronic interface of the foundation application.

In some embodiments of the system, the executable instructions that cause the processor to determine the output data further cause the processor to determine whether a condition associated with the at least one rule is met based on real-time data associated with the one or more assets. In some embodiments of the system, the executable instructions that cause the processor to determine the output data further cause the processor to, in an instance in which the condition associated with the at least one rule is determined to be met, execute at least one predefined action associated with the at least one rule.

In some embodiments of the system, the executable instructions that cause the processor to execute the at least one predefined action further cause the processor to cause transmission of a notification indicative of the condition of the at least one rule being met.

In some embodiments of the system, the executable instructions that cause the processor to execute the at least one predefined action further cause the processor to cause actuation of one or more assets of the plurality of assets.

In some embodiments of the system, the executable instructions that cause the processor to determine the output data further cause the processor to generate, based on the extension request, at least one alert associated with one or more assets of the plurality of assets for the foundation application, the at least one alert defining at least one data trend.

In some embodiments of the system, the executable instructions that cause the processor to determine the output data further cause the processor to access real-time data associated with the one or more assets of the plurality of assets. In some embodiments of the system, the executable instructions that cause the processor to determine the output data further cause the processor to identify an instance of the data trend based on the real-time data. In some embodiments of the system, the executable instructions that cause the processor to determine the output data further cause the processor to cause transmission of a notification indicative of the data trend.

In some embodiments of the system, the executable instructions that cause the processor to determine the output data further cause the processor to apply a transformation on the data associated with the selected template based on the extension request, the visualization comprising an indication of a result of the transformation.

In some embodiments of the system, the extension request is received in response to an input to the electronic interface of the foundation application. In some embodiments of the system, the predefined core services further manage one or more processes of a domain associated with the foundation application.

In accordance with some embodiments, a non-transitory computer-readable storage medium is provided. The non-transitory computer-readable storage medium includes one or more programs for execution by one or more processors of a first device. The one or more programs include instructions which, when executed by the one or more processors, cause the device to generate a foundation application comprising a plurality of predefined core services, the predefined core services managing a plurality of assets and the predefined core services comprising one or more templates associated with at least one asset of the plurality of assets. The one or more programs also include instructions which, when executed by the one or more processors, cause the device to receive an extension request, the extension request comprising an addition or modification to data associated with a selected template of the one or more templates. The one or more programs also include instructions which, when executed by the one or more processors, cause the device to, in response to the extension request, determine output data based on the addition or the modification to the data associated with the selected template. The one or more programs also include instructions which, when executed by the one or more processors, cause the device to provide a visualization at an electronic interface of the foundation application, the visualization comprising an indication of the output data.

In some embodiments of the non-transitory computer-readable storage medium, the visualization comprises a plurality of widgets, each widget being associated with one or more predefined core services of the plurality of the predefined core services.

In some embodiments of the non-transitory computer-readable storage medium, one or more widgets of the plurality of widgets comprises an indication of real-time data associated with one or more assets.

In some embodiments of the non-transitory computer-readable storage medium, at least one widget of the plurality of widgets is selectable.

In some embodiments of the non-transitory computer-readable storage medium, the executable instructions that cause the processor to the instructions which, when executed by the one or more processors, cause the device to provide the visualization further cause the device to also cause the processor to provide a first view associated with the plurality of assets, and in response to a selection of the at least one widget, provide a second view comprising performance data associated with a subset of the plurality assets associated with an asset site.

In some embodiments of the non-transitory computer-readable storage medium, the performance data comprises one or more key performance indicators associated with the asset site.

In some embodiments of the non-transitory computer-readable storage medium, the instructions which, when executed by the one or more processors, cause the device to determine the output data further cause the device to generate a workflow for the foundation application based on the extension request. In some embodiments of the non-transitory computer-readable storage medium, the instructions which, when executed by the one or more processors, cause the device to determine the output data further cause the device to determine whether criteria associated with the workflow meets a predefined condition. In some embodiments of the non-transitory computer-readable storage medium, the instructions which, when executed by the one or more processors, cause the device to determine the output data further cause the device to, in an instance in which the criteria meets the predefined condition, cause actuation of one or more assets of the plurality of assets or a data transformation associated with one or more assets of the plurality of assets, based on the workflow.

In some embodiments of the non-transitory computer-readable storage medium, the extension request comprises an indication of an onboarding of an asset, and the instructions which, when executed by the one or more processors, cause the device to determine the output data further cause the device to, in response to the extension request, identify real-time data associated with the asset. In some embodiments of the non-transitory computer-readable storage medium, the extension request comprises an indication of an onboarding of an asset, and the instructions which, when executed by the one or more processors, cause the device to provide an indication of the real-time data at the electronic interface of the foundation application.

In some embodiments of the system, the executable instructions that cause the processor to determine the output data further cause the processor to generate at least one asset template for the asset, the at least one asset template defining one or more properties and one or more point roles for the asset.

In some embodiments of the non-transitory computer-readable storage medium, the instructions which, when executed by the one or more processors, cause the device to determine the output data further cause the device to determine the output data further cause the processor to generate, based on the extension request, at least one rule associated with one or more assets of the plurality of assets for the foundation application.

In some embodiments of the non-transitory computer-readable storage medium, the extension request defines parameters of the at least one rule, the parameters being based on inputs received at the electronic interface of the foundation application.

In some embodiments of the non-transitory computer-readable storage medium, the instructions which, when executed by the one or more processors, cause the device to determine the output data further cause the device to determine whether a condition associated with the at least one rule is met based on real-time data associated with the one or more assets. In some embodiments of the non-transitory computer-readable storage medium, the instructions which, when executed by the one or more processors, cause the device to determine the output data further cause the device to, in an instance in which the condition associated with the at least one rule is determined to be met, execute at least one predefined action associated with the at least one rule.

In some embodiments of the non-transitory computer-readable storage medium, the instructions which, when executed by the one or more processors, cause the device to execute the at least one predefined action further cause the device to cause transmission of a notification indicative of the condition of the at least one rule being met.

In some embodiments of the non-transitory computer-readable storage medium, the instructions which, when executed by the one or more processors, cause the device to execute the at least one predefined action further cause the device to cause actuation of one or more assets of the plurality of assets.

In some embodiments of the non-transitory computer-readable storage medium, non-transitory computer-readable storage medium, the instructions which, when executed by the one or more processors, cause the device to determine the output data further cause the device to generate, based on the extension request, at least one alert associated with one or more assets of the plurality of assets for the foundation application, the at least one alert defining at least one data trend.

In some embodiments of the non-transitory computer-readable storage medium, the instructions which, when executed by the one or more processors, cause the device to determine the output data further cause the device to access real-time data associated with the one or more assets of the plurality of assets. In some embodiments of the non-transitory computer-readable storage medium, the instructions which, when executed by the one or more processors, cause the device to determine the output data further cause the device to identify an instance of the data trend based on the real-time data. In some embodiments of the non-transitory computer-readable storage medium, the instructions which, when executed by the one or more processors, cause the device to determine the output data further cause the device to cause transmission of a notification indicative of the data trend.

In some embodiments of the non-transitory computer-readable storage medium, the instructions which, when executed by the one or more processors, cause the device to determine the output data further cause the device to apply a transformation on the data associated with the selected template based on the extension request, the visualization comprising an indication of a result of the transformation.

In some embodiments of the non-transitory computer-readable storage medium, the extension request is received in response to an input to the electronic interface of the foundation application. In some embodiments of the non-transitory computer-readable storage medium, the predefined core services further manage one or more processes of a domain associated with the foundation application.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Figure 1:
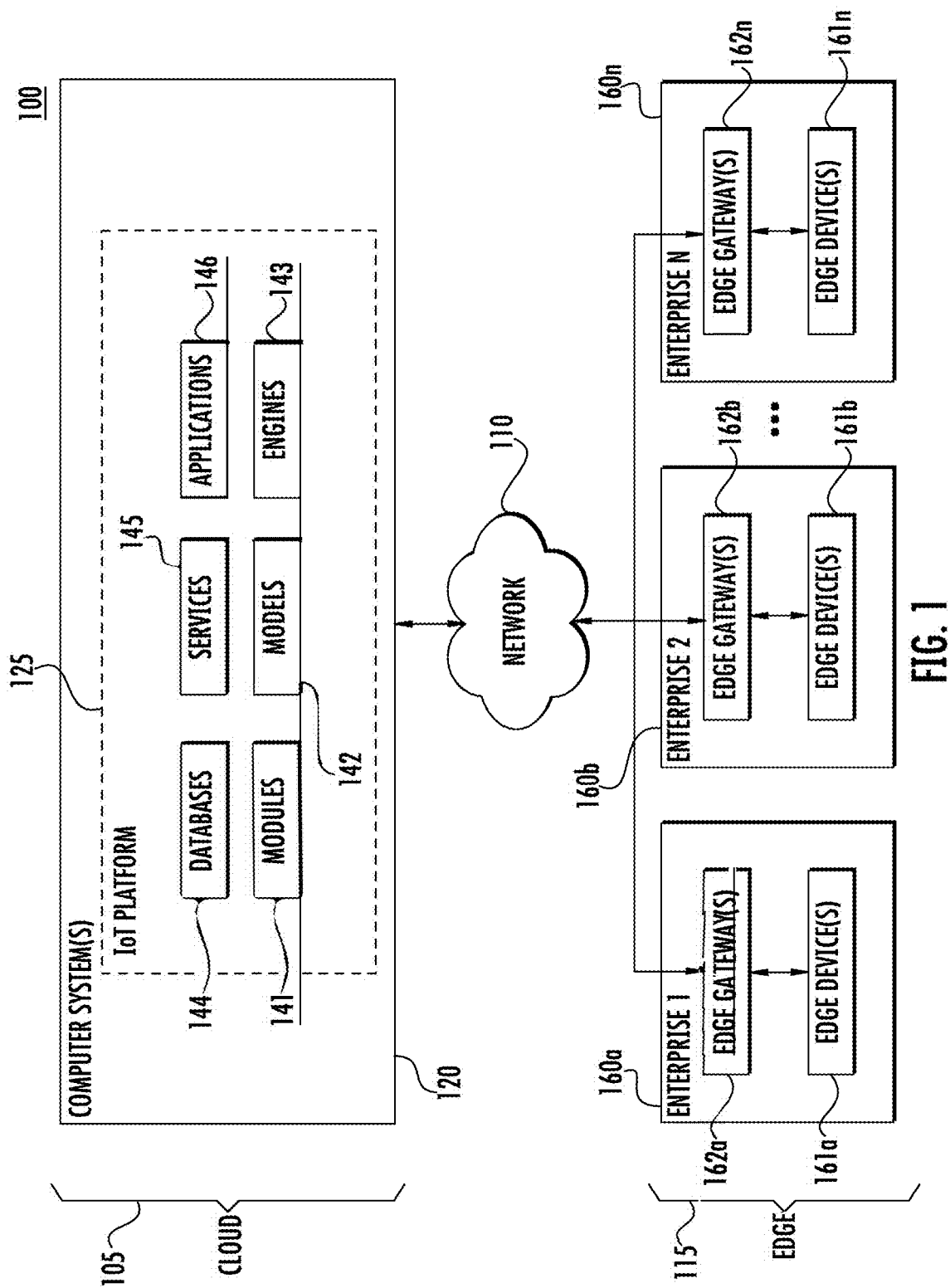
FIG. 1 depicts an exemplary networked computing system environment, according to one or more embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. The word "exemplary" is used herein to mean "serving as an example, instance, or illustration." Any implementation described herein as "exemplary" is not necessarily to be construed as preferred or advantageous over other implementations. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

As described above, an industrial plant, connected warehouse, building and/or the like containing a vast amount of assets and an associated automation system for the assets can be complex and may comprise tens of thousands of data points of sensors, controllers, actuators, and/or the like. For this reason, systems and methods comprising functionalities such as analytics, predictive maintenance models, fault detection processes, model-based predictive control algorithms, and/or the like, can be built and deployed to process time-series data of the assets in order to diagnose various conditions of the asset system, predict faults within the asset system, optimize performance, gain various insights, monitor productivity and/or performance, and/or the like.

Such systems and methods may be associated with a digital model, or semantic model, for the assets. Such digital models represent and describe the arrangement of real-world assets and provide context for those assets. A digital model is defined with a common vocabulary (e.g., terminology for various assets, properties, and/or the like) and established by a formal domain model (e.g., a domain ontology). Digital models are be used to allow for the analysis of devices or performing analytics and/or customized manual programming for assets, including but not limited to advanced diagnostics, energy management, performance optimization, and/or the like.

However, different domains, industries, enterprises, and/or the like have specific and unique needs and requirements for asset management and other processes, such as processes related to operations, energy, sustainability, worker productivity, and/or other processes. In this regard, while there may be commonalities in asset and process management across domains, many domains require or at least suggest a degree of customization to address specific requirements. Building a unique software solution for a particular domain that addresses the domain's specific requirements results in an extended development cycle time, as well as unextendible and unscalable software which is only applicable to that particular domain.

To address these and/or other issues, foundation applications comprising a framework which can be extended to provide a domain-specific application are provided. In various embodiments, a foundation application is generated leveraging cloud-based services of an Internet-of-Things (IoT) platform (described further below in connection with FIGS. 1 and 2) which address or otherwise account for specific domain needs and/or requirements. In various embodiments, foundation applications provide a shell framework that enables accelerated development, configuration, and domain-specific extension as well as functionalities including, but not limited to, onboarding new assets with an ability to model new assets, accepting measurements from the newly onboarded assets and allowing control of the newly onboarded assets, integrating with third-party cloud system(s) and/or software providing IoT data as well as non-IoT data, enabling domain-specific data transformations such as data aggregation and calculations for producing required performance metrics, tagging data, generating insights by way of machine learning (ML), extending the foundation application to include domain-specific alerts, workflows, rules, notifications and/or the like, and bundling predefined core services related to data storage, insight, visualization, and/or the like.

In this regard, in various embodiments, a foundation application for a particular domain can be extended to address a common set of needs, such as global operations, asset management, worker productivity, and/or the like. For example, a foundation application built to manage global operations for a particular enterprise may enable visibility of performance metrics at asset site-level (e.g., a particular building, warehouse, etc.) as well as across all asset sites for the particular enterprise, apply consistent business rules, alerts, and/or the like across the asset sites, and provide flexibility to extend performance metrics visibility and add new business rules, alerts, workflows, and/or the like instantaneously.

In various embodiments, a foundation application comprises seeded templates which differentiate the target domain of the foundation application from other foundation applications. For example, an example foundation application specific to global operations of a connected warehouse can include a number of seeded templates specific to connected warehouse assets and/or operations, such as a seeded template for a sorter asset, and a seeded template for an alert associated with a dip in warehouse efficiency due to a number of label read failures. Similarly, an example foundation application specific to global operations of a connected building can included seeded templates for an asset such as a Heating, Ventilation, and Air Conditioning (HVAC) unit, a seeded template for an alert configured to initiate a service ticket due to failure of the HVAC unit, and/or other seeded templates specific to connected building assets and/or operations.

In various embodiments, a foundation application comprises seeded templates and provides the ability to modify or add seeded templates for various data models including assets, external integrations (e.g., third-party cloud software integrations), data transformations, alerts, rules (e.g., business rules), workflows, visualizations, and/or the like. In this regard, an end user is enabled to manage, add, and/or extend seeded templates for their specific domain through inputs to electronic interface(s) of the foundation application.

In various embodiments, a foundation application is implemented as a Software-as-a-Service (SaaS) offering by an IoT platform. In various embodiments, a foundation application is generated to include a plurality of predefined core services. In various embodiments, the predefined core services are a subset of services from a plurality of services offered and/or managed by the IoT platform. For example, the plurality of services may include application services such as rules engines, workflow and/or notification management, key performance indicator (KPI) framework(s), data insight services such as data query application programming interfaces (APIs), and/or time-series database access services, data pipeline services such as data cleansing, data transformation, data calculations and/or data aggregations, IoT services such as device management, data ingestion services, and/or the like. These services and other services are further described below in connection with FIGS. 1 and 2.

In various embodiments, a foundation application provides an electronic user interface (UI) facilitating user interaction with the predefined core services of the foundation application as well as user ability to extend (e.g., modify, add, and/or remove predefined or pre-existing metadata) seeded templates, and/or perform other operations related to the foundation application. In various embodiments, an extension request is received in response to an input to the electronic interface of the foundation application. In various embodiments, the extension request comprises an addition or modification to data associated with a selected template. For example, the addition or modification to the data can include, in some examples, an onboarding of a new or additional asset, a modification of a seeded template for an asset defining, adding, removing, and/or updating metadata such as new properties, point roles, and/or the like, a modification, cleansing, and/or transformation of data, creation or modification of workflows, rules, alerts, visualizations, and/or the like.

In various embodiments, in response to the extension request, output data is determined based on the addition or the modification to the data associated with the selected template. In various embodiments, the output data comprises data determined and/or actions executed based on the extension request. For example, in some examples, the output data can include the determination and/or displaying of performance metrics of data for one or more assets and/or asset sites, issuing a notification based on a triggering of a rule or alert, applying a transformation to data related to one or more assets, and/or the like.

In various embodiments, a visualization is provided at an electronic interface of the foundation application. In various embodiments, the visualization is a dashboard visualization that includes a plurality of widgets. In various embodiments, a widget is a digital visualization related to one or more predefined core services of the foundation application. In various embodiments, one or more widgets of the dashboard visualization are selectable. For example, one or more widgets can be associated with a predefined core service for providing data insights for one or more assets and comprise a visualization of real-time data associated with the one or more assets, such as in the form of a graph visualization, key performance indicators (KPIs), and/or the like.

In various embodiments, the foundation application provides customizability of the dashboard visualization such that the user is enabled to select, position, resize, and configure the widgets of the dashboard visualization. In various embodiments, the dashboard visualization comprises an indication of the determined output data. For example, the output data, in some embodiments, can include a result of a data transformation of an extension request, and the dashboard visualization can include an indication of the result for further analysis by an end user.

FIG. 1 illustrates an exemplary networked computing system environment 100, according to the present disclosure. As shown in FIG. 1, networked computing system environment 100 is organized into a plurality of layers including a cloud layer 105 ("cloud 105"), a network layer 110 ("network 110"), and an edge layer 115 ("edge 115"). As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/ virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
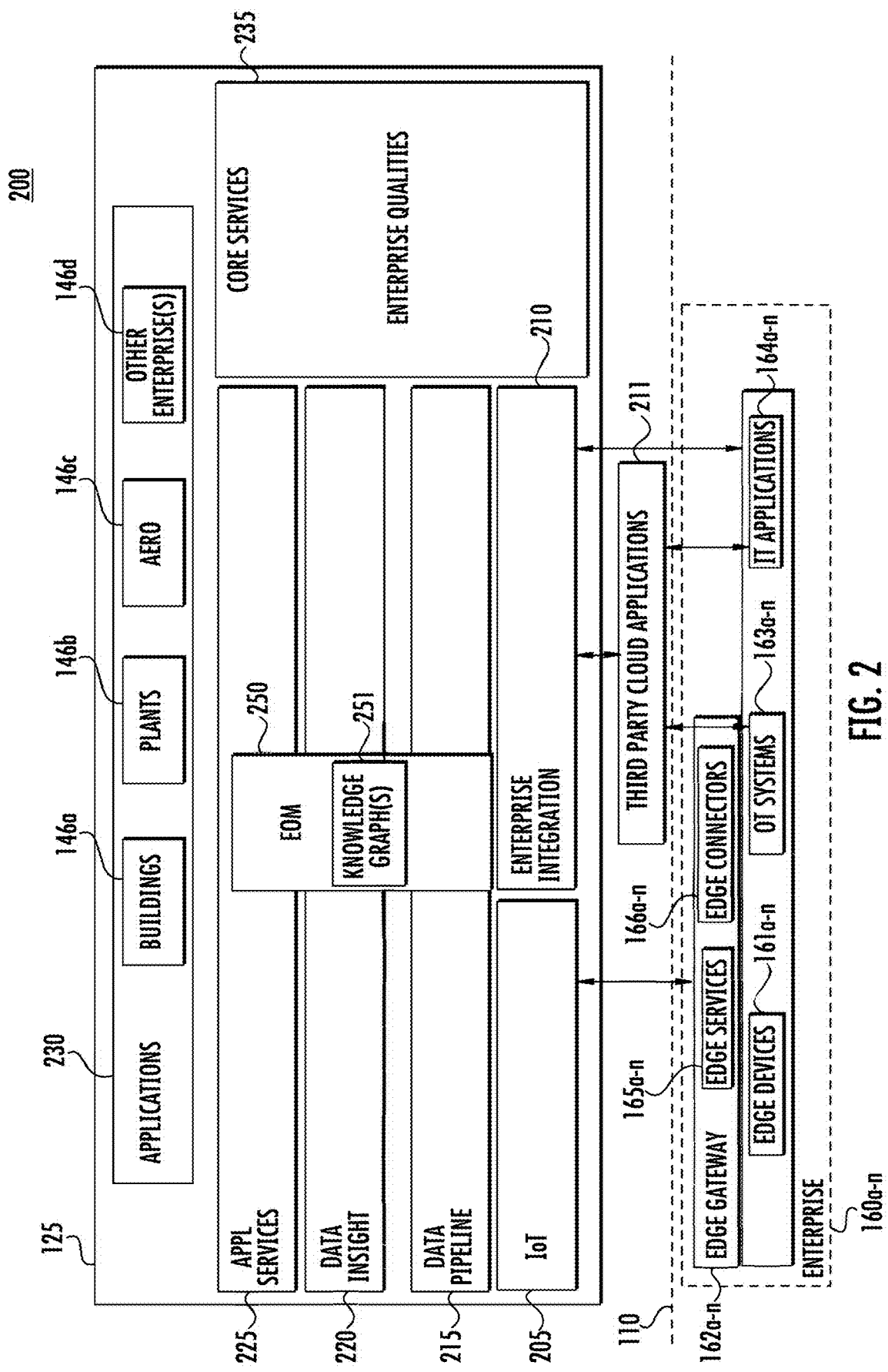
FIG. 2 depicts a schematic block diagram of a framework of an Internet of Things (IoT) platform of the networked computing system environment of FIG. 1.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 160a-160n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 ("core services 235") and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "asset model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, the model can describe the type of sensors mounted on any given asset (e.g., edge device 161a-161n) and the type of data that is being sensed by each sensor. A key performance indicator (KPI) framework can be used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 can understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161a-161n and determine what the naming conventions refer to. For example, the knowledge graph 251 can receive "TMP" during the modeling phase and determine that "TMP" relates to "temperature." The generated models are then published. The complex onboarding process includes the knowledge graph 251 receiving the raw model data, receiving point history data, and receiving site survey data. The knowledge graph 251 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, data can be ingested from the edge devices 161a-161n through process historians or laboratory information management systems. The IoT layer 205 is in communication with the edge connectors 166a-166n installed on the edge gateways 162a-162n through network 110, and the edge connectors 166a-166n send the data securely to the IoT platform 205. In some embodiments, only authorized data is sent to the IoT platform 125, and the IoT platform 125 only accepts data from authorized edge gateways 162a-162n and/or edge devices 161a-161n. Data may be sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party cloud applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the assets (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the asset templates such that when an asset (e.g., edge device 161a-161n) instance is created, any associated calculation instances are also created with their input and output parameters linked to the appropriate attributes of the asset (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, asset management, autonomous control, and/or any other custom applications. Portfolio management can include the KPI framework and a flexible user interface (UI) builder. Asset management can include asset performance and asset health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

Figure 3:
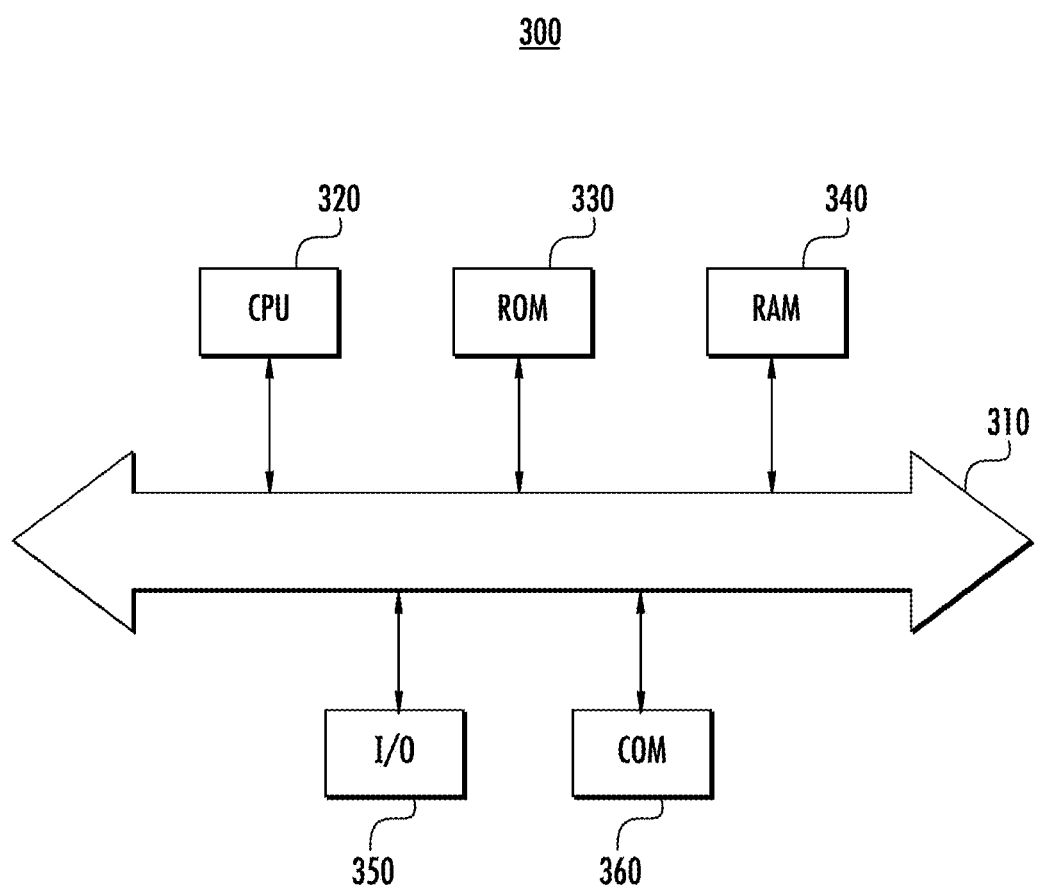
FIG. 3 depicts an example system that executes techniques presented herein.

FIG. 3 depicts an example system 300 that is configured to perform and/or execute techniques presented herein. FIG. 3 is a simplified functional block diagram of a computer that may be configured to execute techniques described herein, according to exemplary embodiments of the present disclosure. Specifically, the computer (or "platform" as it may not be a single physical computer infrastructure) may include a data communication interface 360 for packet data communication. The platform also may include a central processing unit ("CPU") 320, in the form of one or more processors, for executing program instructions. The platform may include an internal communication bus 310, and the platform also may include a program storage and/or a data storage for various data files to be processed and/or communicated by the platform such as ROM 330 and RAM 340, although the system 300 may receive programming and data via network communications. The system 300 also may include input and output ports 350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Figure 4:
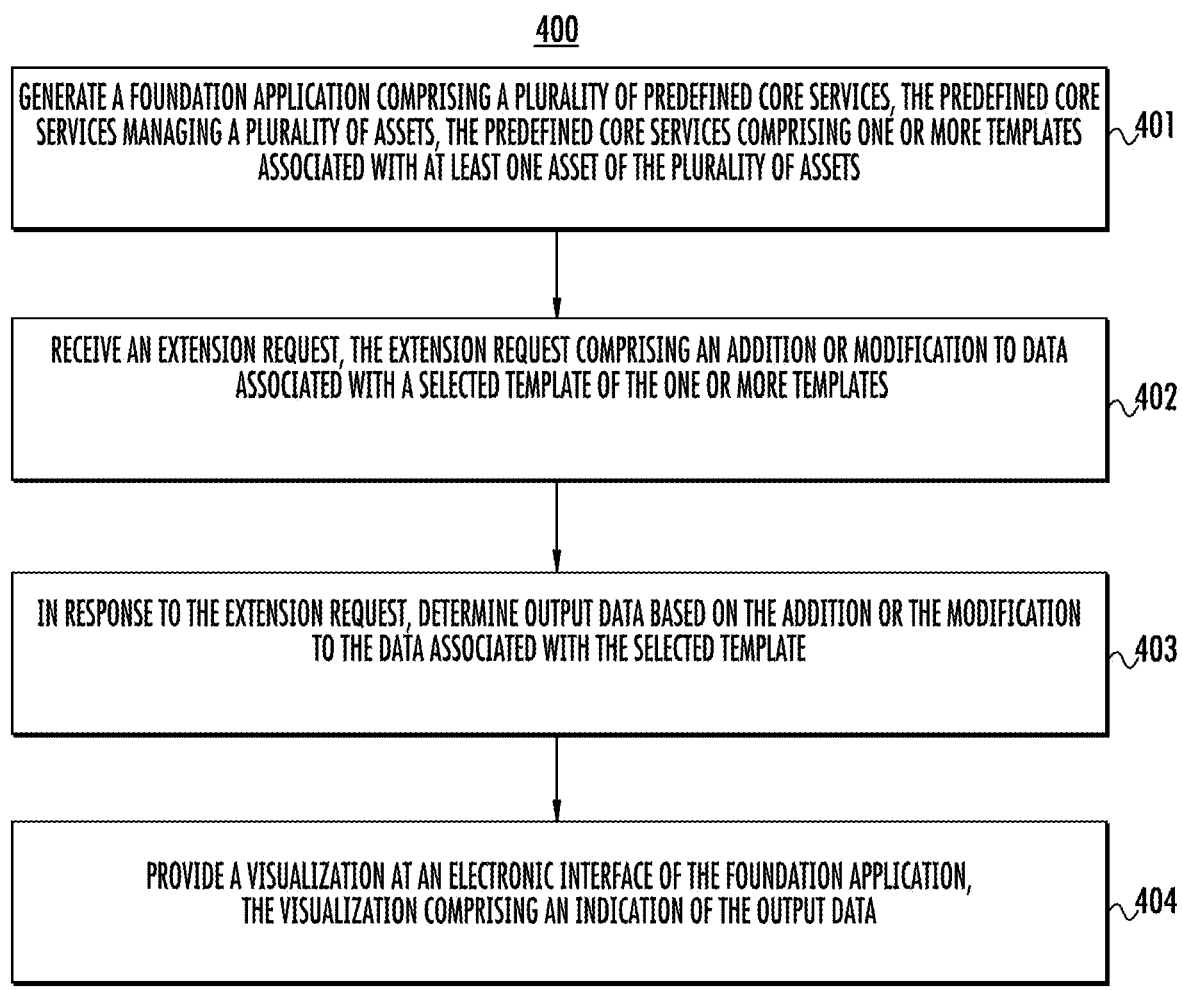
FIG. 4 illustrates a flow diagram of operations related to determining output data based on an extension request, in accordance with one or more embodiments described herein.

Referring now to FIG. 4, a method 400 illustrates operations performed related to determining output data based on receiving an extension request at a foundation application. In one or more embodiments, the method 400 begins at block 401 that generates (e.g., by the CPU 320 and/or the like) a foundation application comprising a plurality of predefined core services managing a plurality of assets. In various embodiments, the predefined core services comprise one or more templates associated with at least one asset of the plurality of assets.

Figure 5A:
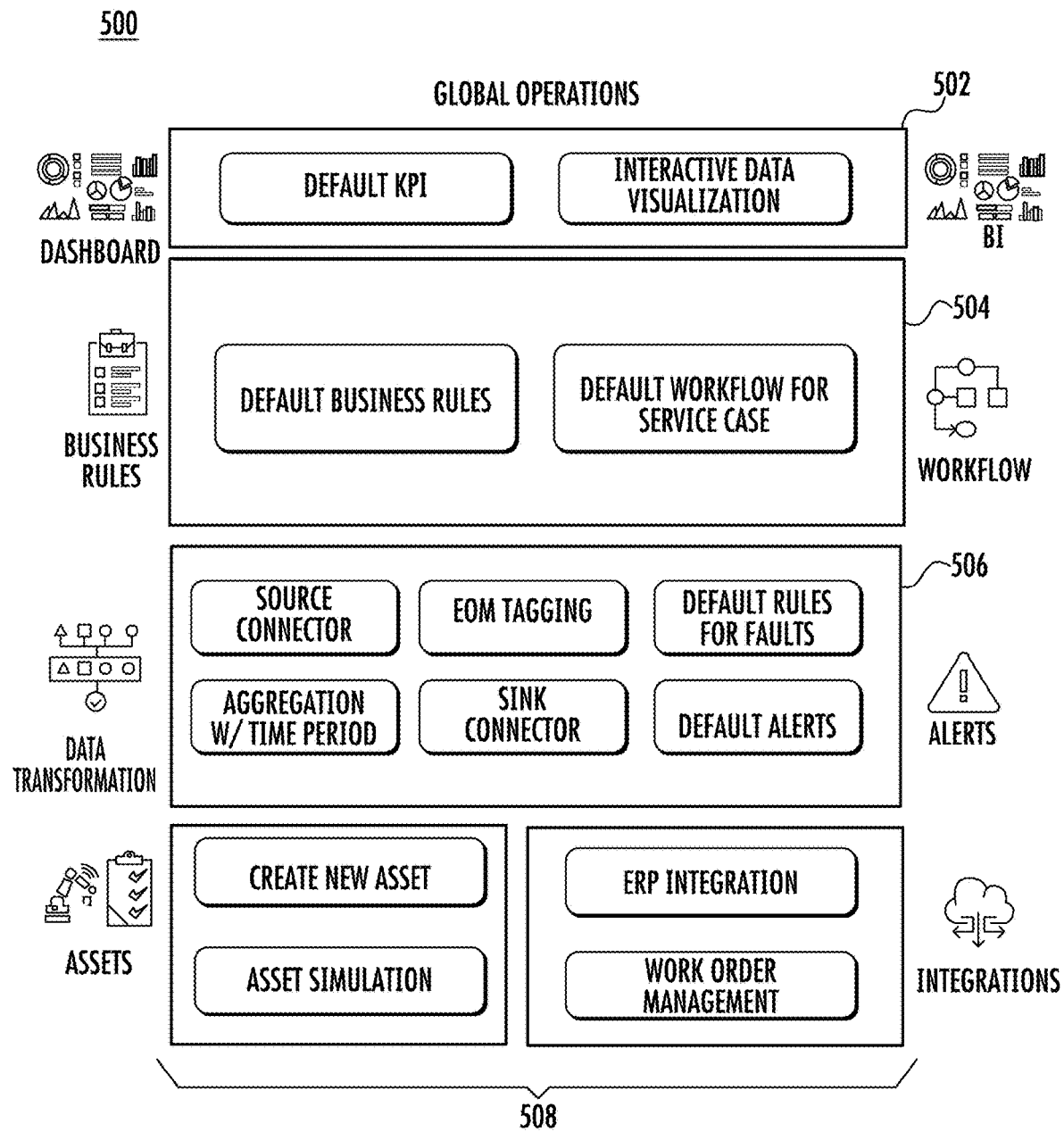
FIG. 5A illustrates an example representation of an example foundation application framework, in accordance with one or more embodiments described herein.
Figure 5B:
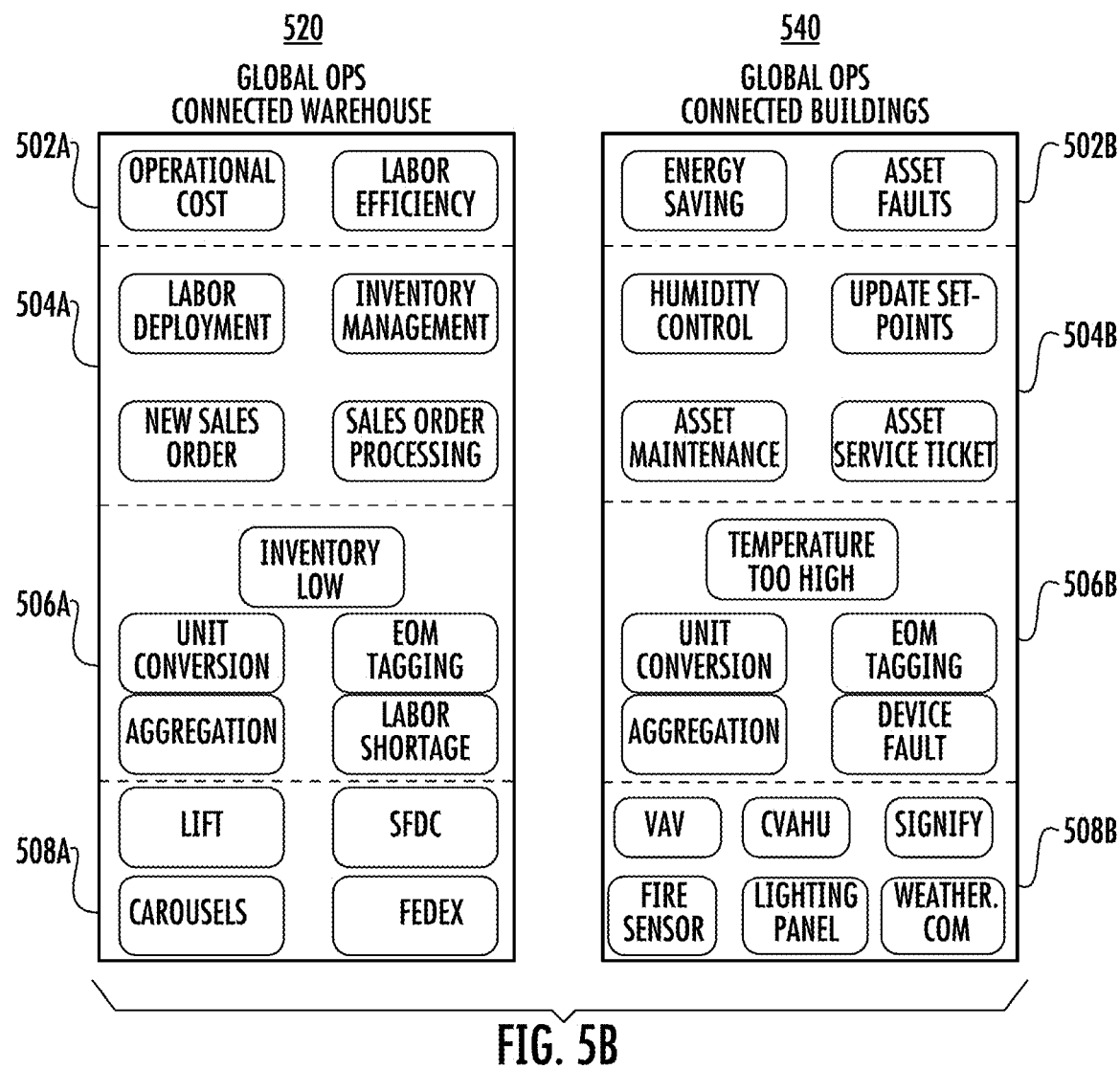
FIG. 5B illustrates example representations of extensions of the foundation application framework of FIG. 5A, in accordance with one or more embodiments described herein.

As described above, in some embodiments, a foundation application is generated and implemented as a SaaS offering that includes a plurality of predefined core services of the IoT platform 125 which can be extended by domains (e.g., business enterprises and associated asset sites such as buildings, warehouses and/or the like) to meet specific and/or unique requirements. In other words, a foundation application is generated to include a shell framework of predefined core services of the IoT platform 125, which, when accessed by end users within a particular domain, can be extended and/or otherwise configured by the end users to manage, configure, and/or process data related assets and/or other operations within their domain, such as within different asset sites. FIGS. 5A and 5B illustrate a high-level overview of an example foundation application framework 500 which provides predefined core services as well as example extensions of the example foundation application framework.

As shown in FIG. 5A, an example foundation application for an example enterprise has a framework 500 that comprises several layers of example predefined core services, such as for global operations for the enterprise. A first example layer 502 includes predefined core services related to dashboard visualization configuration and business insights ("BI"). As shown, these services include default KPI services and interactive data visualization services. A second example layer 504 includes predefined core services related to generating business rules and workflows. For example, these services include default business rules and default workflows which can later be extended for a particular asset site.

A third example layer 506 includes predefined core services related to data transformation and alert generation. For example, these services may include Extensible Object Model (EOM) tagging, default alerts and default rules for faults, source and sink connectors, and data aggregation services. A fourth example layer 508 includes predefined core services related to asset configuration and/or management and integrations (e.g., third-party cloud software integrations). For example, these services may include asset creation and/or onboarding services, asset simulation services, external Enterprise Resource Planning (ERP) service integration, and external Work Order Management service integration.

As shown in FIG. 5B, the framework 500 of the example foundation application of FIG. 5A can be extended into domain-specific foundation applications, such as a first foundation application 520 for global operations of a connected warehouse and a second foundation application 540 for global operations of a connected building.

For example, as shown, the first example layer 502, which includes predefined core services related to dashboard visualization configurations and business insights, is extended (e.g., first layer 502A) to include seeded templates for business insights and/or visualizations related to operational costs and labor efficiency in the foundation application 520 for a connected warehouse. Similarly, the first example layer 502 is extended (e.g., first layer 502B) to include seeded templates for business insights and/or visualizations related to energy saving and asset faults in the foundation application 540 for a connected building.

The second example layer 504, which includes predefined core services related to generating business rules and workflows, is extended (e.g., second layer 504A) to include seeded templates for business rules and/or workflows related to labor deployment, inventory management, sales order processing, and new sales orders in the foundation application 520 for a connected warehouse. Similarly, the second example layer 502 is extended (e.g., second layer 504B) to include seeded templates for business rules and/or workflows related to humidity control, setpoint updating, asset maintenance, and asset service tickets in the foundation application 540 for a connected building.

The third example layer 506, which includes predefined core services related to data transformation and alert generation, is extended (e.g., third layer 506A) to include seeded templates for data transformations related to unit conversion, EOM tagging, and aggregation, and seeded templates for alerts such as a low inventory alert and a labor shortage alert in the foundation application 520 for a connected warehouse. Similarly, the third example layer 506 is extended (e.g., third layer 506B) to include seeded templates for data transformations related to unit conversion, EOM tagging, and aggregation, and seeded templates for alerts such as a high temperature alert and a device fault alert in the foundation application 540 for a connected building.

The fourth example layer 508, which includes predefined core services related to asset configuration and/or management and integrations, is extended (e.g., fourth layer 508A) to include templates for assets such as lifts and carousels, and seeded templates for integrations of external third-party services (e.g., FedEx, Salesforce.com (SFDC)). Similarly, the fourth example layer 508 is extended (e.g., fourth layer 508B) to include seeded templates for assets such as a fire sensor, lighting panel, a constant volume air handling unit (CVAHU), and a variable air volume (VAV) sensor, and seeded templates for integrations of external third-party services (e.g., Signify, Weather.com) in the foundation application 540 for a connected building.

Figure 5C:
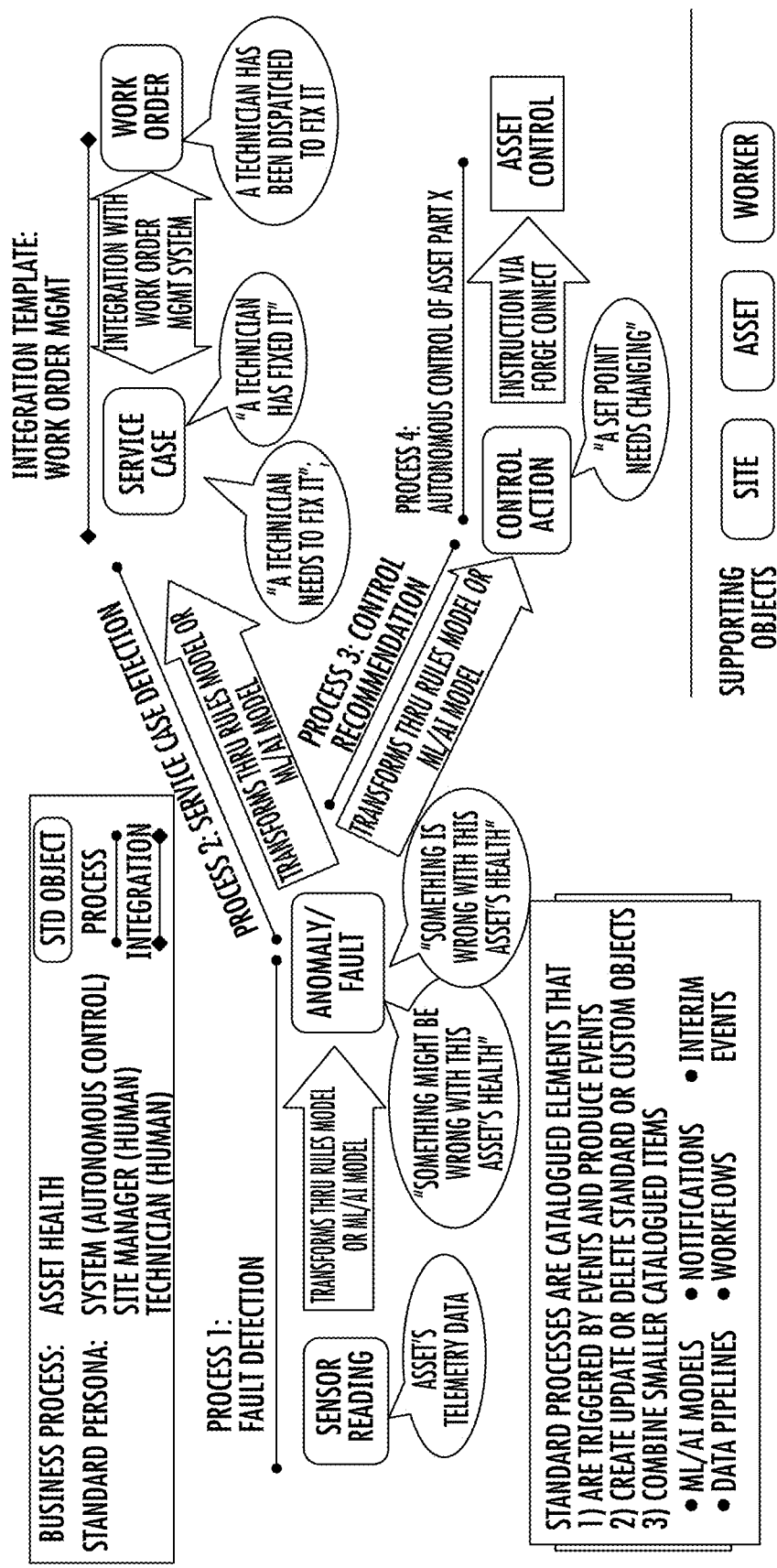
FIG. 5C illustrates an example representation of an example asset health process which an example foundation application can be extended and configured to execute, in accordance with one or more embodiments described herein.
Figure 5D:
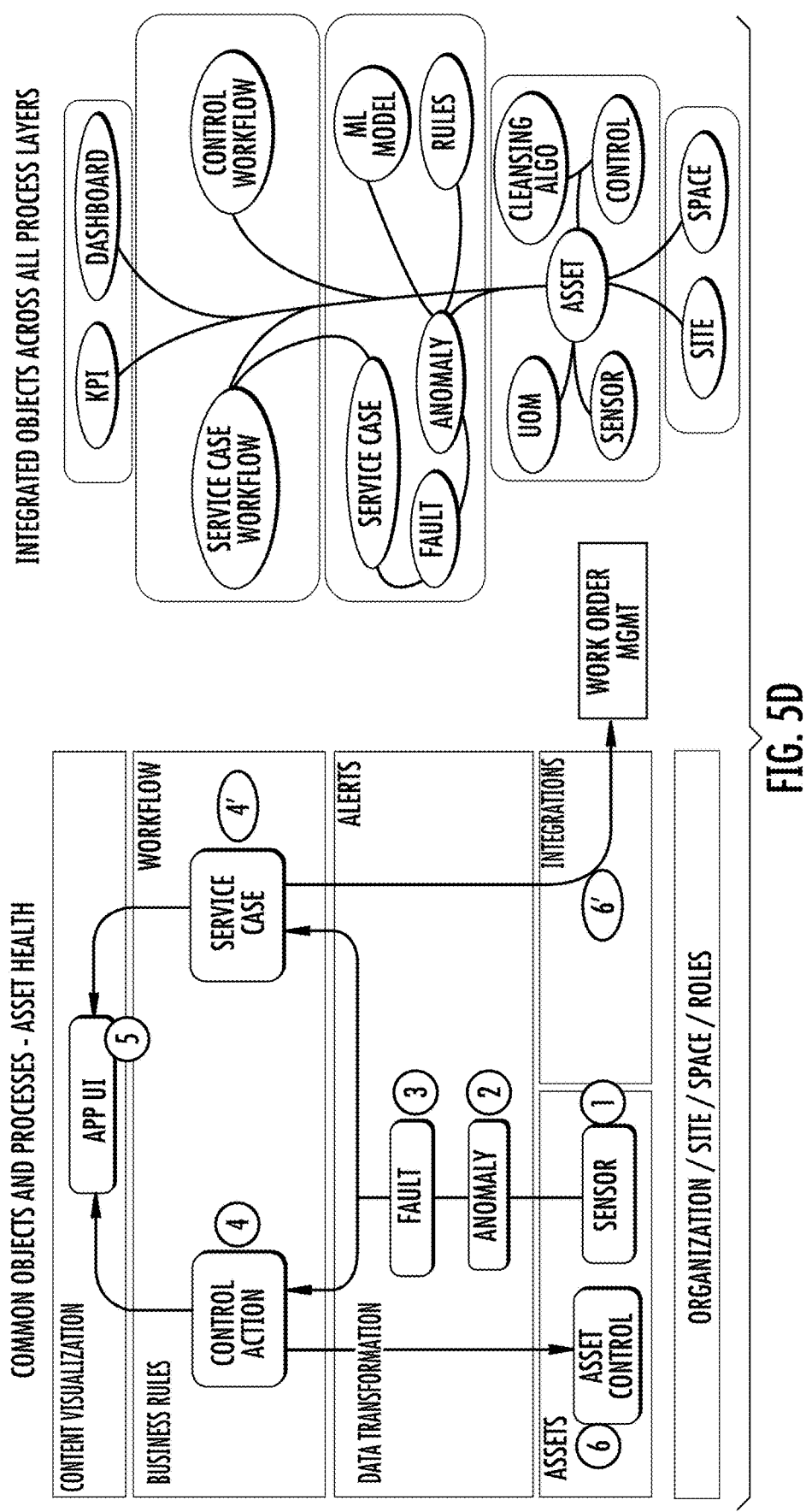
FIG. 5D illustrates an example representation of example layers of the example asset health process of FIG. 5C, in accordance with one or more embodiments described herein.

As shown in FIGS. 5A and 5B, an example foundation application is extended for two domains (e.g., a connected warehouse and connected building) to meet the requirements and unique circumstances of each domain. By way of further example, FIG. 5C illustrates an example representation of an example asset health process which an example foundation application can be extended and configured to execute. For example, a business process for monitoring the health of an example asset is shown. As shown and described herein, such processes are elements that can be triggered by events and/or produce events, create, update, and/or delete objects (e.g., data objects), and may combine and employ other aspects such as machine learning (ML) models, data pipelines, notifications, workflows, interim events, and/or the like. To further illustrate, FIG. 5D shows example process layers of the example asset health process of FIG. 5C. As shown, each process layer is associated with one or more common objects (e.g., data objects representing assets, processes, and/or other items or real-world entities) utilized in the asset health process.

As shown in FIG. 5C, for example, during Process 1, fault detection is employed to assess telemetry data of an asset by using, e.g., ML model(s) and/or one or more business rules (further described below in connection with FIGS. 8A-E). Upon detection of an anomaly and/or fault based on the telemetry data, several processes are be further triggered. For example, Process 2 detects a need for a service case based on one or more rules and/or ML determinations. In this regard, an example integration template of example foundation application is defined to initiate a work order with a third-party integration service (e.g., a Work Order Management System). Further details regarding configuring and extending integration templates are described below in connection with FIGS. 12A-C. Additionally, Process 3 determines a control recommendation is needed, e.g., through ML and/or one or more rules, to change a particular set point of the asset, triggering Process 4 which causes actuation (e.g., autonomous control) of the asset or portion of the asset.

Figure 5E:
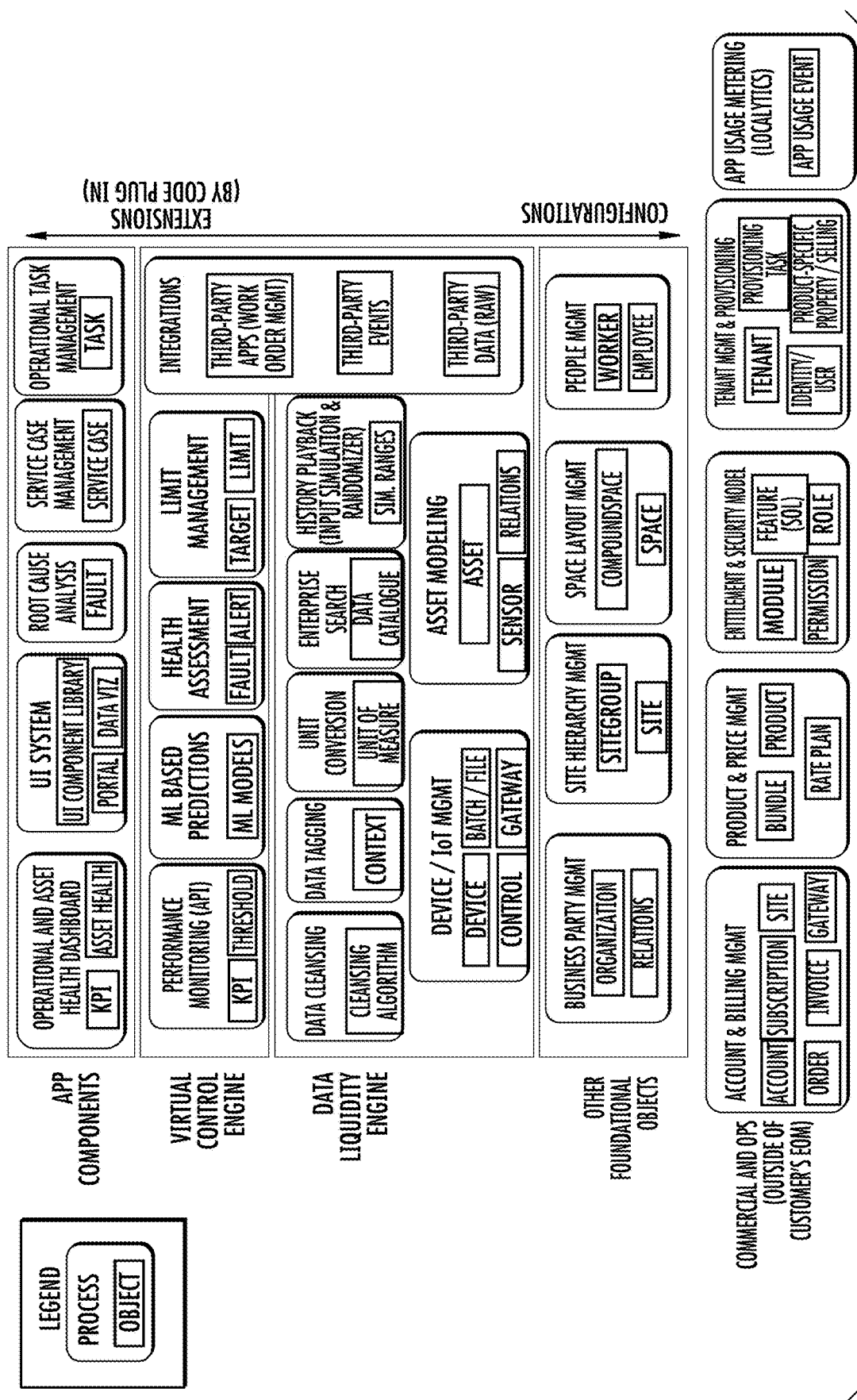
FIG. 5E illustrates example common objects and processes for an example foundation application which can be configured and extended, in accordance with one or more embodiments described herein.

By way of further example, FIG. 5E illustrates example common objects and processes for an example foundation application which can be configured and extended to provide domain-specific implementations. As shown, in some embodiments, foundation application may utilize common objects and processes outside of an associated extensible object model (EOM). For example, these processes can include account and billing management processes, product and price management processes, entitlement and security model processes, tenant management and provisioning processes, application usage metering processes, and/or other processes. For example, in some embodiments, usage of a foundation application may require a user account, subscription, payment plan, and/or the like.

As shown in FIG. 5E, an example foundation application utilizes common objects and processes across modules (e.g. including the EOM) that can be configured and/or extended. As shown, configurations of processes and/or common objects are implemented (e.g., configured by a developer creating the particular foundation application) and extensions of processes and/or common objects may be performed in response to end user input via an electronic interface of the foundation application. For example, foundational common objects may be configured, such as processes for business party management (e.g., common objects defining an organization and/or relations therein), site hierarchy management (e.g., common objects defining one or more asset sites for an organization), space layout management (e.g., common objects defining spaces, levels, zones and/or other features of one or more asset sites), and/or people management processes (e.g., common objects defining properties of workers and/or employees of an organization). These foundational objects can then be extended by end users for instances of particular domains (e.g., defining particular employees, zones, and/or relationships for an asset site).

The example foundation application of FIG. 5E further comprises processes and common objects related to data liquidity, such as device and/or IoT data management processes (e.g., common objects defining devices, files, control and/or gateway(s)), asset modeling processes (e.g., common objects defining assets, sensors, relationships between assets, and/or the like), data cleansing processes (e.g., common objects defining cleansing algorithms), data tagging processes(e.g., common objects defining context for data points of sensors and/or assets), unit conversion processes (e.g., common objects defining units of measure for data points), enterprise search processes, simulation processes, and/or the like. These processes and associated common objects may be extended by end users for instances of particular domains (e.g., data related to particular assets deployed at one or more asset sites, site-specific data transformations, and/or the like).

The example foundation application of FIG. 5E further comprises processes and common objects related to virtual control, such as performance monitoring API processes (e.g., common objects defining KPIs and/or thresholds), ML based prediction processes (e.g., common objects defining ML models), health assessment processes (e.g., common objects defining faults and/or alerts), limit management processes (e.g., common processes defining targets and/or limits), and/or the like. Further, the example foundation application comprises integration processes, such as common objects related to third-party applications (e.g., a Work Order Management service or the like), third-party events, and/or third-party raw data. The example foundation application of FIG. 5E further comprises processes and common objects related to application components, such as operational and asset health dashboard processes (e.g., common objects defining KPIs and/or asset health), user interface (UI) system processes (e.g., common objects defining UI component libraries, portal(s) and/or data visualizations), root cause analysis processes (e.g., common objects defining faults), service case management processes, operational task management processes, and/or the like.

In some embodiments, a foundation application is extended via input by an end user to an electronic interface of the foundation application. In some embodiments, an extension request is generated upon the end user providing input to the electronic interface. In this regard, returning to FIG. 4, the method 400 also includes a block 402 that receives (e.g., by the communication interface 360, CPU 320, and/or the like) an extension request comprising an addition or modification to data associated with a selected template of the one or more templates. In some embodiments, an extension request comprises data related to an extension, such as an addition or modification, which an end user is intending to make to a selected template of the foundation application.

For example, and in some embodiments, an extension request can comprise data related to a template for an asset, such as additional data (e.g., properties or the like) for the asset, data for a newly onboarded asset, and/or the like. To illustrate, FIGS. 6A-E show example electronic interfaces of an example foundation application from which an extension request related to a creation and/or modification of template(s) for an asset can be generated.

Figure 6A:
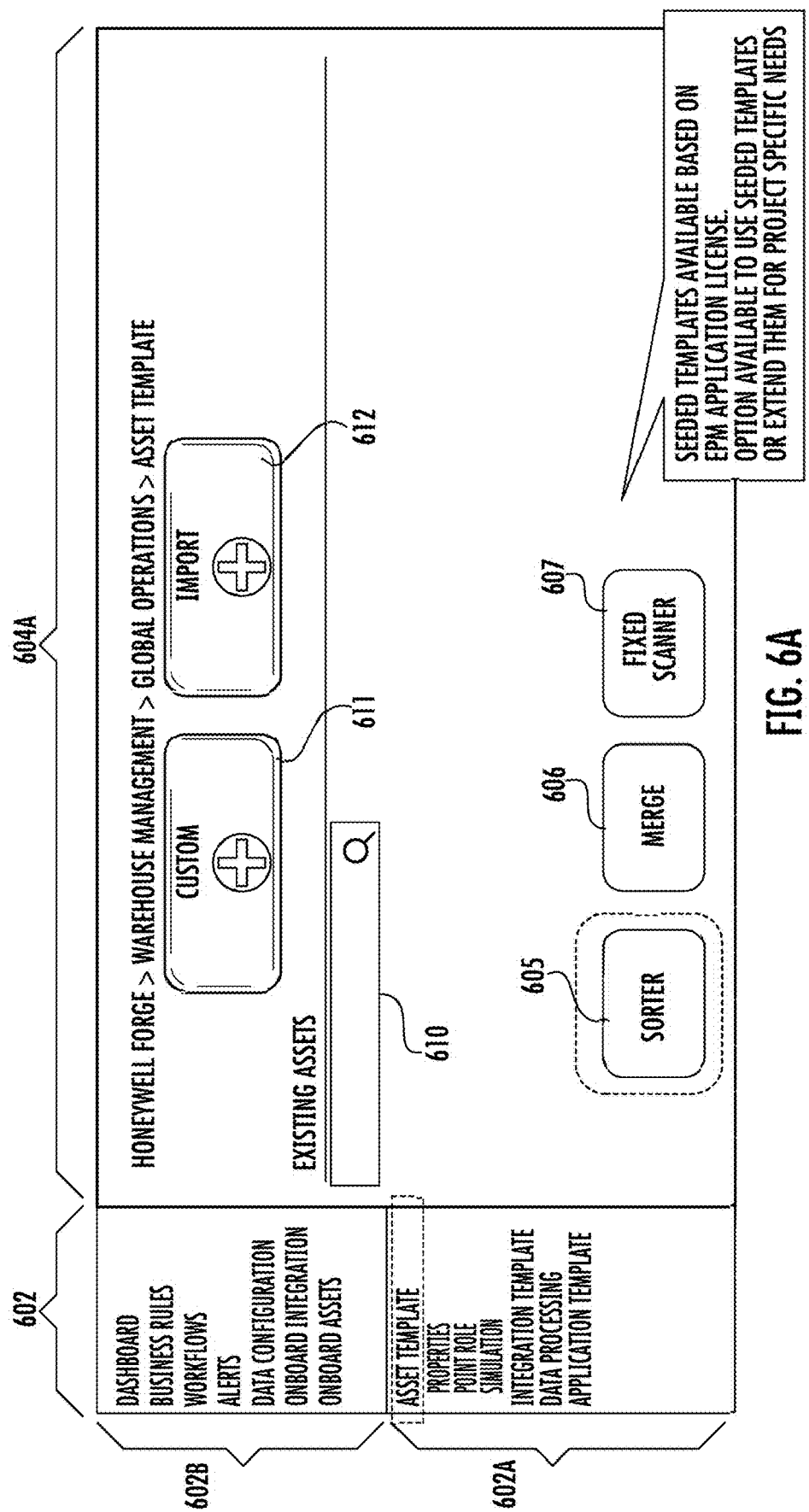
FIG. 6A illustrates an example electronic interface of an example foundation application from which an extension request related to a creation and/or modification of a template for an asset can be generated, in accordance with one or more embodiments described herein.

FIG. 6A shows an example electronic interface of an example foundation application. In some embodiments, the example electronic interface includes a sidebar 602 comprising selectable options to navigate the example foundation application, such as selectable options to view, create, and/or modify templates for rules, workflows, alerts, integrations, data processing, assets, dashboard visualizations, asset and/or integration onboarding, and/or the like.

For exemplary purposes, sidebar portion 602A comprises selectable options for seeded template configuration at a portfolio-level or enterprise-level setting (e.g., default or general seeded template generation for all asset sites of an enterprise). The sidebar portion 602B comprises selectable options for adding to, modifying, instantiating and/or otherwise extending seeded templates at an asset site level (e.g., for a particular building, warehouse, and/or the like). In this regard, in some embodiments, end users at an asset site may only view and/or select options from the sidebar portion 602B, and sidebar portion 602A may be hidden from view on the electronic interface of the foundation application.

As shown, during an enterprise-level seeded template configuration, upon selection of the "Asset Template" option, sub-interface 604A is displayed. In some embodiments, the sub-interface 604A includes selectable icons representing seeded templates which have been previously defined and/or generated (e.g., "Existing Assets"). For example, as shown, sub-interface 604A includes icons representing several templates of assets including a sorter template 605, a merge template 606, and a fixed scanner template 607.

As shown, the sub-interface 604A also optionally includes a search bar 610 to locate existing seeded templates for assets. For example, in some embodiments, the sub-interface 604A may include a large number of icons representing existing seeded templates for assets, such that a user enters the text "sort" in the search bar and the sorter template 605 (and/or other icons for templates containing the term "sort") may be highlighted, displayed separate from other existing templates, and/or otherwise indicated to the user. The sub-interface 604A also optionally includes selectable options 611 and 612 for creating a custom seeded template for an asset or importing a seeded template for an asset (e.g., importing a seeded template file stored externally).

Figure 6B:
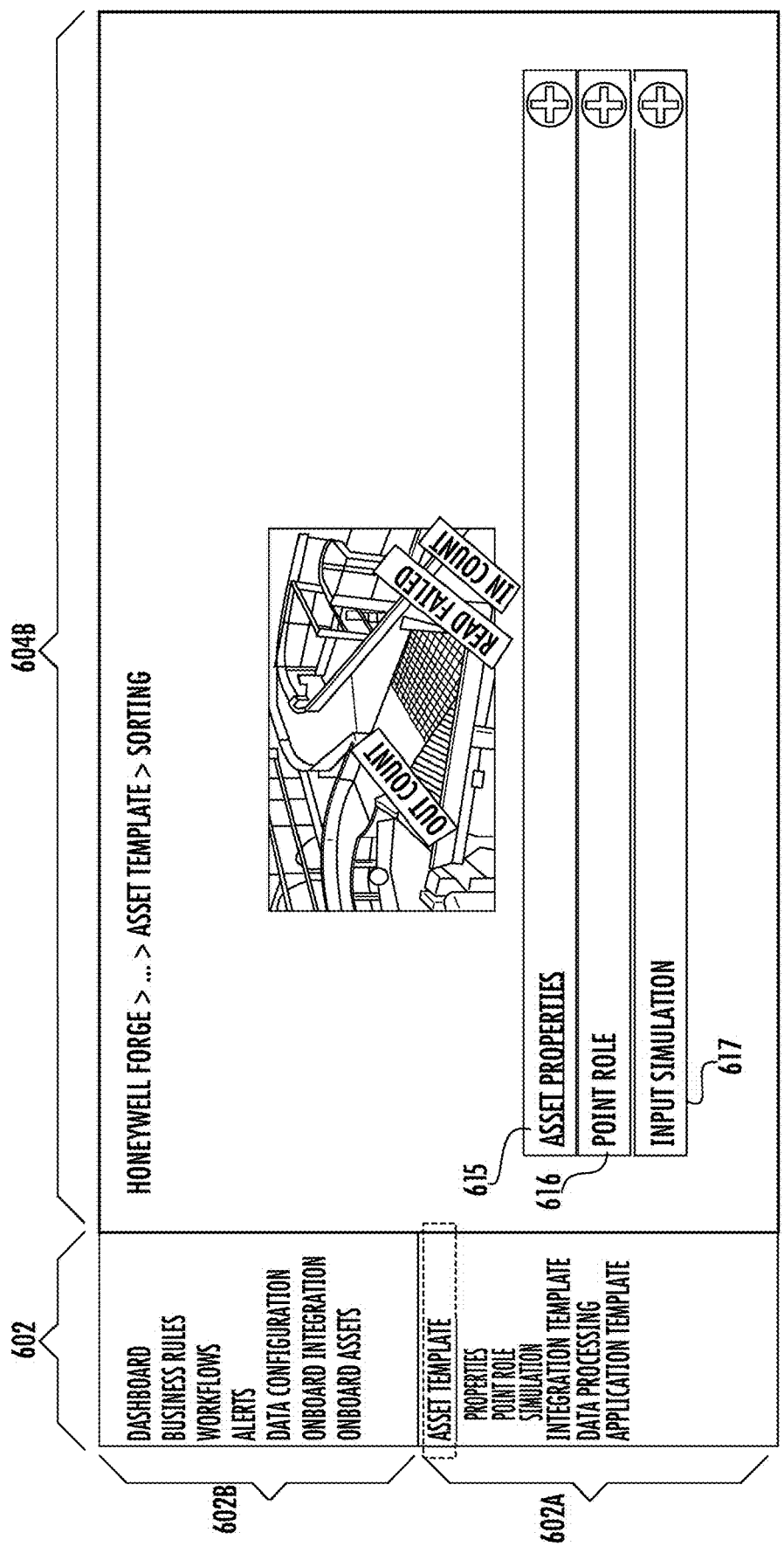
FIG. 6B illustrates an example electronic interface of an example foundation application from which an extension request related to a creation and/or modification of a template for an asset can be generated, in accordance with one or more embodiments described herein.

In some embodiments, for example, upon selection of the icon for the sorter template 605, another sub-interface 604B is rendered, as shown in FIG. 6B. For example, in some embodiments, sub-interface 604B comprises selectable options related to the sorter template. The example selectable options include an asset properties option 615, a point role option 616, and an input simulation option 617. In some embodiments, these example selectable options may additionally or alternatively be selected from the sidebar portion 602A, as shown in FIG. 6B.

Figure 6C:
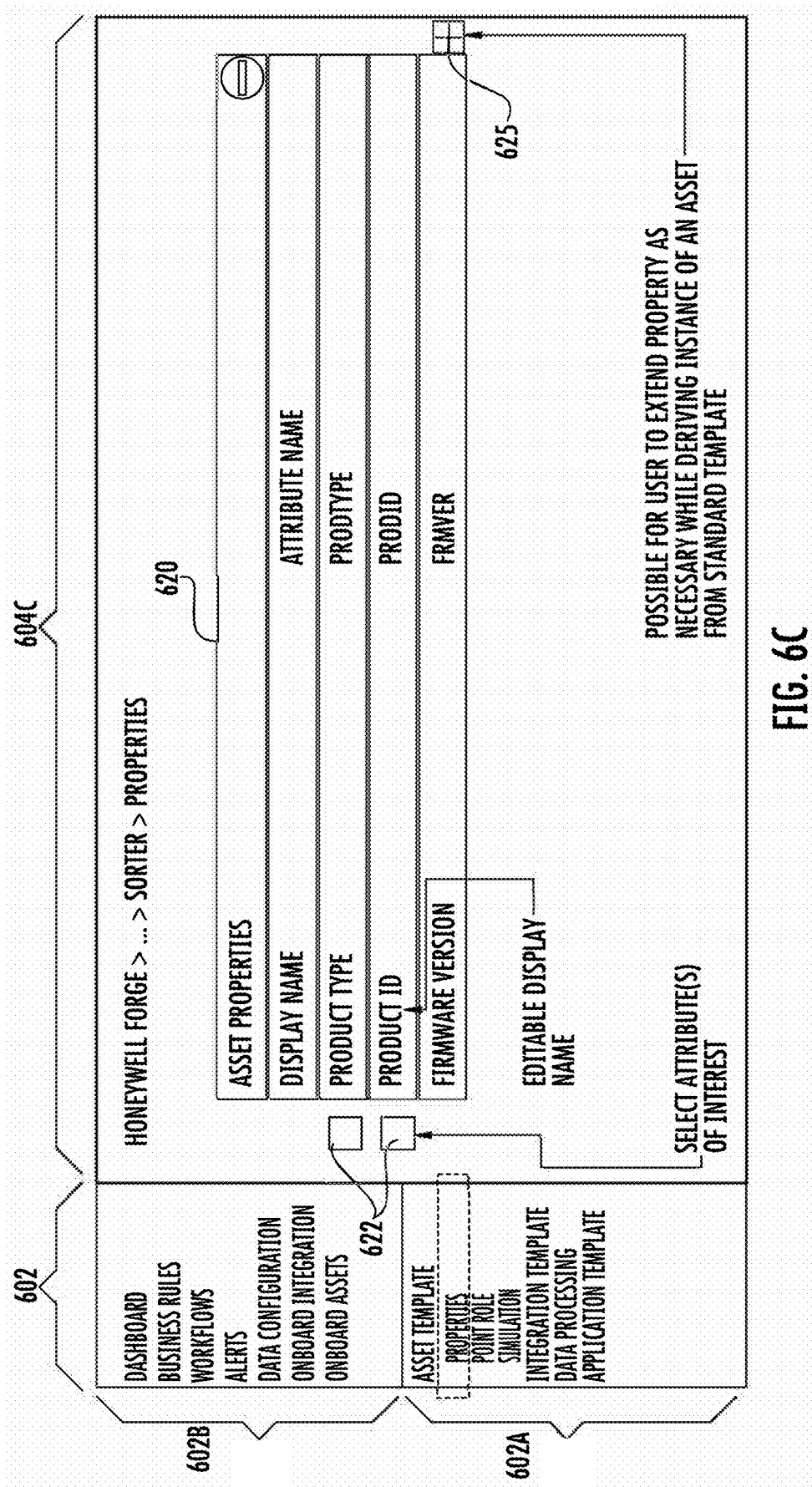
FIG. 6C illustrates an example electronic interface of an example foundation application from which an extension request related to a creation and/or modification of a template for an asset can be generated, in accordance with one or more embodiments described herein.

In some embodiments, for example, upon selection of the asset properties option 615, another sub-interface 604C is rendered, as shown in FIG. 6C. For example, in some embodiments, sub-interface 604C comprises an asset properties table 620 for a sorter asset. As shown, in some embodiments, the asset properties table comprises a listing of rows, each row associated with a particular property (or "attribute") of a sorter asset. The asset properties table 620 provides visibility and configuration of various properties for an asset, such as, for example, manufacturer details, serial number(s), firmware and/or software versions, and/or other characteristics. For example, FIG. 6C shows three example properties including a "Product Type" property, a "Product Identifier" (ID) property, and a "Firmware Version" property. The example asset properties table 620 comprises two columns, "Display Name" and "Attribute Name." As shown, one or more of the properties may be extended by a user selecting element 625 on the sub-interface 604C. For example, a seeded template for an asset can be extended to include additional information, e.g., additional columns, for one or more properties and/or additional properties for the asset. In some embodiments, the properties may be selectable and editable. For example, "Product ID" under "Display Name" may be selected and edited to instead read "Product Identifier." In this regard, an extension request is generated comprising data related to the "Display Name" modification for that particular property. In some embodiments, as shown in FIG. 6C, multiple properties can be selected and/or extended at once using selection boxes 622 on the sub-interface 604C.

Figure 6D:
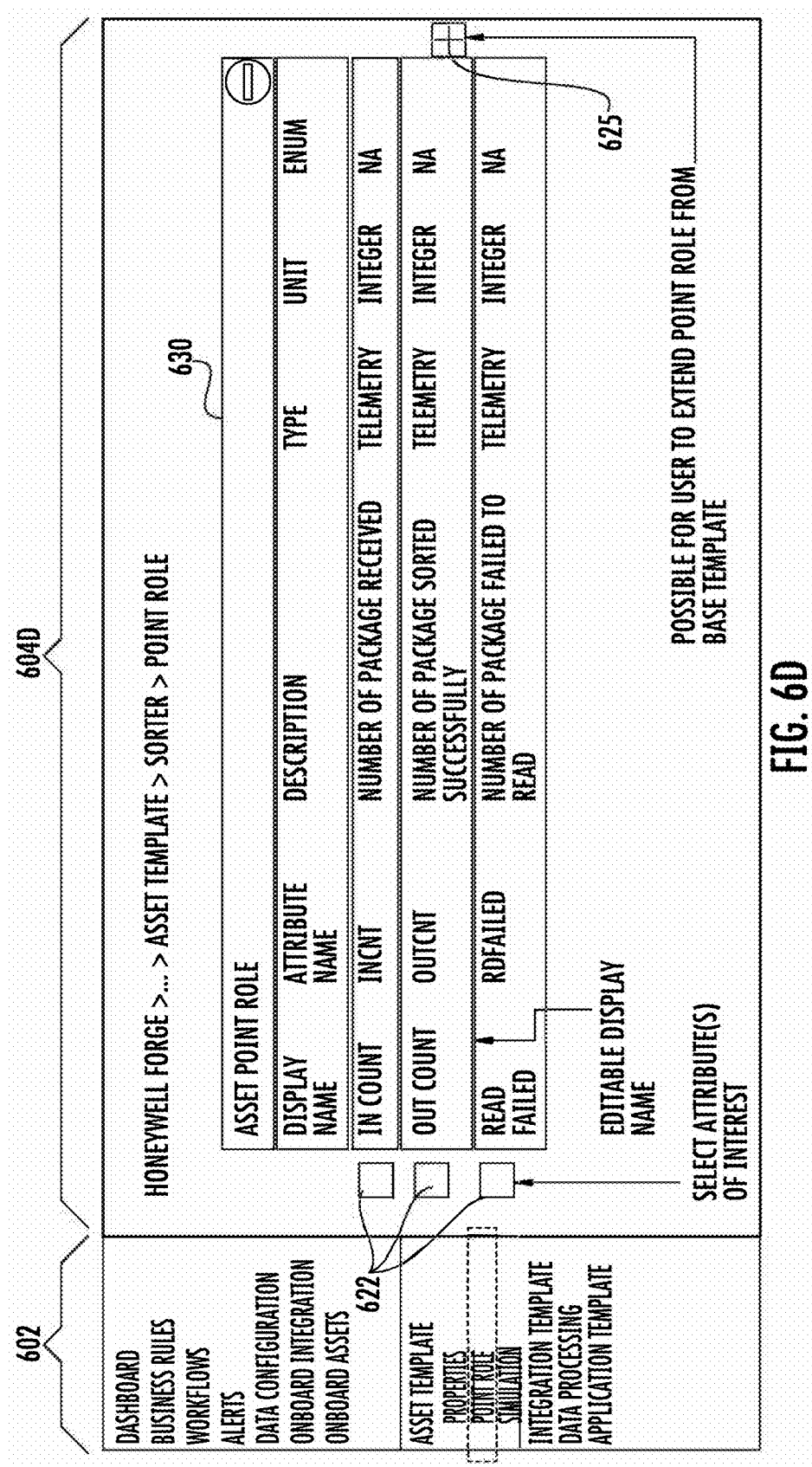
FIG. 6D illustrates an example electronic interface of an example foundation application from which an extension request related to a creation and/or modification of a template for an asset can be generated, in accordance with one or more embodiments described herein.

In some embodiments, for example, upon selection of the point role option 616 shown in FIG. 6B, another sub-interface 604D is rendered, as shown in FIG. 6D. For example, in some embodiments, sub-interface 604D comprises an asset point role table 630 for the sorter asset. As shown, in some embodiments, the asset point role table comprises a listing of rows, each row associated with a property that is associated with a particular data point of an asset and defining a plurality of characteristics of a point role of the respective data point for the asset. A point role serves to identify the semantics of a particular data point (e.g., the role a data point plays in the asset). In a digital model, this can be expressed by attaching a point role to a property. A point role is a concept set such as a collection of strongly typed concept terms defined in a domain ontology which are discrete elements of different concept types that together, provide an unambiguous description of the context of the data point of the particular asset.

For example, in FIG. 6D, three example properties associated with respective data points are shown, including an "In Count" property, an "Out Count" property, and a "Read Failed" property. The example asset point role table 630 comprises five columns, "Display Name," "Attribute Name," "Description," "Type," "Unit," and "Enum." As shown, one or more of the point roles can be extended by a user selecting element 625 on the sub-interface 604D. For example, additional point roles may be added and/or one or more point roles may be extended to include additional information, e.g., additional columns, for the particular data point and/or a modification of one or more characteristics for the data point for further processing, transformation, computation, storage, visualization, and/or the like. In some embodiments, as described above, the properties are selectable and editable. For example, "Integer" under "Unit" may be selected and edited to instead read "Float" for one or more of the properties. In this regard, an extension request is generated comprising data related to the "Unit" change for the point role of that particular property. In some embodiments, as shown in FIG. 6D, multiple point roles can be selected and extended at once using selection boxes 622 on the sub-interface 604D.

Figure 6E:
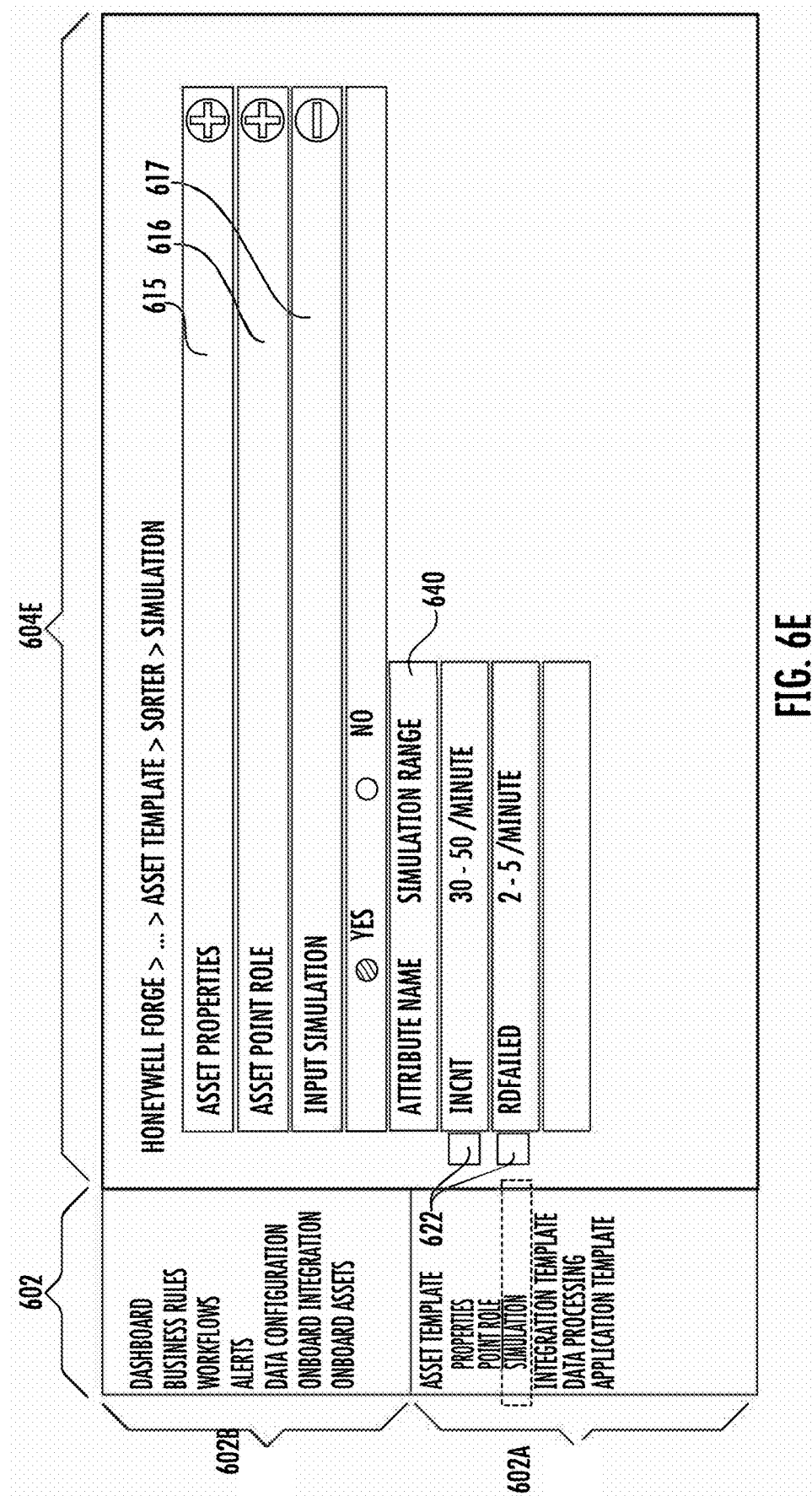
FIG. 6E illustrates an example electronic interface of an example foundation application from which an extension request related to a creation and/or modification of a template for an asset can be generated, in accordance with one or more embodiments described herein.

In some embodiments, for example, upon selection of the input simulation option 617 shown in FIG. 6B, another sub-interface 604E is rendered, as shown in FIG. 6E. For example, in some embodiments, sub-interface 604E comprises an input simulation table 640 for configuring parameters of a predefined core service related to simulation (e.g., simulation of an asset, asset properties, and/or other input). For example, at the enterprise-level, input simulation capabilities for a foundation application can be enabled or disabled (e.g., through selection of the "Yes" and "No" buttons 641). In some embodiments, a predefined core service for input simulation provides an end user with a simulation of data associated with one or more properties of an asset in order to test various functionalities of the foundation application and to ensure the desired information is to be used as a basis for further processing. For example, a user may simulate a number of read failures for a sorter asset in order to ensure an alert and/or business rule associated with read failures would be triggered.

Returning to FIG. 4, the method 400 also includes a block 403 that determines (e.g., by the CPU 320 and/or the like), in response to the extension request, output data based on the addition or the modification to the data associated with the selected template. In various embodiments, as described above determining output data may comprise determining, instantiating and/or storing data and/or executing one or more actions. In some embodiments, the output data varies based on the extension request. For example, for an extension request for a foundation application that comprises a modification to a property of an asset as described above, determined output data comprises storing that modification in association with the foundation application and providing an indication of that modification for display. In this regard, the method 400 also includes a block 404 that provides (e.g., by the communication interface 360, CPU 320, and/or the like) a visualization at an electronic interface of the foundation application, the visualization comprising an indication of the output data. Various example embodiments of example extension requests and resulting example output data and/or example visualizations are further provided below.

Figure 7A:
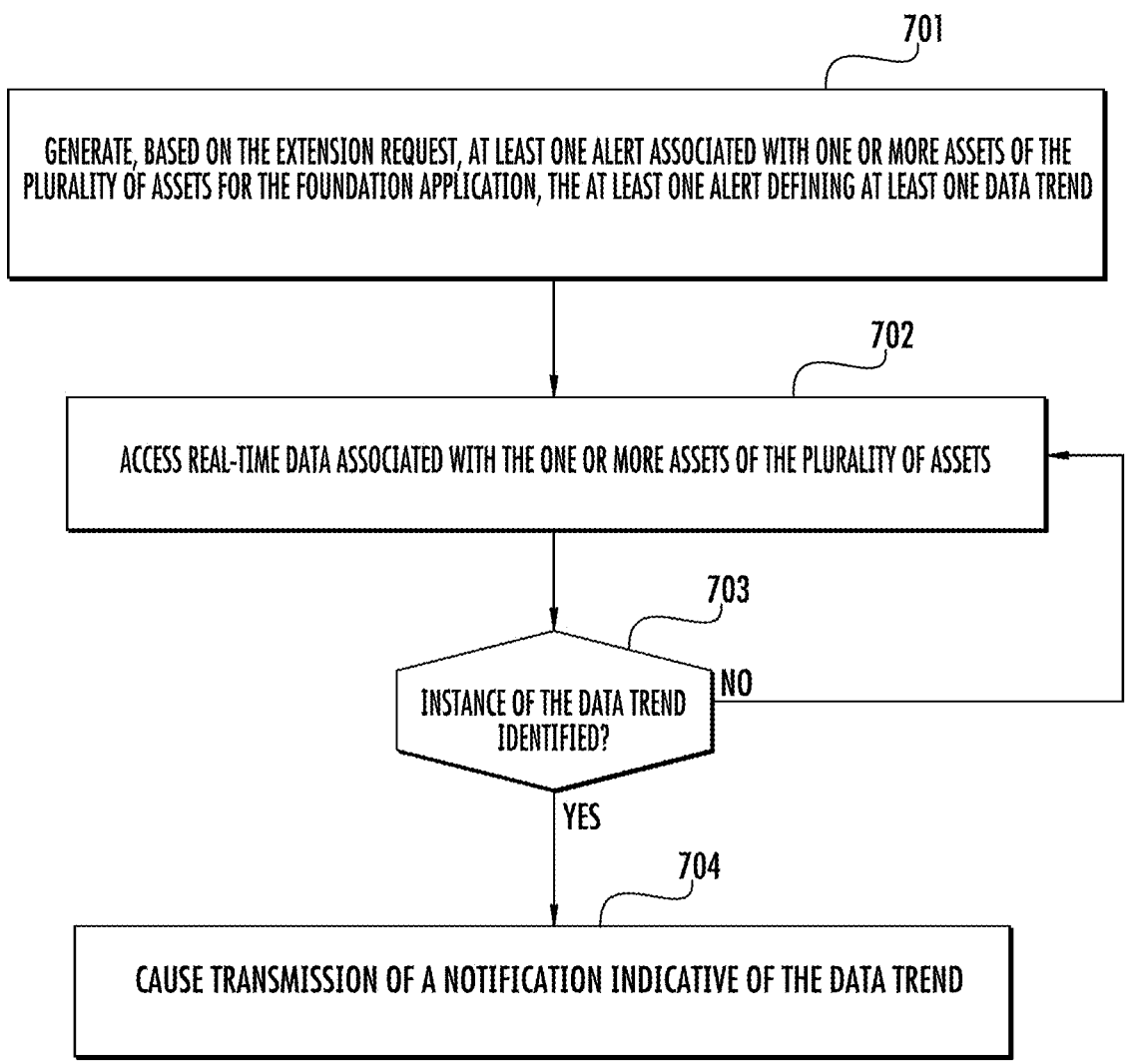
FIG. 7A illustrates a flow diagram of operations related to determining output data based on an extension request associated with an alert, in accordance with one or more embodiments described herein.

As one example, in some embodiments, an extension request related to an addition or modification of a seeded template for an alert is received. In this regard, turning to FIG. 7A, block 701 generates (e.g., by CPU 320 and/or the like), based on the extension request, at least one alert associated with one or more assets for the foundation application, with the at least one alert defining at least one data trend.

Figure 7B:
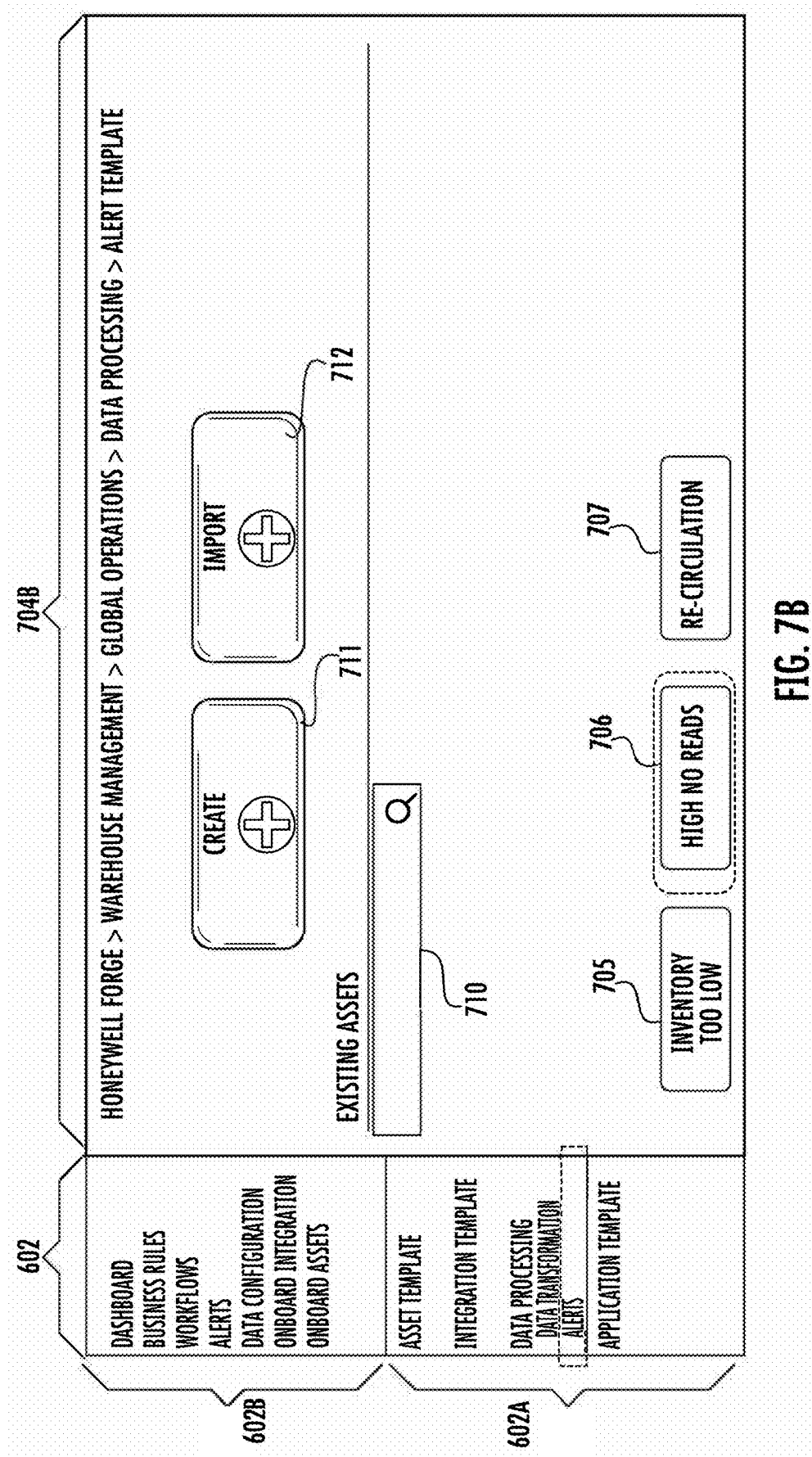
FIG. 7B illustrates an example electronic interface of an example foundation application from which an extension request related to a creation and/or modification of a template for an alert can be generated, in accordance with one or more embodiments described herein.
Figure 7C:
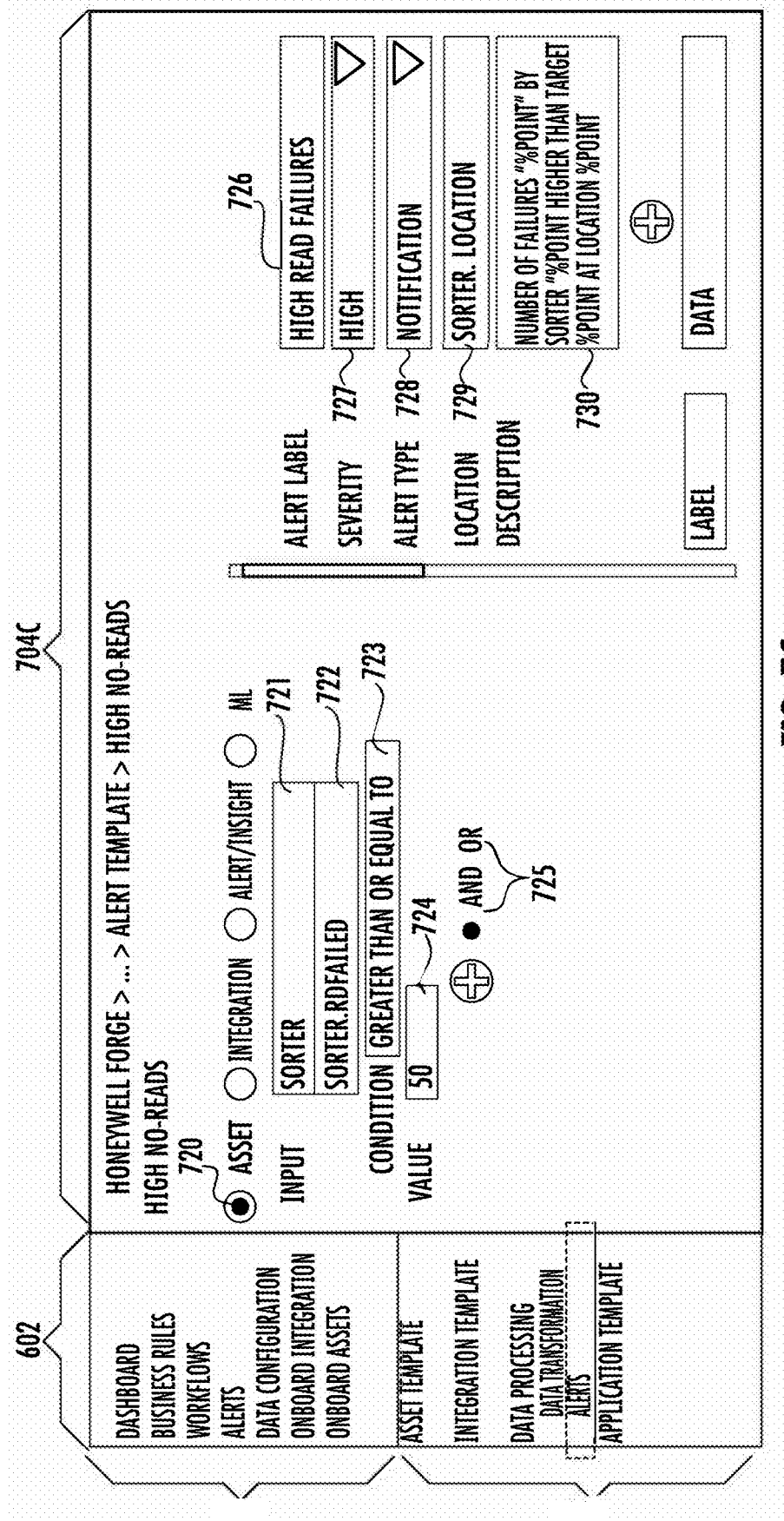
FIG. 7C illustrates an example electronic interface of an example foundation application from which an extension request related to a creation and/or modification of a template for an alert can be generated, in accordance with one or more embodiments described herein.

For example, FIGS. 7B and 7C show example electronic interfaces providing the ability for an end user to configure enterprise-level seeded templates for alerts. For example, in some embodiments, in response to a user selection of the "Alerts" option under "Data Processing" in the sidebar portion 602A, a sub-interface 704B is rendered. In some embodiments, the sub-interface 704B includes selectable icons representing seeded templates for alerts which have been previously defined and/or generated (e.g., "Existing Alerts"). For example, as shown, sub-interface 704B includes icons for several templates for alerts including an "Inventory Too Low" alert template 705, a "High No-Reads" alert template 706, and a "Re-Circulation" alert template 707.

As shown, the sub-interface 704B also optionally includes a search bar 710 to locate icons for existing templates. For example, in some embodiments, the sub-interface 704B may include a large number of icons for existing alert templates, such that a user enters the text "high" in the search bar and the "High No Reads" template 706 (and/or other templates containing the term "high") is highlighted, displayed separate from other existing alert templates, and/or otherwise indicated to the user. The sub-interface 704B also optionally includes selectable options 711 and 712 for creating a custom alert template or importing a template for an alert.

In some embodiments, for example, upon selection of the icon for the "High No-Reads" alert template 706, another sub-interface 704C is rendered, as shown in FIG. 7C. For example, in some embodiments, sub-interface 704C comprises various UI elements for configuring, modifying and/ or defining an alert template, such as the "High No Reads" alert template.

In the example sub-interface 704C shown in FIG. 7C, an alert for a particular asset is defined, as shown by the selection of the asset button 720. In some embodiments, alerts for integrations, insights, and/or ML model-based alerts (e.g., alerts based on a ML prediction) may be configured and/or extended through selecting an associated button as shown. In the example shown in FIG. 7C, the sub-interface 704C provides for an end user to input conditional logic defining the alert template. As shown, the "Sorter" asset is provided to the "Input" selection box 721, and the property "RdFailed" for the Sorter asset is selected as the property for the alert template in input box 722. As shown, the "Condition" input box 723 is set to "Greater than or equal to," and the "Value" input box 724 is set to "50." In other words, the enterprise-level alert template is configured such that a notification will be transmitted in an instance in a data trend is identified, such as, for example, in an instance in which a number of read failures meets or exceeds 50. In some embodiments, additional conditions can be set by selecting "AND" or "OR" buttons 725.

Additional parameters for the alert template may also be configured. For example, a textual label for the alert template may be defined in the "Alert Label" input box 726. A severity level (e.g., low, medium, high, etc.) may also be defined in the "Severity" input box 727. An alert type may be defined in the "Alert Type" box 728. As shown, the type is "Notification," meaning a notification (e.g., a message, such as a text message, email, phone call, push notification, and/or other type of notification) is to be provided to one or more devices (e.g., user devices) such that a system administrator, engineer, and/or the like is notified of the data trend. In some embodiments, a location of the asset may be provided in the notification, and defined in the "Location" input box 729. As shown, the location input into the "Location" input box 729 is a "Location" property of the "Sorter" asset, indicated as "Sorter. Location." In some embodiments, a textual description of the data trend may be provided in the "Description" input box 730.

Figure 7D:
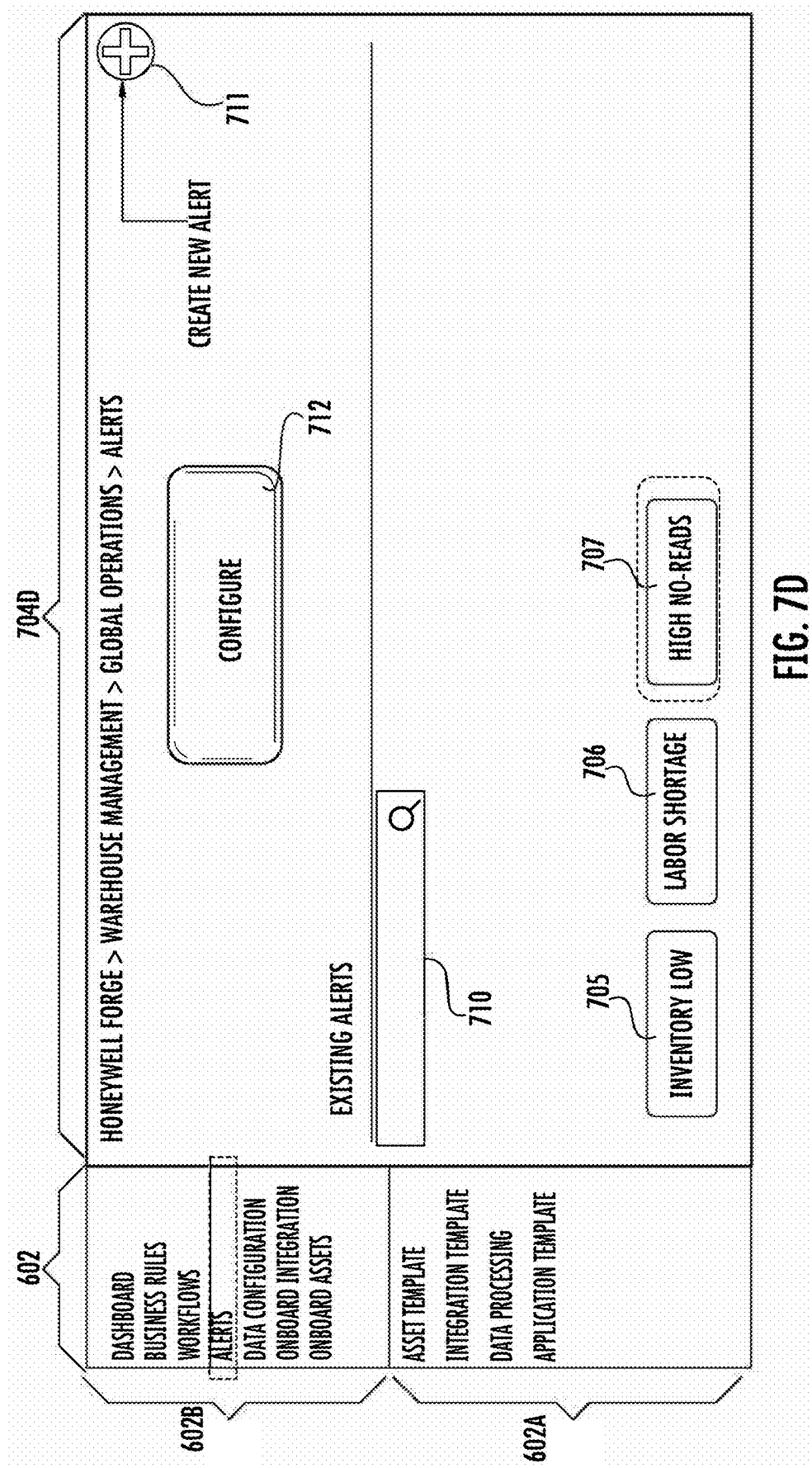
FIG. 7D illustrates an example electronic interface of an example foundation application facilitating instantiation of asset site-specific templates for alerts, in accordance with one or more embodiments described herein.
Figure 7E:
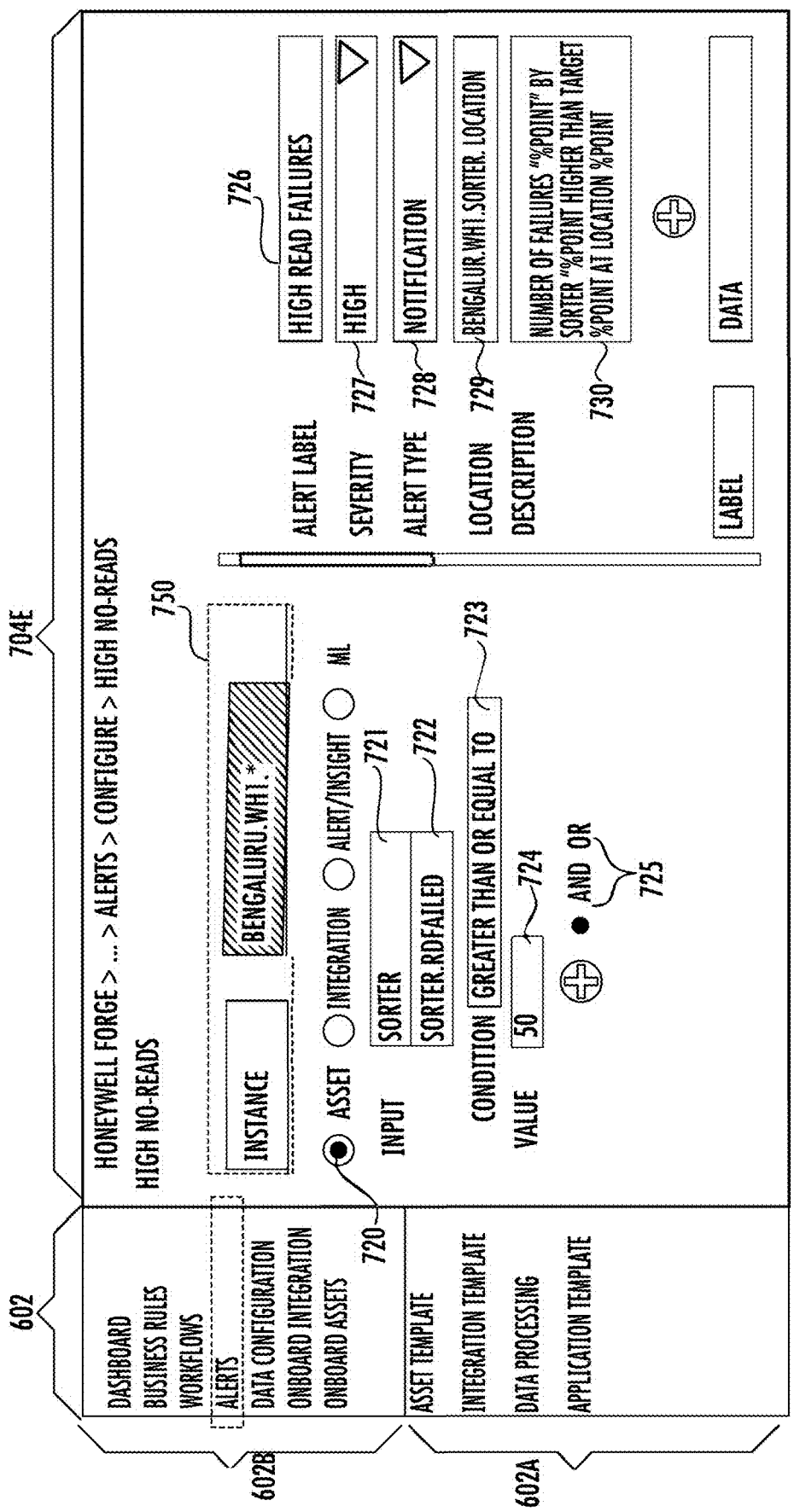
FIG. 7E illustrates an example electronic interface of an example foundation application facilitating instantiation of asset site-specific templates for alerts, in accordance with one or more embodiments described herein.

FIGS. 7D and 7E show example electronic interfaces providing the ability for an end user at a particular asset site to configure and/or instantiate asset site-specific templates based on the enterprise-level seeded templates for alerts. For example, in response to selection of the "Alerts" option on the sidebar portion 602B, a sub-interface 704D is rendered. In some embodiments, the sub-interface 704D includes icons selectable seeded templates for alerts which have been previously defined and/or generated (e.g., "Existing Alerts"). For example, as shown, sub-interface 704D provides visibility for several alerts including an "Inventory Too Low" alert template 705, a "High No Reads" alert template 706, and a "Re-Circulation" alert template 707 described above in connection with FIG. 7B.

As shown, in some embodiments, the sub-interface 704D also optionally includes a search bar 710 to locate existing templates for alerts. In some embodiments, the sub-interface 704D also optionally includes selectable options 711 for creating a new alert template and 712 for configuring an existing template for an alert.

In some embodiments, for example, upon selection of the "High No Reads" alert template 706 (and optionally subsequent selection of "Configure" option 712), another sub-interface 704E is rendered, as shown in FIG. 7E. For example, in some embodiments, sub-interface 704E comprises various UI elements for extending an alert template for a particular asset site, such as the "High No Reads" alert template originally defined at enterprise-level (e.g., as shown in FIG. 7C). In this regard, a user can define an instance of the alert template for a particular asset site and configure the alert template for that particular instance. As shown in FIG. 7E, an example instance "Bengaluru.Wh1.*" is defined in instance box 750, which indicates that the alert is specific to a particular warehouse labeled "Wh1" located in Bengaluru, India. As shown, sub-interface 704E provides similar configuration options to sub-interface 704C of FIG. 7C. In this regard, a user can extend or modify the template for the alert specifically for the Bengaluru warehouse. As one example, sorters in the Bengaluru warehouse process highly important or sensitive materials and require a notification be issued when read failures reach 10, rather than 50 as defined by the enterprise-level template. The user may then modify the "Value" field to 10 rather than 50 read failures.

Returning to FIG. 7A, in some embodiments, once an alert is generated as described above, block 702 accesses real-time data associated with the one or more assets of the plurality of assets. For example, the real-time data that is accessed, in some embodiments, comprises real-time sensor data, time-series data, and/or other data related to the alert. Continuing with the example of FIG. 7C above, the real-time data comprises a read failure (e.g., "RdFailed") count. In some embodiments, as shown at decision point 703, it is determined whether an instance of the data trend defined by the alert is identified. For example, if the data trend is not identified, the process returns to step 702 and continues to access and/or monitor the real-time data. In some embodiments, if the data trend is identified, the process continues to block 704 which causes transmission (e.g., by the communication interface 360, CPU 320, and/or the like) of a notification indicative of the data trend. For example, in an instance in which the data trend of 50 or more read failures is identified, output data in the form of a notification is generated and transmitted to one or more devices.

In some embodiments, an extension request related to an addition or modification of a rule template (e.g., a business rule) is received. In this regard, turning to FIG. 8A, block 801 generates (e.g., by the CPU 320 and/or the like), based on the extension request, at least one rule associated with one or more assets for the foundation application.

Figure 8A:
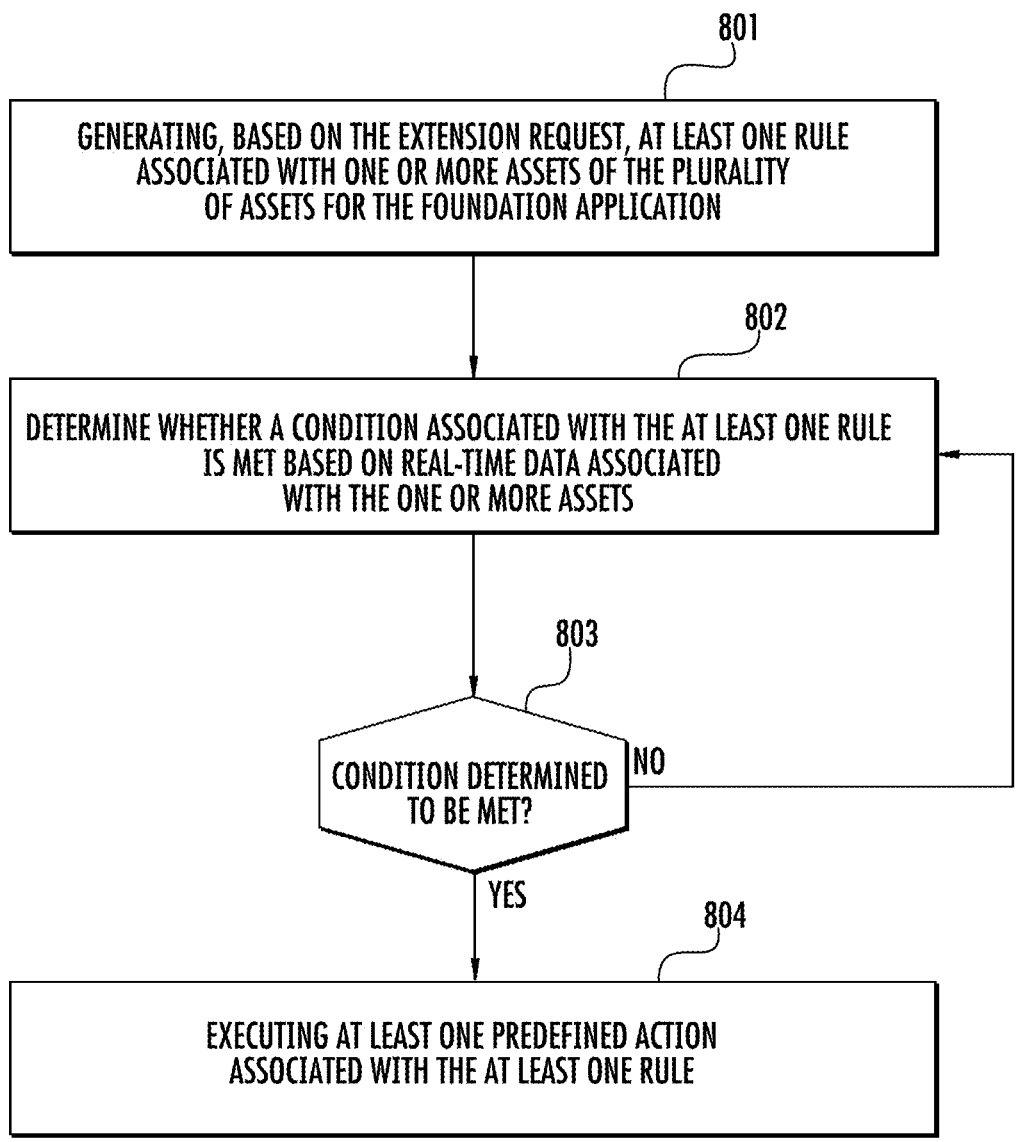
FIG. 8A illustrates a flow diagram of operations related to determining output data based on an extension request associated with at least one rule, in accordance with one or more embodiments described herein.
Figure 8B:
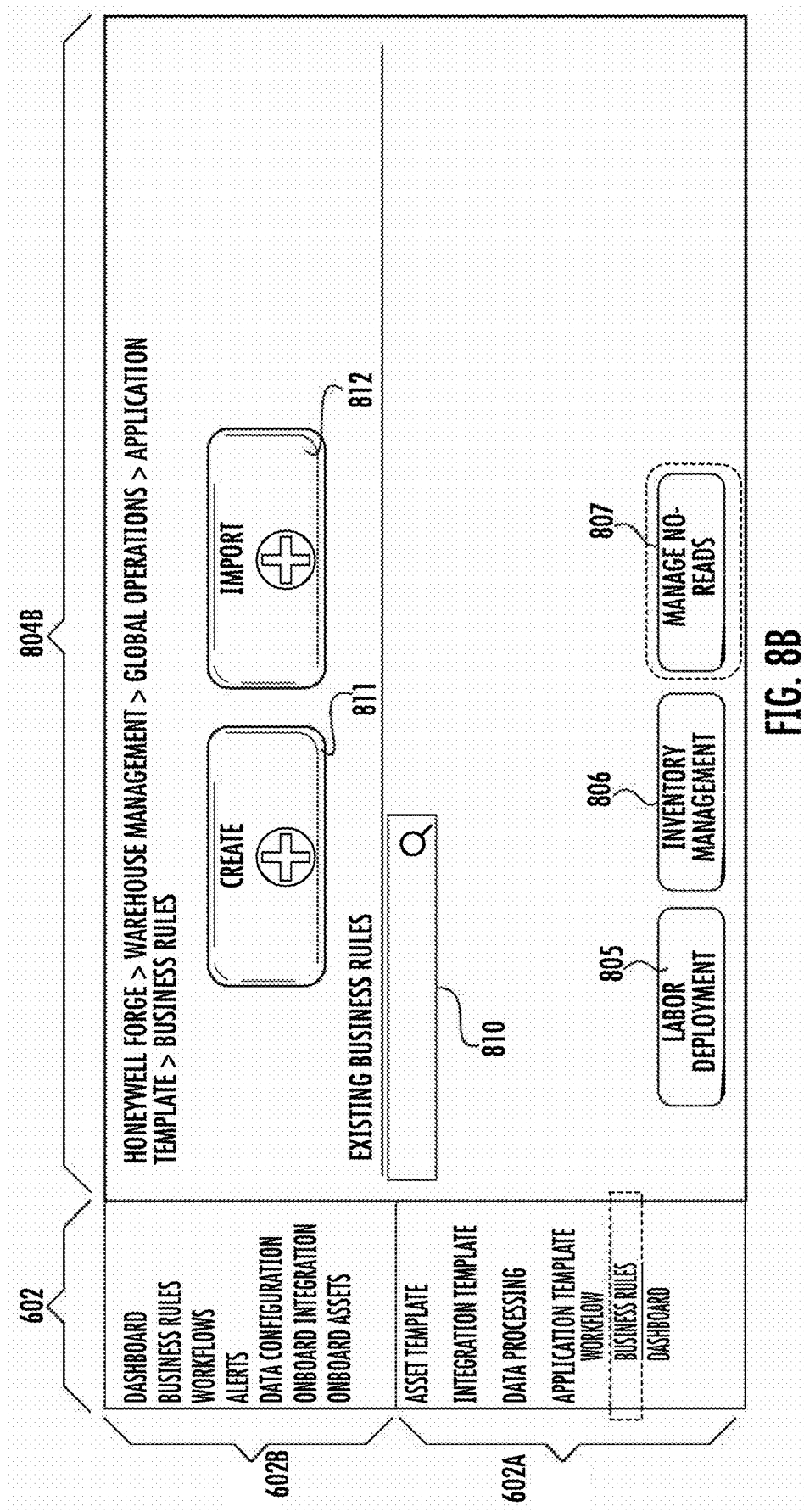
FIG. 8B illustrates an example electronic interface of an example foundation application from which an extension request related to a creation and/or modification of a template for a rule can be generated, in accordance with one or more embodiments described herein.
Figure 8C:
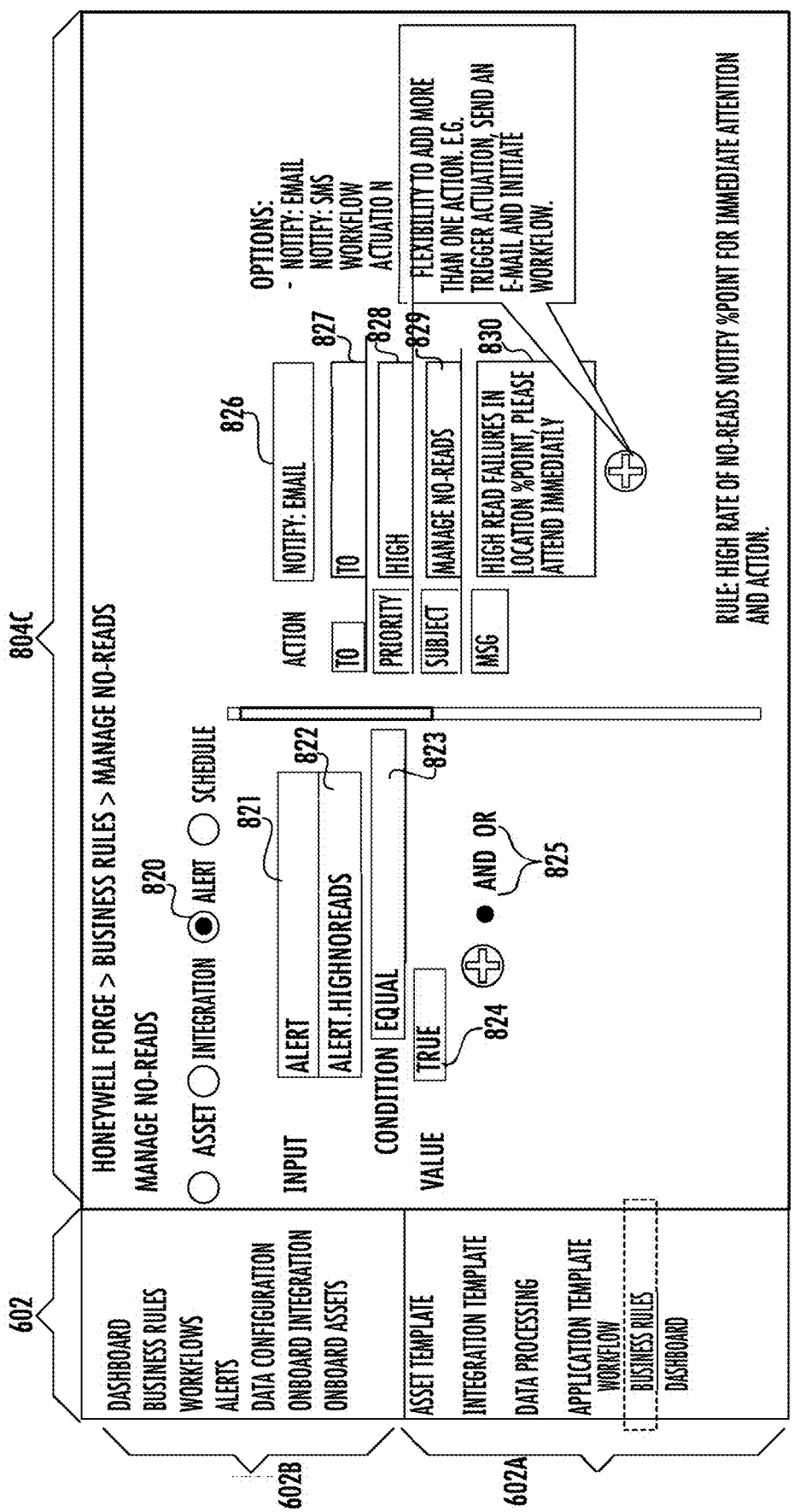
FIG. 8C illustrates an example electronic interface of an example foundation application from which an extension request related to a creation and/or modification of a template for a rule can be generated, in accordance with one or more embodiments described herein.

For example, FIGS. 8B and 8C show example electronic interfaces of a foundation application providing the ability for an end user to configure enterprise-level seeded templates for rules. For example, in some embodiments, in response to a user selection of the "Business Rules" option under "Application Template" in the sidebar 602, a sub-interface 804B is displayed. In some embodiments, the sub-interface 804B includes selectable icons representing seeded templates for business rules which have been previously defined and/or generated (e.g., "Existing Business Rules"). For example, as shown, sub-interface 804B for several rules including a "Labor Deployment" rule template 805, an "Inventory Management" rule template 806, and a "Manage No-Reads" rule template 807.

As shown, the sub-interface 804B also optionally includes a search bar 810 to locate icons for existing rule templates. For example, in some embodiments, the sub-interface 804B may include a large number of icons representing existing rule templates, such that a user enters the text "labor" in the search bar and the "Labor Deployment" rule template 805 (and/or other templates containing the term "labor") is highlighted, displayed separate from other existing alert templates, and/or otherwise indicated to the user. The sub-interface 704B also optionally includes selectable options 811 and 812 for creating a custom business rule template or importing a template for a business rule.

In some embodiments, for example, upon selection of the "Manage No-Reads" rule template 807, another sub-interface 804C is rendered, as shown in FIG. 8C. For example, in some embodiments, sub-interface 804C comprises various UI elements for configuring, modifying and/or defining a business rule template, such as the "Manage No-Reads" alert template.

In the example sub-interface 804C shown in FIG. 8C, a business rule for managing a particular alert is defined, as shown by the selection of the "Alert" button 820. In some embodiments, rules for integrations, assets, and/or schedule-based rules (e.g., a rule defining a repeated action to be taken, such as, for example, powering on warehouse lights at 8:00 AM daily at 50% intensity) may be configured and/or extended through selecting an associated button as shown.

In the example shown in FIG. 8C, the sub-interface 804C provides for an end user to input conditional logic related to an existing rule. As shown, "Alert" provided to the "Input" selection box 821, and the "Alert.HighNoReads" alert (described above in connection FIG. 7C) is selected as the particular alert for the business rule template in input box 822. As shown, the "Condition" is set to "Equal," and the "Value" is set to "TRUE." In other words, an enterprise-level business rule template is configured such that at least one predefined action will be executed in an instance in which an alert is triggered (e.g., set to "TRUE"), such as, for example, in an instance in which a number of read failures meets or exceeds 50, as defined by the "Alert.HighNo-Reads" alert template. In some embodiments, additional conditions can be set by selecting "AND" or "OR" buttons 825.

Additional parameters for the business rule template may also be configured. For example, a predefined action for the business rule can be defined in input box 826. In some embodiments, such as the example embodiment show in FIG. 8C, the predefined action comprises transmission of a notification (e.g., email, SMS text message, push notification) to one or more devices such that a system administrator, engineer, and/or the like is notified. Other examples of a predefined action include, but are not limited to, initiation of a workflow, a triggering of an actuation of one or more assets, and/or other actions.

In an instance in which the predefined action is defined as an email notification, additional input boxes 827-830 are rendered such that the user can define fields of the email notification, such as a recipient in the "To" input box 827, a priority level (e.g., low, medium, high, etc.) defined in the "Priority" input box 828, a subject for the email notification defined in the "Subject" box 829, and/or a textual message for the email notification defined in the "Msg" input box 830. An alert type is defined in the "Alert Type" box 728. As shown, the type is "Notification," meaning a notification (e.g., a message, such as a text message, email, phone call, push notification, and/or other type of notification) is to be provided to one or more devices (e.g., user devices) such that a system administrator, engineer, and/or the like is notified of information related to the triggered rule.

Figure 8D:
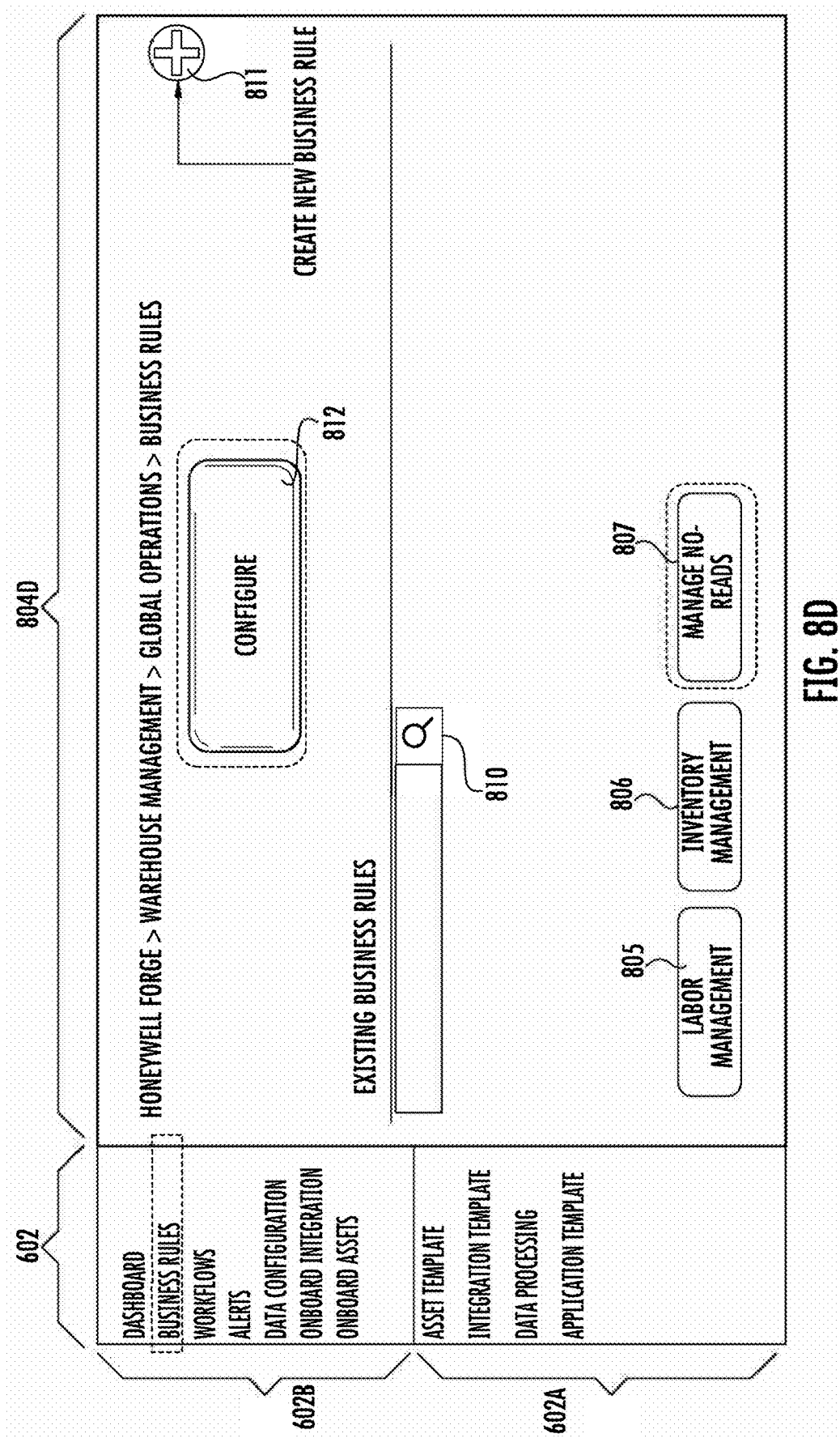
FIG. 8D illustrates an example electronic interface of an example foundation application facilitating instantiation of asset site-specific templates for rules, in accordance with one or more embodiments described herein.
Figure 8E:
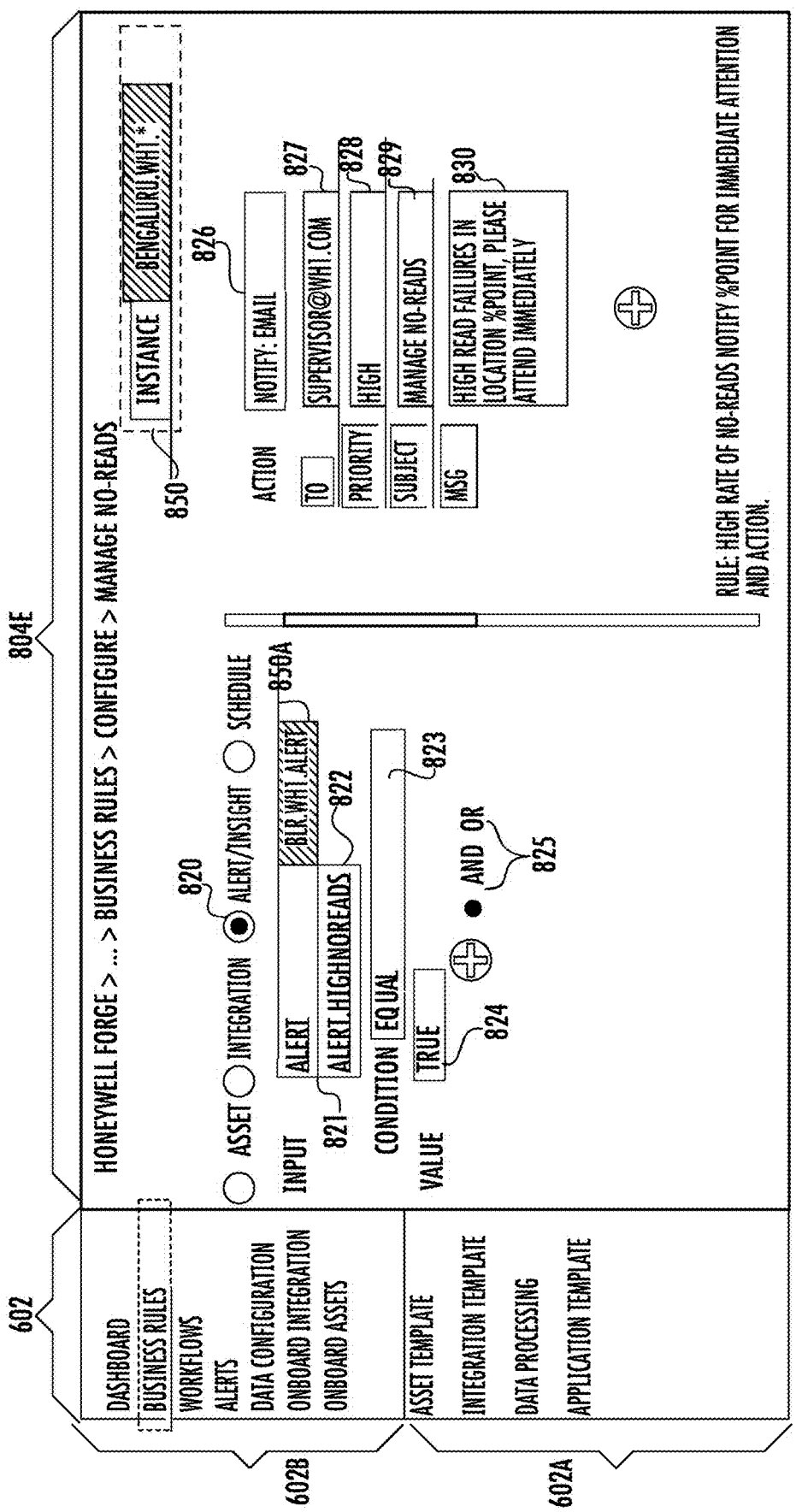
FIG. 8E illustrates an example electronic interface of an example foundation application facilitating instantiation of asset site-specific templates for rules, in accordance with one or more embodiments described herein.

FIGS. 8D and 8E show example electronic interfaces of a foundation application providing the ability for an end user at a particular asset site to configure and/or instantiate asset site-specific templates based on the enterprise-level seeded templates for rules and thereby extend the foundation application for the particular asset site. For example, in response to selection of the "Business Rules" option on the sidebar portion 602B, a sub-interface 804D is rendered. In some embodiments, the sub-interface 804D includes selectable seeded templates for rules which have been previously defined and/or generated (e.g., "existing business rules"). For example, as shown, sub-interface 804D provides visibility for several seeded templates for rules including a "Labor Deployment" rule template 805, an "Inventory Management" rule template 806, and a "Manage No-Reads" rule template 807, as described above in connection with FIG. 8B.

As shown, the sub-interface 804D also optionally includes a search bar 810 to locate existing templates for rules. The sub-interface 804D also optionally includes selectable options 811 for creating a new rule template and 812 for configuring an existing template for a rule.

In some embodiments, for example, upon selection of the "Manage No-Reads" rule template 807 (and optionally subsequent selection of "Configure" option 812), another sub-interface 804E is rendered, as shown in FIG. 8E. For example, in some embodiments, sub-interface 804E comprises various UI elements for extending a rule template for a particular asset site, such as the "Manage No-Reads" rule template originally defined at enterprise-level (e.g., described above in connection with FIG. 8C). In this regard, a user can define an instance of the rule template for a particular asset site and configure the rule template for that particular instance. As shown, an example instance "Bengaluru.Wh1.*" is defined in instance box 850, which indicates that the alert is specific to a particular warehouse labeled "Wh1" located in Bengaluru, India. As shown, sub-interface 804E provides similar configuration options to sub-interface 804C of FIG. 8C. In this regard, a user can extend or modify the template for the rule specifically for the Bengaluru warehouse. For example, as shown, the rule template is extended to incorporate the "High No Reads" alert specifically instantiated for the Bengaluru warehouse ("Blr.Wh1.Alert") in instance input box 850A, which triggers a notification when no-reads meet or exceed 10. The user also modify additional parameters of the rule for the particular warehouse, such as additional email addresses to which the notification is sent, a different message for the notification, and/or other parameters.

Returning to FIG. 8A, in some embodiments, once the at least one rule is generated as described above, block 802 determines whether a condition associated with the at least one rule is met based on real-time data associated with the one or more assets associated with the rule. For example, real-time data associated with the one or more assets can be accessed, in some embodiments, comprises real-time sensor data, time-series data, and/or other data related to the alert. Continuing with the example of FIG. 8C above, the real-time data may comprise a triggering of an alert related to a read failure (e.g., "RdFailed") count. In some embodiments, as shown at decision point 803, it is determined whether the condition is determined to be met. For example, if the condition is determined to not be met, the process returns to step 802 and continues to access and/or monitor the real-time data to determine whether the condition is met. In some embodiments, if the condition is determined to be met, the process continues to block 804 which executes (e.g., by the communication interface 360, CPU 320, and/or the like) at least one predefined action associated with the at least one rule.

For example, in an instance in which the "Alert.HighNo-Reads" alert is triggered, a predefined action associated with the at least one rule is executed. For example, in some embodiments, the execution of the predefined action comprises generating and transmitting a notification to one or more devices. In some embodiments, the execution of the predefined action comprises triggering an actuation of one or more assets. For example, the actuation may comprise a temporary shutdown and/or restart of the sorter asset due to the "Alert.HighNoReads" alert being triggered. In some embodiments, an actuation comprises a shutdown, restart, a powering on of the asset, and/or other actions.

Figure 9A:
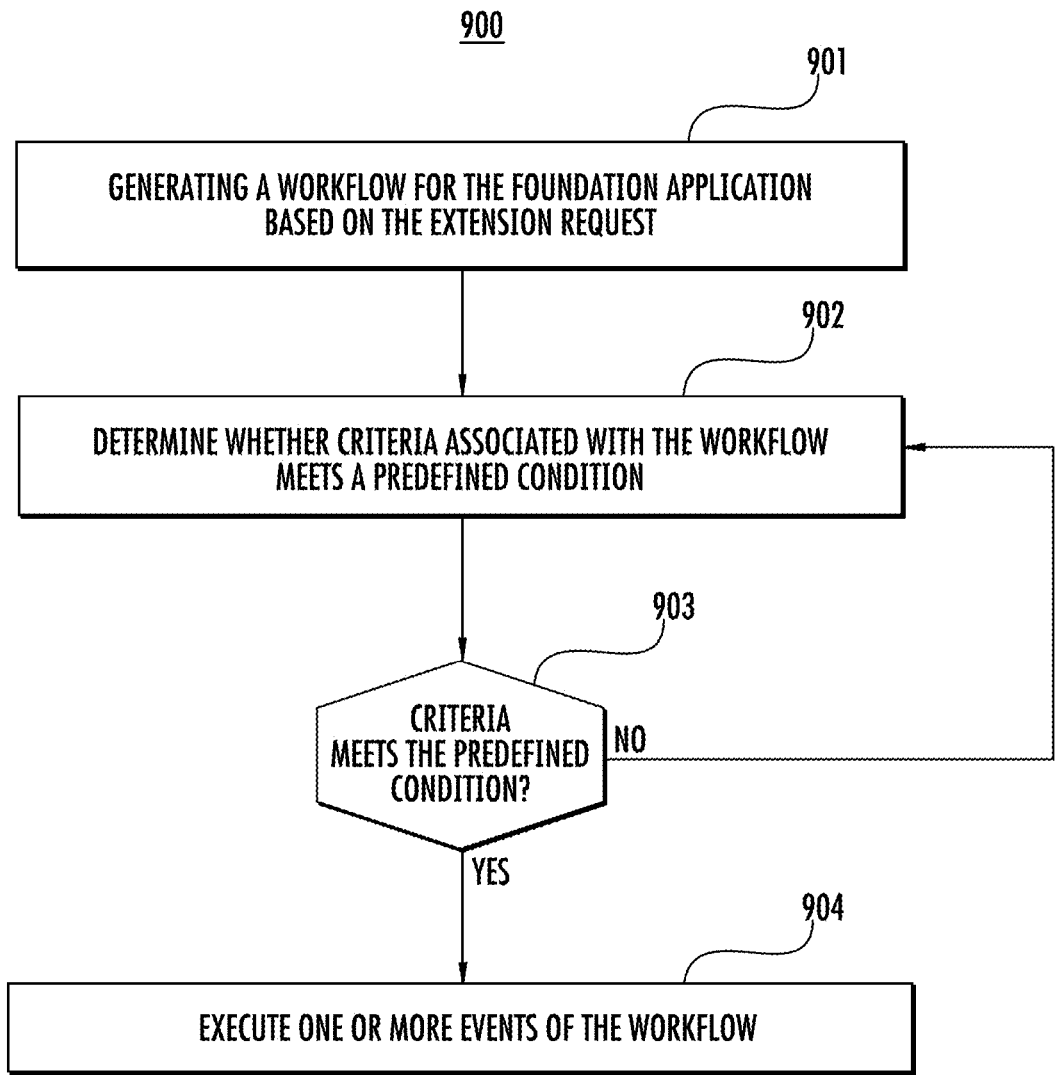
FIG. 9A illustrates a flow diagram of operations related to determining output data based on an extension request associated with a workflow, in accordance with one or more embodiments described herein.

In some embodiments, the execution of the predefined action comprises initializing one or more workflows. Turning to FIG. 9A, an example process 900 for generating a workflow based on an extension request is depicted. Block 901 generates (e.g., by the CPU 320 and/or the like) a workflow for the foundation application based on the extension request.

Figure 9B:
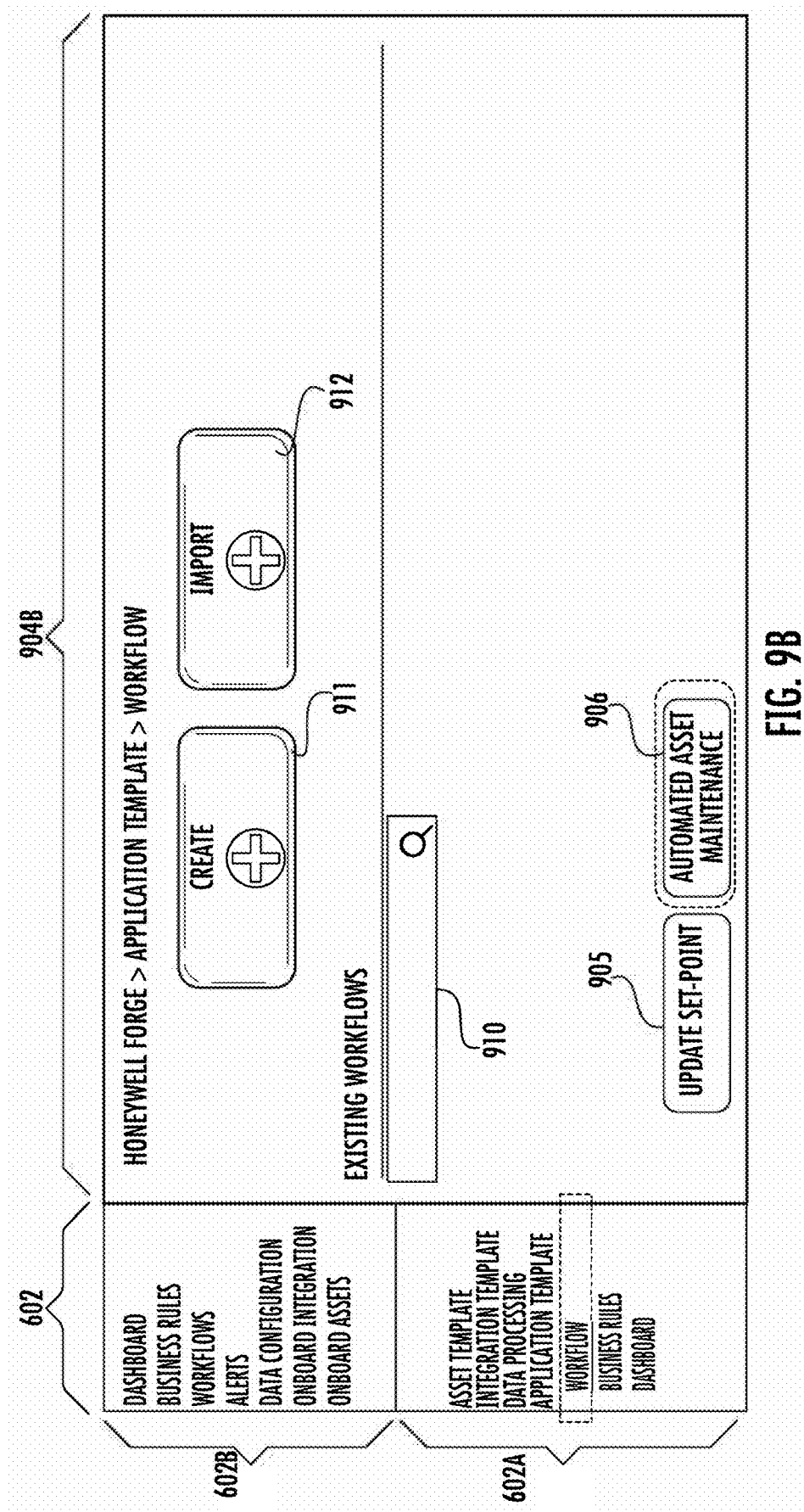
FIG. 9B illustrates an example electronic interface of an example foundation application from which an extension request related to a creation and/or modification of a template for a workflow can be generated, in accordance with one or more embodiments described herein.
Figure 9C:
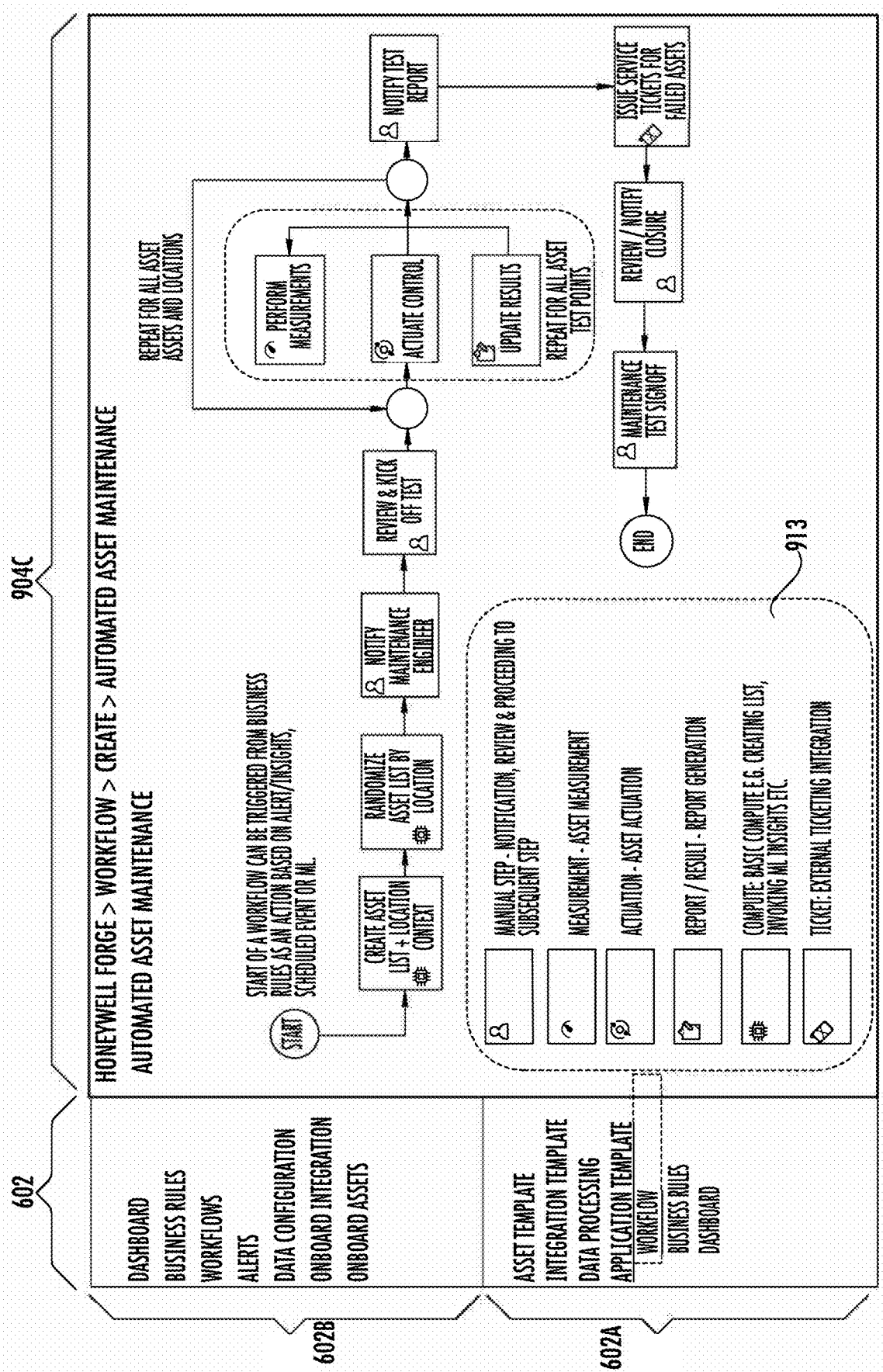
FIG. 9C illustrates an example electronic interface of an example foundation application from which an extension request related to a creation and/or modification of a template for a workflow can be generated, in accordance with one or more embodiments described herein.

For example, FIGS. 9B and 9C show example electronic interfaces of a foundation application providing the ability for an end user to configure enterprise-level seeded templates for workflows. For example, in some embodiments, in response to a user selection of the "Workflow" option under "Application Template" in the sidebar 602, a sub-interface 904B is displayed. In some embodiments, the sub-interface 904B includes selectable icons representing seeded templates for workflows which have been previously defined and/or generated (e.g., "Existing Workflows"). For example, as shown, sub-interface 904B includes icons for several templates for workflows including a "Update Set-Point" workflow template 905 and a "Automated Asset Maintenance" workflow template 906.

As shown, the sub-interface 904B also optionally includes a search bar 910 to locate existing workflow templates. For example, in some embodiments, the sub-interface 904B may include a large number of icons for existing workflow templates, such that a user enters the text "update" in the search bar and the "Update Set-Point" workflow template 905 (and/or other templates, such as rule templates, containing the term "update") is highlighted, displayed separate from other existing alert templates, and/or otherwise indicated to the user. The sub-interface 904B also optionally includes selectable option 911 for creating a custom workflow template and selectable option 912 for importing a template for a workflow.

In some embodiments, for example, upon selection of the "Automated Asset Maintenance" workflow template 906, another sub-interface 904C is rendered, as shown in FIG. 9C. For example, in some embodiments, sub-interface 904C comprises various UI elements for configuring, modifying and/or defining an enterprise-level workflow template, such as the "Automated Asset Maintenance" workflow template.

In the example sub-interface 904C shown in FIG. 8C, a template for a workflow for automated asset maintenance is defined. In some embodiments, a workflow comprises a series of events to be executed in order to handle one or more tasks. For example, upon a business rule being triggered, a workflow may be initialized and the series of events can then be carried out. In some embodiments, the events of a workflow can include manual events (e.g., a notification of a system engineer and/or events that require human intervention), measurement events (e.g., a measurement of data related to one or more assets), actuation events (e.g., actuation of one or more assets), computation events (e.g., performing one or more computations related to asset data such as list creation, machine learning invocation, data transformation, and/or the like), reporting events (e.g., report generation), ticketing events (e.g., events related to external ticketing service integration), and/or other events. In some embodiments, as shown, sub-interface 904C provides a drag-and-drop workflow configuration tool via event selection box 913. For example, a user may select and/or drag one or more events from event selection box 913 onto the sub-interface 904C in order to connect the one or more events with other events of the workflow.

Figure 9D:
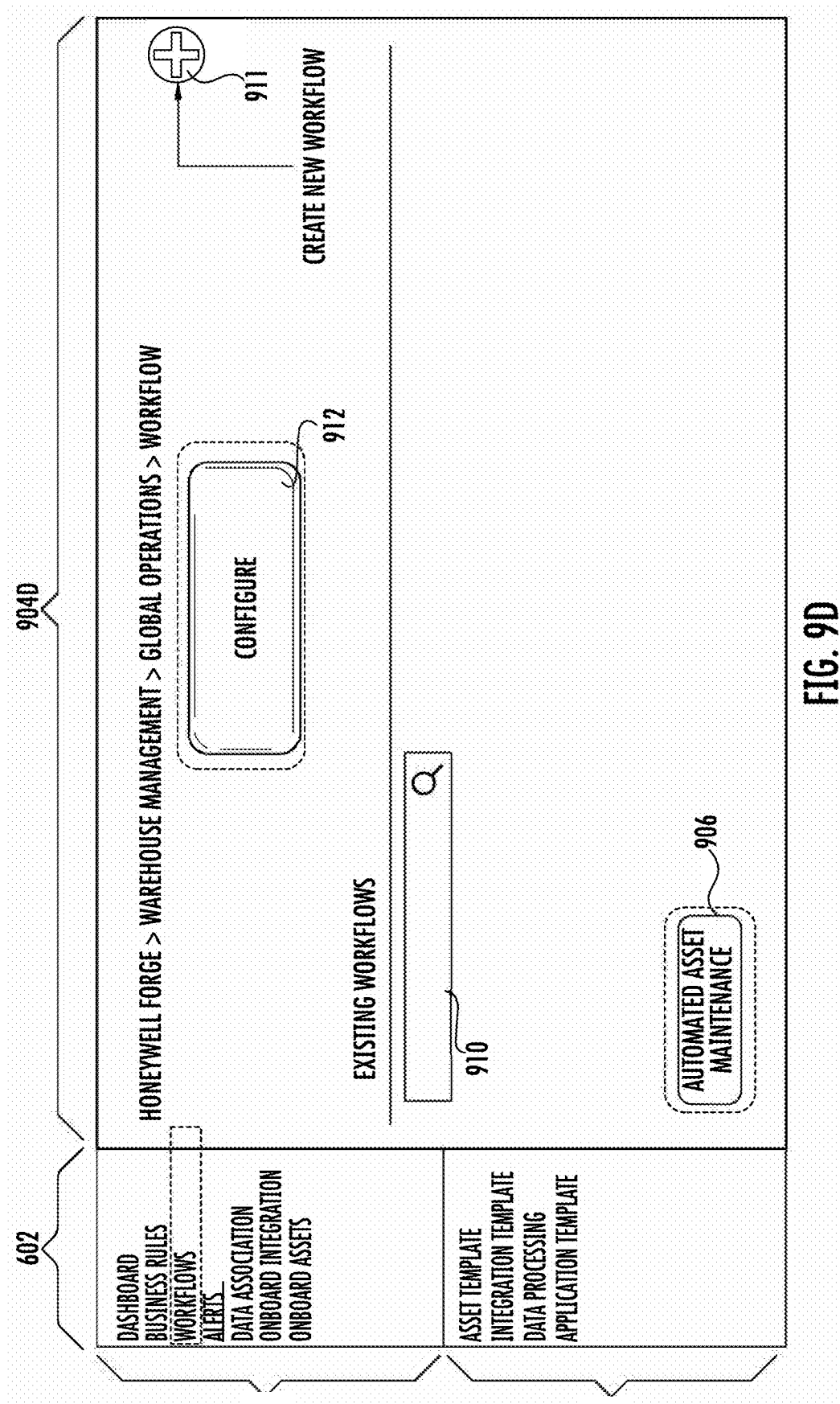
FIG. 9D illustrates an example electronic interface of an example foundation application facilitating instantiation of asset site-specific templates for workflows, in accordance with one or more embodiments described herein.
Figure 9E:
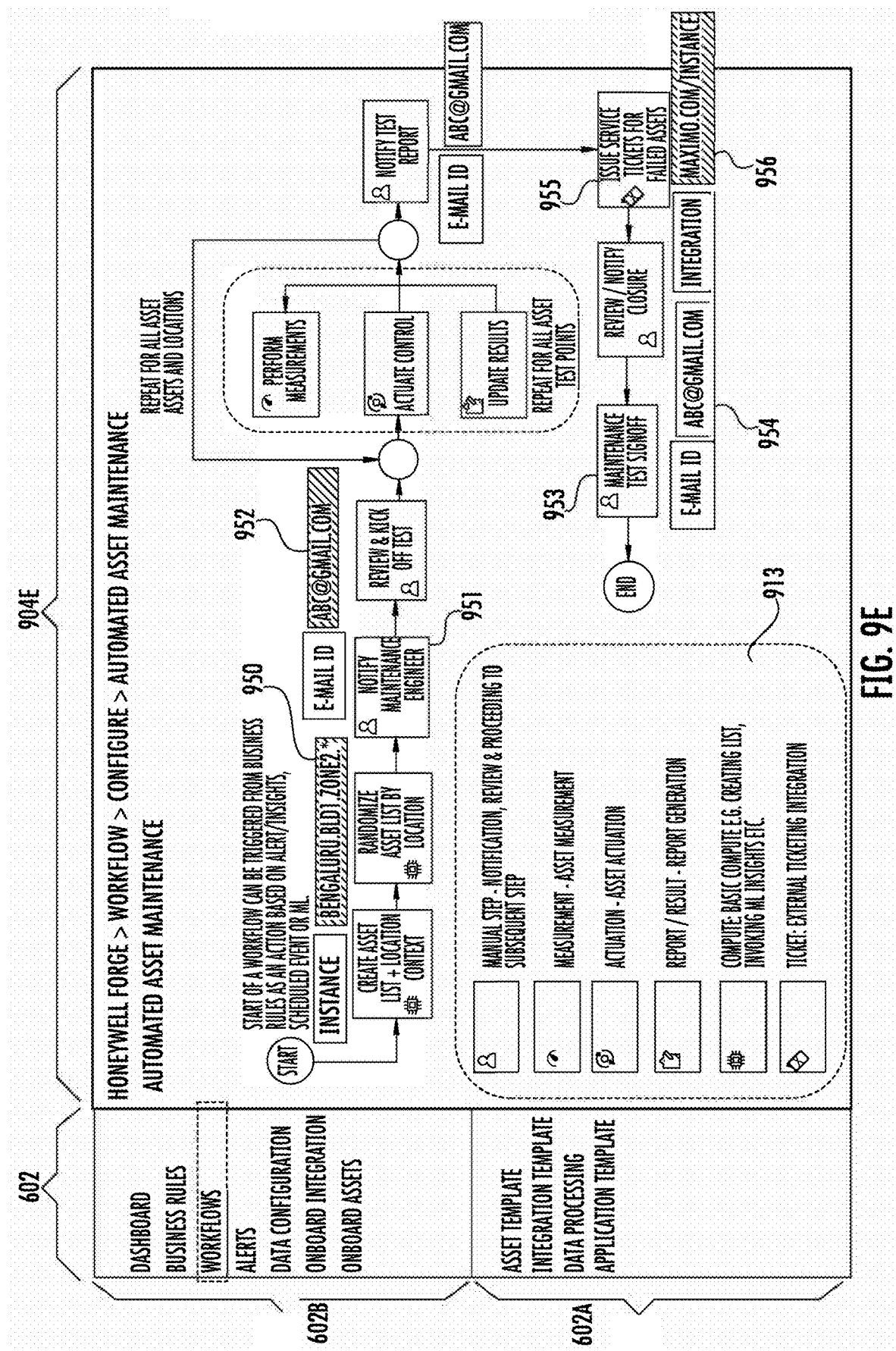
FIG. 9E illustrates an example electronic interface of an example foundation application facilitating instantiation of asset site-specific templates for workflows, in accordance with one or more embodiments described herein.

FIGS. 9D and 9E show example electronic interfaces providing the ability for an end user at a particular asset site to configure and/or instantiate asset site-specific workflow templates based on the enterprise-level seeded templates for workflows. For example, in FIG. 9D, in response to selection of the "Workflows" option on the sidebar portion 602B, a sub-interface 904D is rendered. In some embodiments, the sub-interface 904D includes selectable seeded templates for workflows which have been previously defined and/or generated (e.g., "existing workflows"). For example, as shown, sub-interface 704D provides visibility for the "Automated Asset Maintenance" workflow template 906 as described above in connection with FIG. 9B.

As shown, the sub-interface 904D also optionally includes a search bar 910 to locate existing templates for alerts. The sub-interface 904D also optionally includes selectable options 911 for creating a new workflow template and 912 for configuring an existing template for a workflow.

In some embodiments, for example, upon selection of the "Automated Asset Maintenance" workflow template 906 (and optionally subsequent selection of "Configure" option 912), another sub-interface 904E is rendered, as shown in FIG. 9E. For example, in some embodiments, sub-interface 904E comprises various UI elements for extending a workflow template for a particular asset site, such as the "Automated Asset Maintenance" workflow template originally defined at enterprise-level (e.g., in FIG. 9C). In this regard, a user can define an instance of the workflow template for a particular asset site and configure the workflow template for that particular instance. As shown in FIG. 9E, an example instance "Bengaluru.Bld1.Zone2.*" is defined in instance box 950, which indicates that the workflow is specific to a particular zone (e.g., "Zone2") in a particular building labeled "Bld1" located in Bengaluru, India. As shown, sub-interface 904E provides similar workflow configuration options to sub-interface 904C of FIG. 9C. In this regard, a user can extend or modify the template for the workflow specifically for the zone within the Bengaluru building. As one example, as shown, the "Notify Maintenance Engineer" manual step 951 is extended to include an email identifier 952 for the maintenance engineer(s) to be notified. Additionally, as shown, the "Maintenance Test Signoff" manual step 953 is also extended to include an email identifier 954 for the responsible party to manually perform the step 953. Further, the "Issue Service Tickets for Failed Assets" integration step 955 is extended to include reference to an external service integration 956 for performing the step 955.

Returning to FIG. 9A, in some embodiments, once the workflow is generated as described above, block 902 determines whether criteria associated with the workflow meets a predefined condition. For example, in some embodiments, criteria associated with the workflow comprises one or more business rules. In this regard, determining whether criteria associated with the workflow meets a predefined condition may comprise determining whether a business rule associated with the workflow has been triggered. In some embodiments, as shown at decision point 903, it is determined whether the condition is determined to be met. For example, if the criteria is determined to not meet the predefined condition, the process returns to step 902. In some embodiments, if the criteria is determined to meet the predefined condition, the process continues to block 904 which executes (e.g., by the communication interface 360, CPU 320, and/or the like) one or more events of the workflow. For example, in some embodiments, the execution of one or more events comprises actuation of one or more assets of the plurality of assets, a data transformation associated with one or more assets of the plurality of assets, and/or another event as described above, based on the workflow.

Figure 10A:
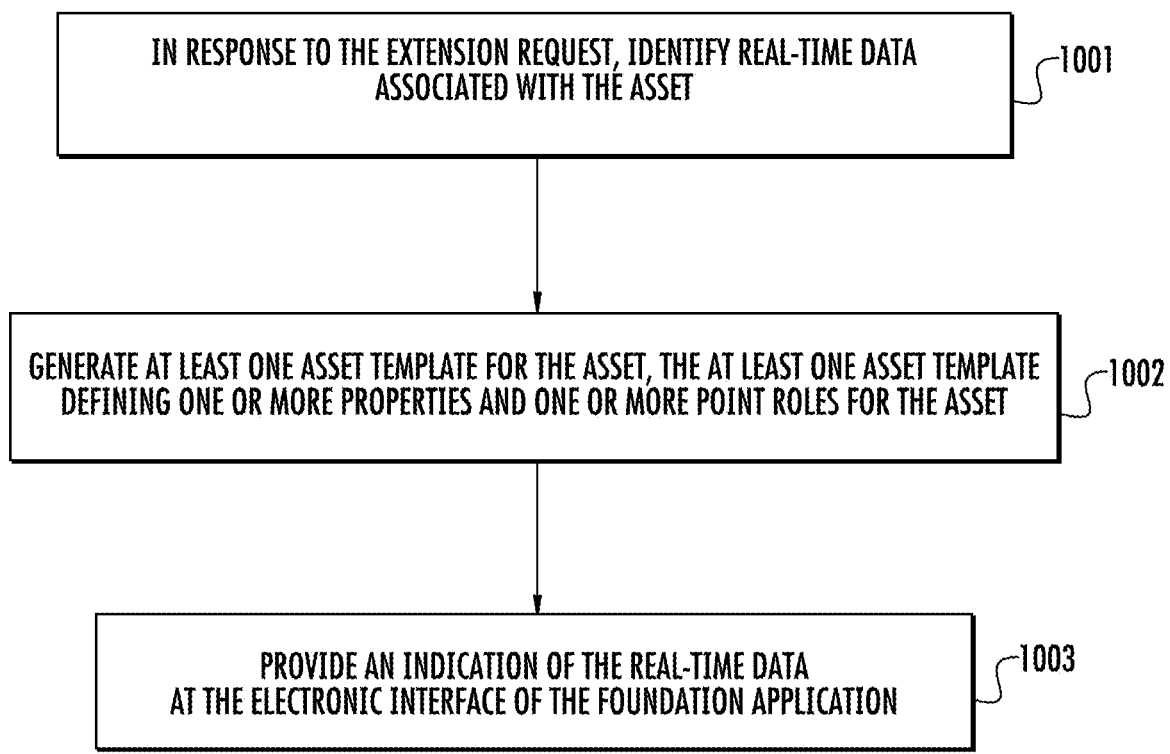
FIG. 10A illustrates a flow diagram of operations related to onboarding of an asset based on an extension request, in accordance with one or more embodiments described herein.

In some embodiments, an extension request related to an onboarding of an asset is received. In this regard, turning to FIG. 10A, block 1001 identifies (e.g., by CPU 320, communication interface 360, and/or the like), in response to the extension request, real-time data associated with an asset.

Figure 10B:
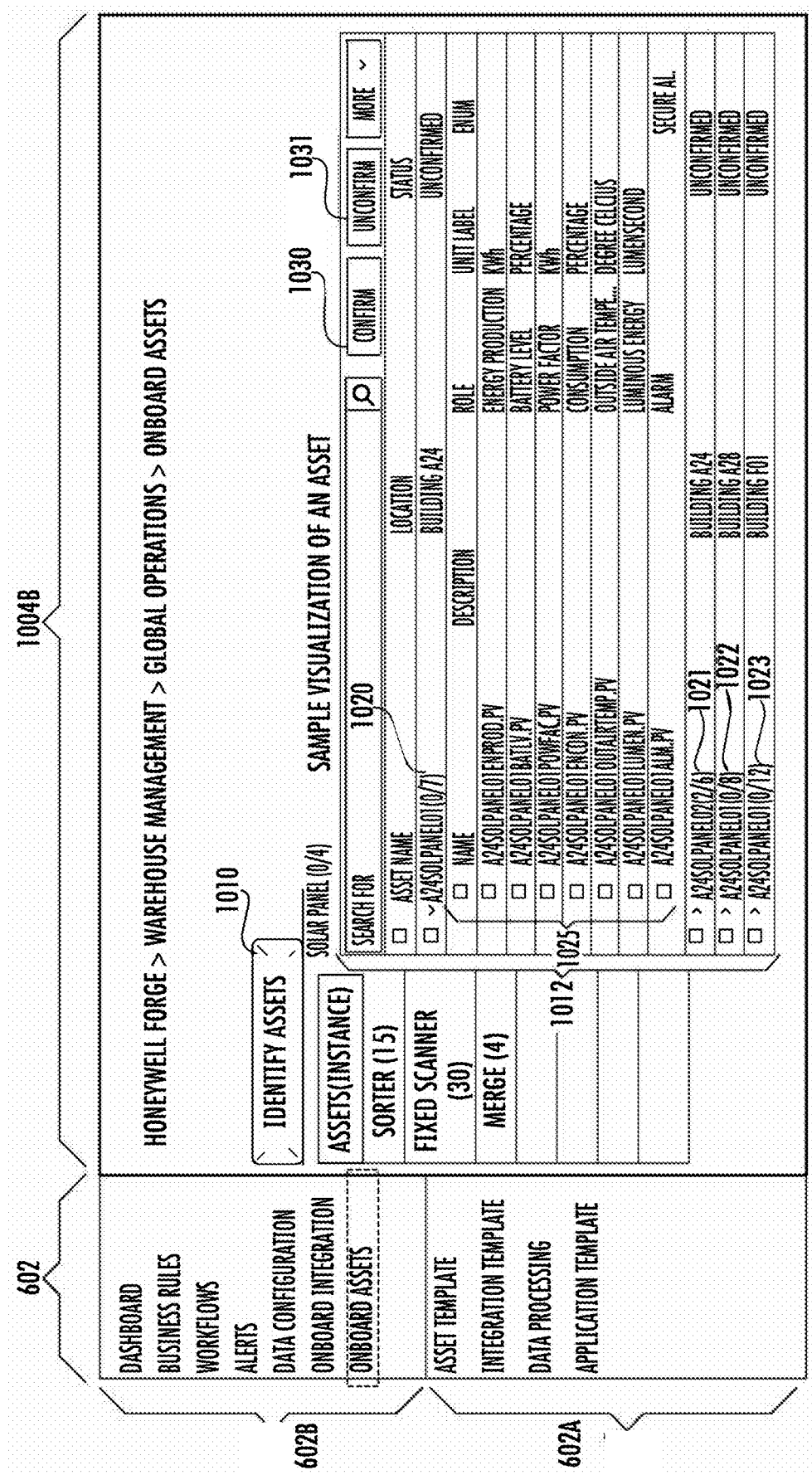
FIG. 10B illustrates an example electronic interface of an example foundation application facilitating onboarding of one or more assets, in accordance with one or more embodiments described herein.

For example, FIG. 10B shows an example electronic interface providing the ability for an end user to identify and onboard one or more assets and/or data related to one or more assets at a particular asset site. In some embodiments, in response to a user selection of the "Onboard Assets" option of sidebar portion 620A, a sub-interface 1004B is rendered. As shown, sub-interface 1004B comprises an "Identify Assets" button 1010, which, upon selection, causes identification of real-time data associated with one or more assets at a particular asset site. For example, real-time data that is identified may be rendered in a list format as shown in table 1012. As shown, table 1012 lists a plurality of rows, each associated with a particular identified asset 1020, 1021, 1022, and 1023. In some embodiments, each row is expandable to display an additional table comprising plurality of data points associated with the asset. For example, as shown, the row for asset 1020 is expanded to show table 1025, which lists a plurality of data points associated with a solar panel asset. The table 1025 comprises information related to the data points such as an indication of the name, role, description, unit label, and enumerated value of the data point.

In some embodiments, each row of the tables 1025 and/or 1012 are selectable and/or editable. For example, a textual description of a data point may be added under the "Description" column for the data point(s) listed in table 1025, and names, locations, and/or other information of the assets and/or data points may be modified.

In some embodiments, once information related to an identified asset has been modified, a user can select "confirm" to complete an onboarding process of the asset. In some embodiments, upon selection of the "confirm" button 1030, an template related to the asset is generated and/or instantiated for the foundation application of the particular asset site. In this regard, block 1002 generates at least one asset template for the asset, with the at least one asset template defining one or more properties and one or more point roles for the asset. In some embodiments, a user may select the "unconfirm" button 1031 in order to modify the asset and/or data point(s) further.

In some embodiments, block 1003 provides an indication of the real-time data at the electronic interface of the foundation application. For example, upon completion of an onboarding of an asset, real-time data associated with various data points of the asset can be viewed and/or further processed at a dashboard and/or widget of dashboard visualization, further described below in connection with FIGS. 13A-E.

Figure 11A:
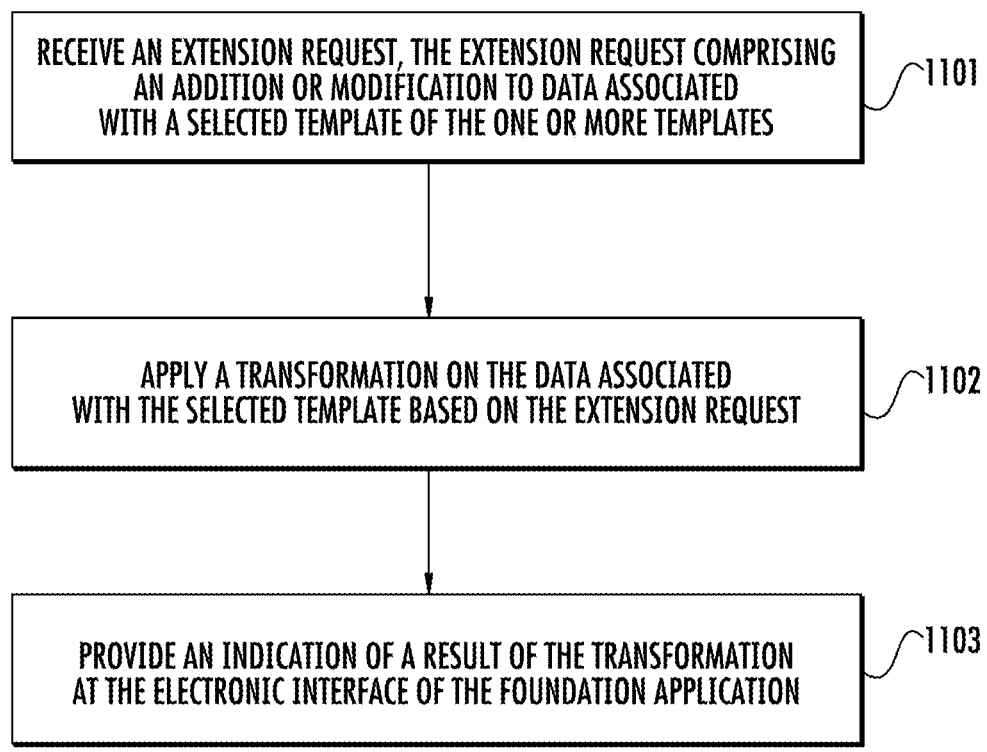
FIG. 11A illustrates a flow diagram of operations related to applying data transformation based on an extension request, in accordance with one or more embodiments described herein.
Figure 11B:
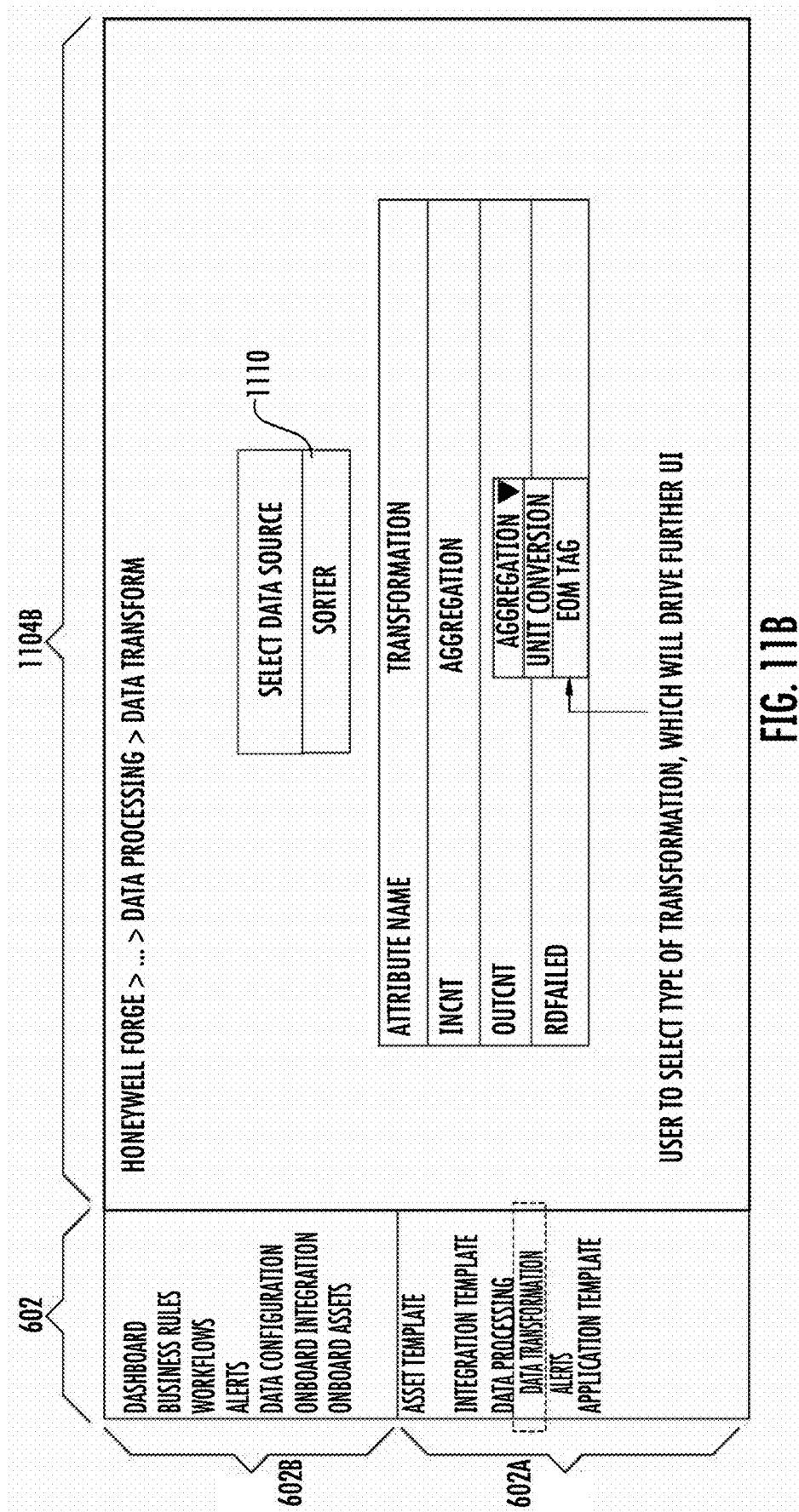
FIG. 11B illustrates an example electronic interface of an example foundation application facilitating definition of data transformation permissions, in accordance with one or more embodiments described herein.

In some embodiments, an extension request related to a transformation of data associated with one or more assets is received. In this regard, turning to FIG. 11A, block 1101 identifies (e.g., by CPU 320, communication interface 360, and/or the like), receives an extension request, the extension request comprising an addition or modification to data associated with a selected template of the one or more templates. For example, the extension request comprises data related to a transformation of data related to one or more assets. For example, FIG. 11B shows an example electronic interface providing the ability for an end user to configure enterprise-level seeded templates for data transformations. For example, in some embodiments, in response to a user selection of the "Data Transformation" option under "Data Processing" in the sidebar portion 602A, a sub-interface 1104B is rendered. In some embodiments, the sub-interface 1104B includes a data source selection box 1110, in which a user selects and/or enters a type of asset. The sub-interface 1104B further comprises a transformation table 1112 comprising a listing of attributes associated with the asset type entered into the data source selection box 1110. For example, the transformation table 1112 comprises an "Attribute Name" column and a "Transformation" column. In some embodiments, for a particular attribute, a type of transformation is selected under the "Transformation" column. Types of transformations can include, but are not limited to, an aggregation, a unit conversion, and/or an EOM tagging. In this regard, the transformation table defines the type of transformations permitted to be applied to particular attributes of an asset. For example, as shown, an aggregation is performed for an "InCnt," or a value representing an item intake count by a sorter asset. In some embodiments, more than one type of transformation may be permitted to be applied to an attribute. For example, a unit conversion may be permitted for an attribute related to a temperature reading (e.g., a conversion from Celsius to Fahrenheit).

Figure 11C:
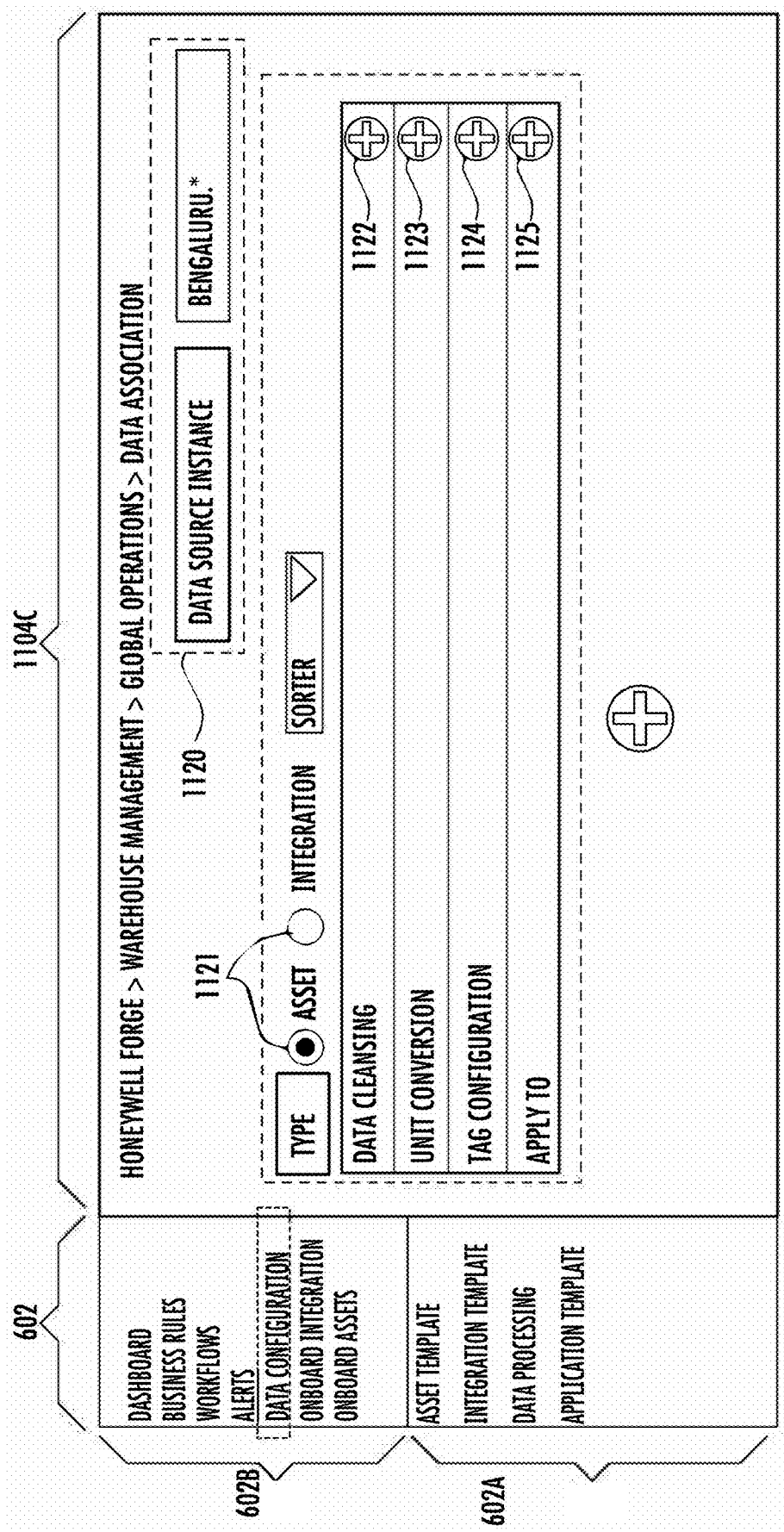
FIG. 11C illustrates an example electronic interface of an example foundation application facilitating instantiation of asset site-specific data transformations, in accordance with one or more embodiments described herein.

FIG. 11C shows an example electronic interface providing the ability for an end user at a particular asset site to configure and/or instantiate asset site-specific data transformations based on the enterprise-level permissions for data transformations. For example, in response to selection of the "Data Configuration" option on the sidebar portion 602B, a sub-interface 1104C is rendered. In some embodiments, the sub-interface 1104C includes a data source instance box 1120 into which a user enters or selects a particular data source, such as one or more assets at a particular location, asset site, and/or the like.

In some embodiments, sub-interface 1104C comprises type selection options 1121 from which the user can select "Asset" or "Integration" in order to apply transformation(s) to data associated with a particular asset or integration. As shown, instances of "sorter" assets for all asset sites in Bengaluru, India are selected. The user may then select one or more of the "Data Cleansing" option 1122, "Unit Conversion" option 1123, "Tag Configuration" option 1124, or "Apply To" option 1125 to configure one or more data transformations to a selected template associated with the sorter asset(s) and provide an extension request related to the data transformation(s). In this regard, block 1102 applies a transformation on the data associated with the selected template based on the extension request. At block 1103, an indication of a result of the transformation is provided at the electronic interface of the foundation application.

Figure 12A:
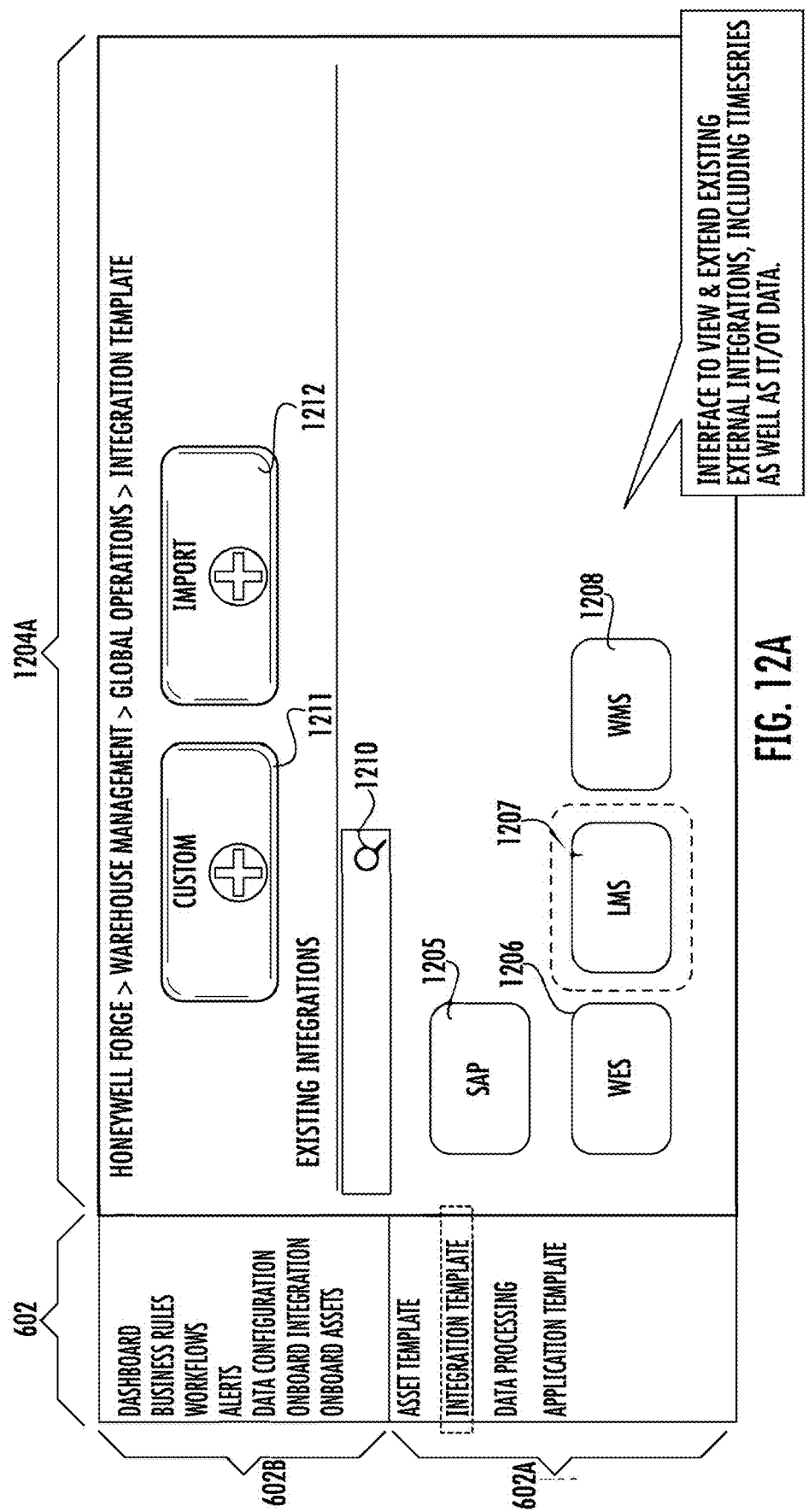
FIG. 12A illustrates an example electronic interface of an example foundation application from which an extension request related to a creation and/or modification of a template for an external integration can be generated, in accordance with one or more embodiments described herein.
Figure 12B:
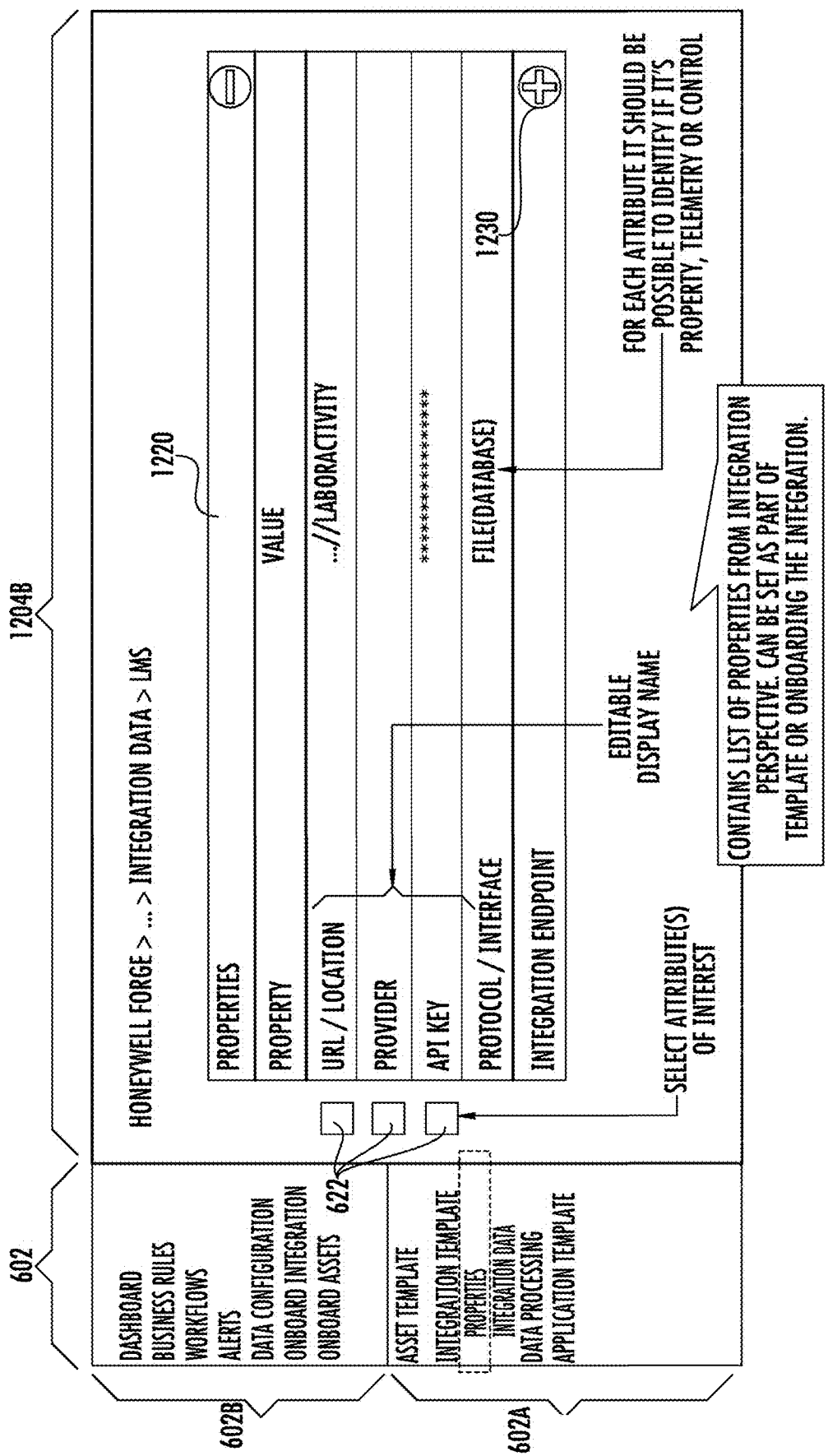
FIG. 12B illustrates an example electronic interface of an example foundation application from which an extension request related to a creation and/or modification of a template for an external integration can be generated, in accordance with one or more embodiments described herein.
Figure 12C:
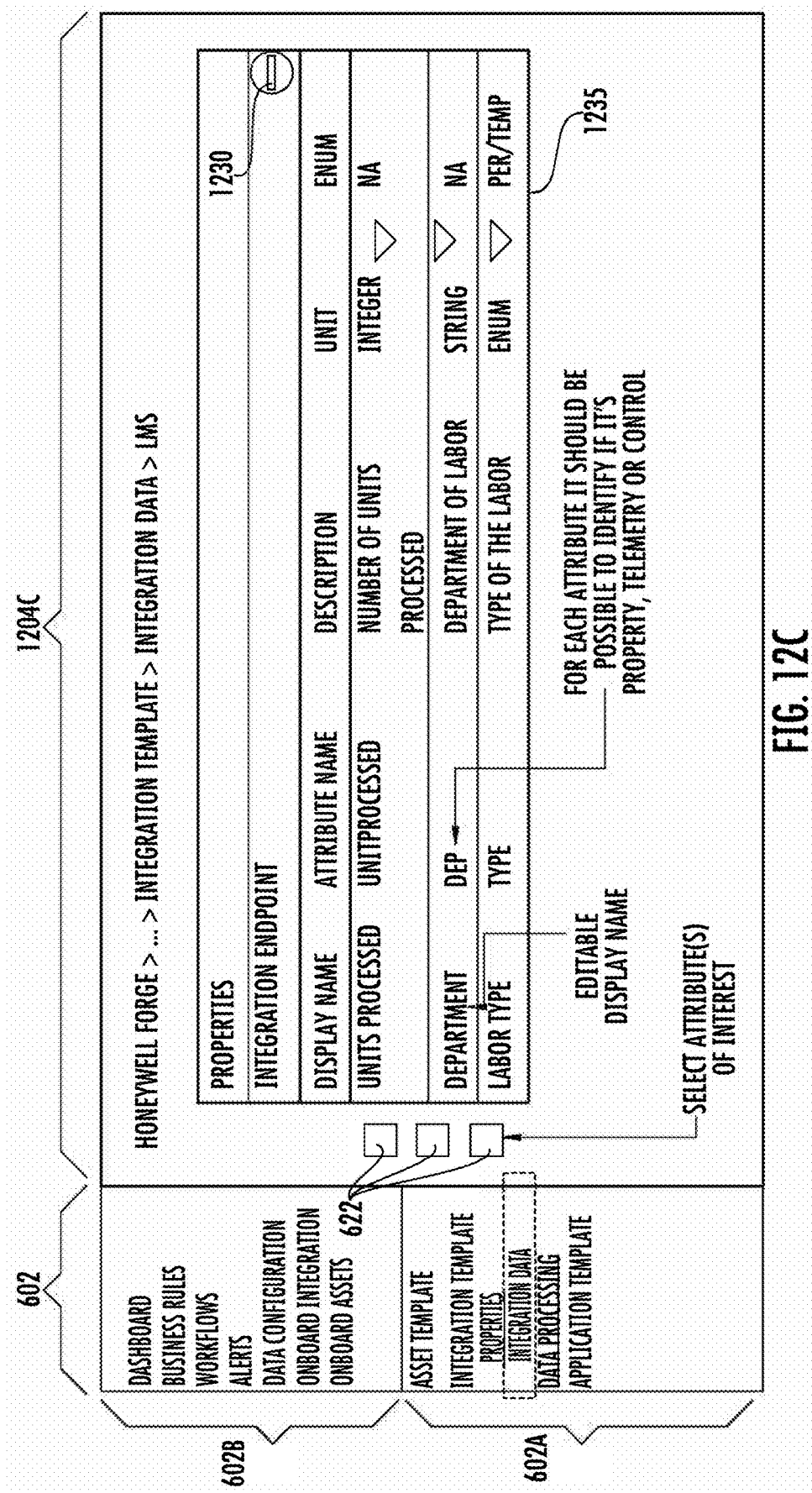
FIG. 12C illustrates an example electronic interface of an example foundation application from which an extension request related to a creation and/or modification of a template for an external integration can be generated, in accordance with one or more embodiments described herein.

In some embodiments, an extension request related to an addition or modification of an integration template is received. For example, FIG. 12A-C show example electronic interfaces providing the ability for an end user to configure enterprise-level seeded templates for integrations (e.g., external and/or third-party software integrations). For example, in some embodiments, in response to a user selection of the "Integration Template" option in the sidebar portion 602A, a sub-interface 1204A is rendered. In some embodiments, the sub-interface 1204A includes selectable seeded templates for integrations which have been previously defined and/or generated (e.g., "existing integrations"). For example, as shown, sub-interface 1204A for several example integrations including a "SAP" integration template 1205, a Warehouse Execution System ("WES") integration template 1206, a Labor Management System ("LMS") integration template 1207, and a Warehouse Management System ("WMS") integration template 1208.

As shown, the sub-interface 1204A also optionally includes a search bar 1210 to locate existing integration templates. For example, in some embodiments, the sub-interface 1204A may include a large number of existing integration templates, such that a user enters the text "sap" in the search bar and the "SAP" integration template 1205 (and/or other templates containing the term "sap") is highlighted, displayed separate from other existing integration templates, and/or otherwise indicated to the user. The sub-interface 1204A also optionally includes selectable options 1211 and 1212 for creating a custom integration template or importing a template for an integration.

In some embodiments, for example, upon selection of the "LMS" integration template 1207, another sub-interface 1204B is rendered, as shown in FIG. 12B. For example, in some embodiments, sub-interface 1204B comprises various UI elements for configuring, modifying and/or defining an integration template, such as the "LMS" integration template.

In the example sub-interface 1204B shown in FIG. 12B, properties for a particular integration are defined, as shown integration properties table 1220. In the example shown in FIG. 12B, the sub-interface 1204B provides for an end user to input, edit, and/or define one or more properties of an integration. For example, as shown, properties for an example external Labor Management System integration include a uniform resource locator(URL)/location property, a provider property, an Application Programming Interface (API) key property, and a protocol/interface property. As shown, each property may have an associated value. For example, the value of the API key property may be an API key. In some embodiments, each property is selectable and/or editable. For example, a user may edit the name of the property or the value of one or more properties. In some embodiments, multiple properties can be selected at once using selection boxes 622 on the sub-interface 1204B.

In some embodiments, for example, upon selection of the "Integration Endpoint" option 1230, a sub-interface 1204C is rendered, as shown in FIG. 12C. For example, in some embodiments, sub-interface 1204C comprises a table 1235 comprising a plurality of point roles for various attributes of the integration. For example, the LMS integration template comprises point role information for a "Units Processed" attribute (e.g., an integer representing a number of units processed), a "Department" attribute (e.g., a string value representing a department of labor), and a "Labor Type" attribute (e.g., an enumerated value representing a labor type of one of "permanent" or "temporary"). In some embodiments, each point role is selectable and/or editable. For example, a user may edit the display name, attribute name, description, unit, and/or enumerated type of one or more of the point roles. In some embodiments, multiple properties can be selected at once using selection boxes 622 on the sub-interface 1204C.

Figure 12D:
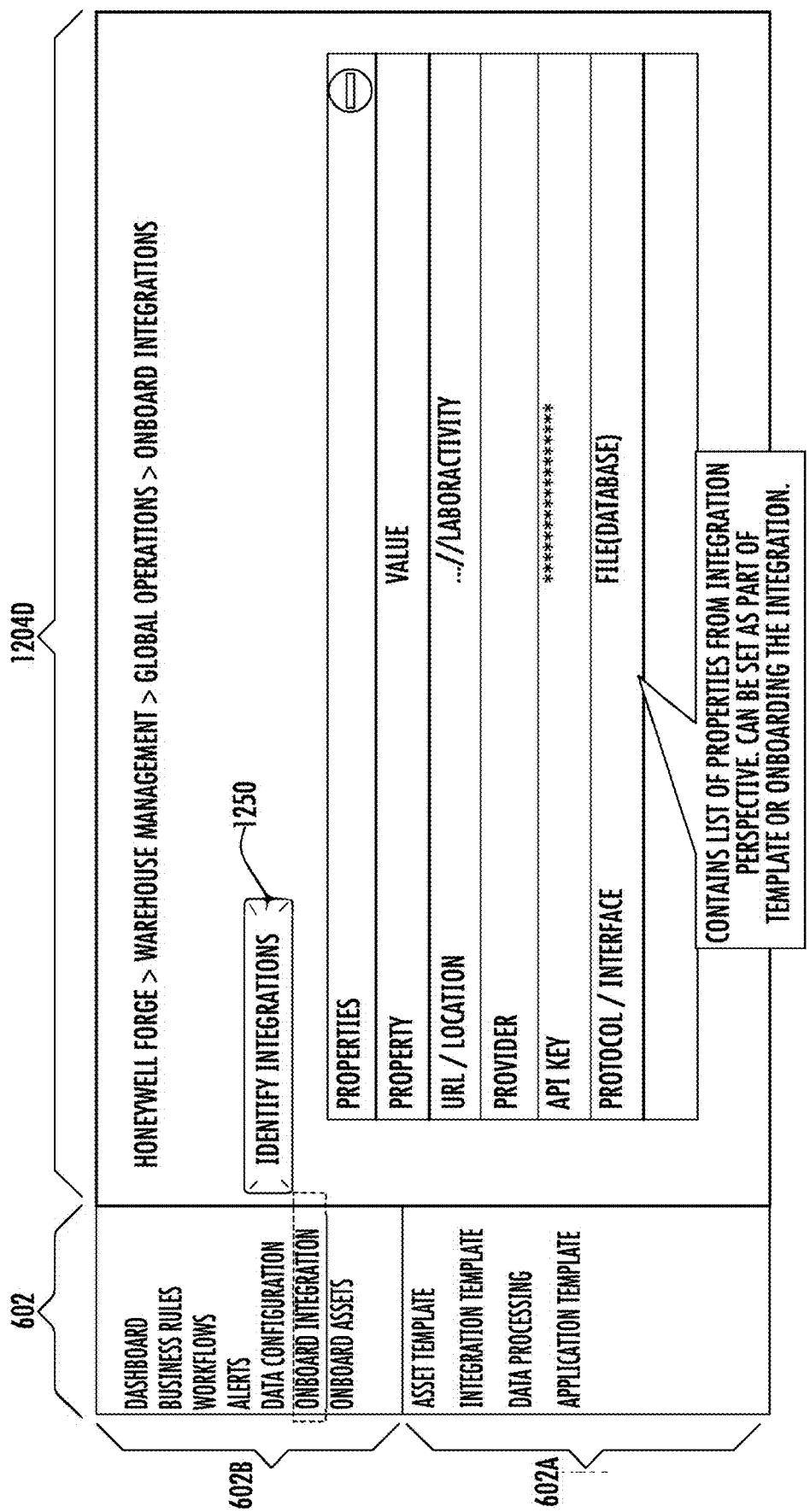
FIG. 12D illustrates an example electronic interface of an example foundation application facilitating onboarding of an external integration, in accordance with one or more embodiments described herein.

In some embodiments, an extension request related to an onboarding and/or identification of an integration is received. For example, FIG. 12D shows an example electronic interface providing the ability for an end user to identify and onboard one or more integrations and/or data related to one or more integrations for a particular asset site. In some embodiments, in response to a user selection of the "Onboard Integration" option of sidebar portion 620A, a sub-interface 1204D is rendered. As shown, sub-interface 1204D comprises an "Identify Integrations" button 1250, which, upon selection, causes identification of one or more integrations (e.g., external and/or third-party cloud software integrations) for the foundation application.

In some embodiments, a foundation application is further extendable by way of an extension request related to an addition or modification of template for a dashboard visualization and/or one or more widgets. In some embodiments, a dashboard visualization is a digital visualization that can be displayed at an electronic interface of the foundation application. In various embodiments, the dashboard visualization comprises one or more widgets, or selectable visualizations related to the predefined core services associated with the foundation application. In various embodiments, widgets of a dashboard visualization facilitate various operations associated with assets of an enterprise, such as for example, the viewing and/or monitoring of various insights related to a plurality of assets such as KPIs, data trends and/or the like, remotely controlling and/or actuating one or more assets, viewing business data such as asset portfolio performance metrics, and/or other operations.

Figure 13A:
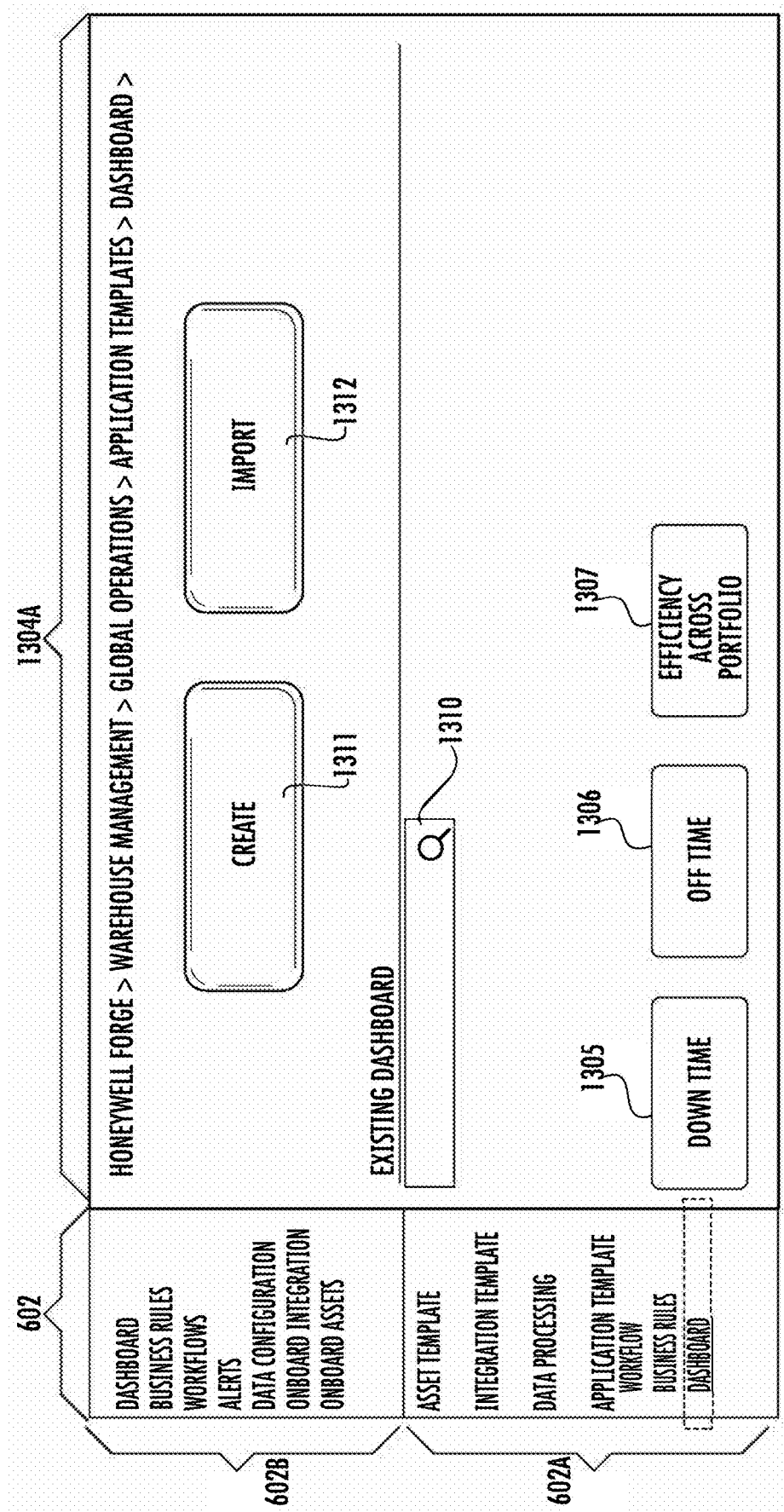
FIG. 13A illustrates an example electronic interface of an example foundation application from which an extension request related to a creation and/or modification of a template for a dashboard visualization can be generated, in accordance with one or more embodiments described herein.

In various embodiments, a domain-specific dashboard, along with domain-specific widgets, can be generated and/or extended for a foundation application. For example, FIG. 13A shows an example electronic interface of a foundation application providing the ability for an end user to configure enterprise-level seeded templates for dashboard visualizations. For example, in some embodiments, in response to a user selection of the "Dashboard" option under "Application Template" in the sidebar portion 602A, a sub-interface 1304A is rendered. In some embodiments, the sub-interface 1304A includes selectable seeded templates for dashboard visualizations which have been previously defined and/or generated (e.g., "existing dashboards"). For example, as shown, sub-interface 1304A for several dashboard visualizations including a "Down Time" dashboard template 1305, an "Off Time" dashboard template 1306, and a "Efficiency Across Portfolio" dashboard template 1307.

As shown, the sub-interface 1304A also optionally includes a search bar 1310 to locate existing dashboard templates. The sub-interface 904B also optionally includes selectable option 1311 for creating a custom dashboard template and selectable option 1312 for importing a template for a dashboard.

Figure 13B:
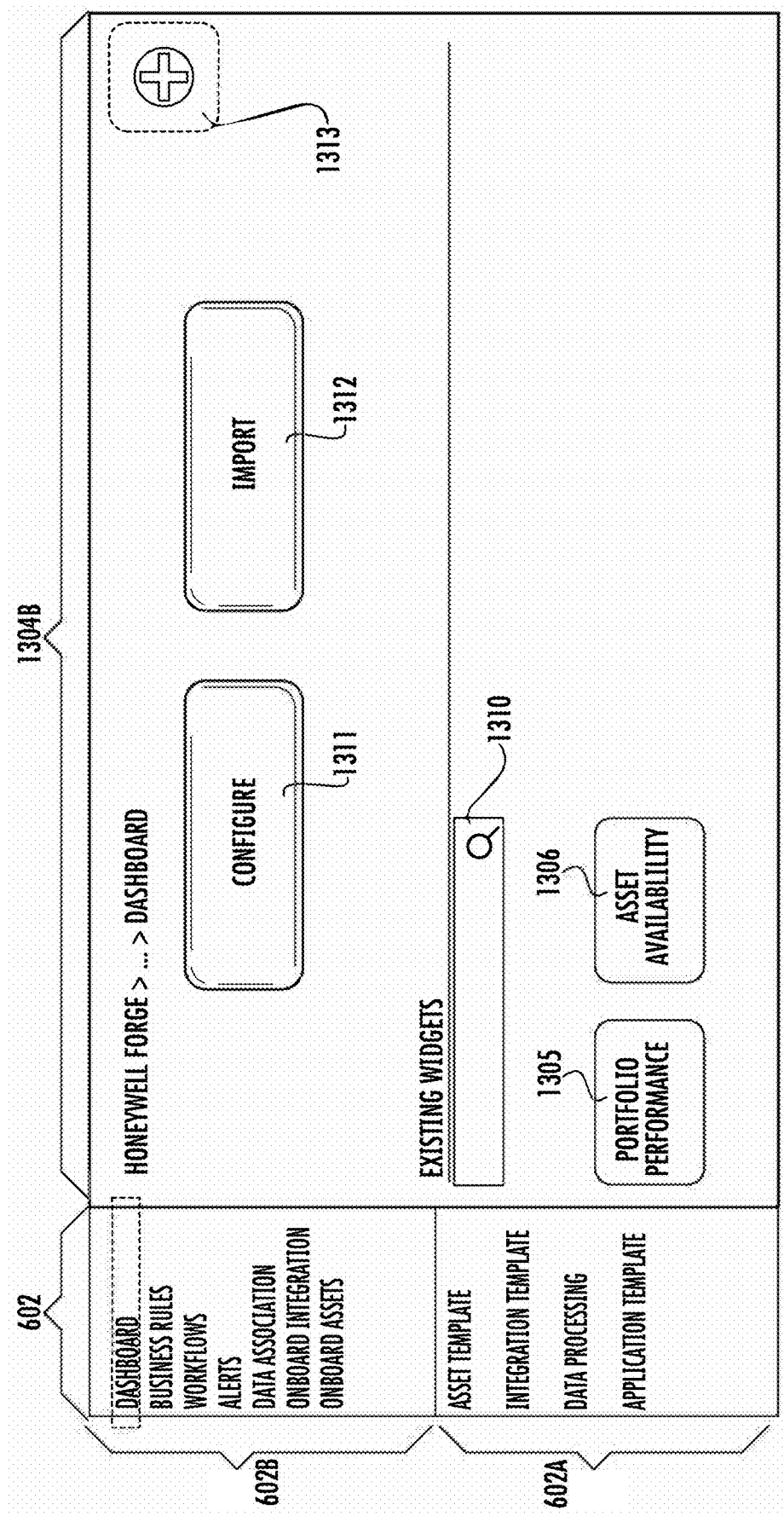
FIG. 13B illustrates an example electronic interface of an example foundation application facilitating generation of asset site-specific widget visualizations, in accordance with one or more embodiments described herein.
Figure 13C:
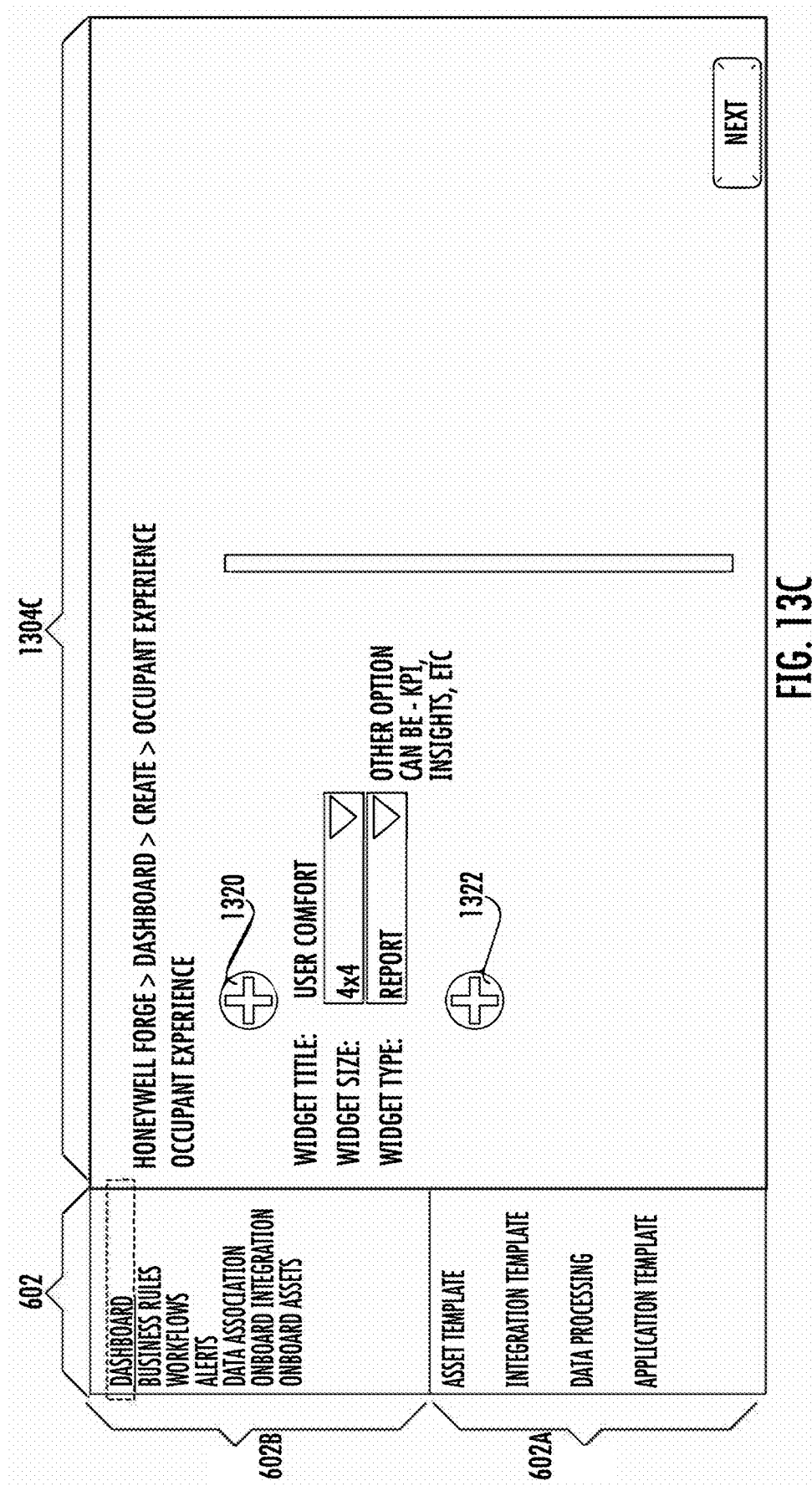
FIG. 13C illustrates an example electronic interface of an example foundation application facilitating generation of asset site-specific widget visualizations, in accordance with one or more embodiments described herein.

FIG. 13B-E show example electronic interfaces providing the ability for an end user at a particular asset site to configure and/or instantiate asset site-specific templates for widgets of a foundation application dashboard visualization based on the enterprise-level seeded templates for dashboard visualizations. For example, as shown in FIG. 13B, in response to selection of the "Dashboard" option on the sidebar portion 602A, a sub-interface 1304B is rendered. In some embodiments, the sub-interface 1304B includes selectable seeded templates for widgets which have been previously defined and/or generated (e.g., "existing widgets"). For example, as shown, sub-interface 1304B provides visibility for several widgets including a "Portfolio Performance" widget template 1305, and an "Asset Availability" widget template 1306 described above in connection with FIG. 7B.

As shown, the sub-interface 1304B also optionally includes a search bar 1310 to locate existing templates for widgets. The sub-interface 1304B also optionally includes selectable option 1313 for creating a new widget template, selectable option 1311 for configuring an existing widget template, and selectable option 1312 for importing a template for a widget.

In some embodiments, for example, upon selection of the selectable option 1313 for creating a new widget template, a sub-interface 1304C is rendered. As shown, sub-interface 1304C comprises several options for generating a new example widget template titled "User Comfort" for an "Occupant Experience" dashboard visualization. For example, a widget title, a widget size, and a widget type can be assigned to the new widget template via sub-interface 1304C. Upon selection of the "Add Widget" icon 1320, an additional new widget can be added to the "Occupant Experience" dashboard visualization. In some embodiments, upon selection of icon 1322, a sub-interface 1304D for extending the "User Comfort" widget is rendered, as shown in FIG. 3D.

As shown, sub-interface 1304D comprises additional options for configuring the "User Comfort" widget. For example, the user comfort widget is configured to visualize various temperature data for a cafeteria of a campus via a graph visualization 1330. For example, a user may add and/or modify data related to the graph visualization by adding labels and data sources associated with the labels. For example, as shown, the data related to "outdoor temp" on the graph visualization 1330 is generated based on data source 1335, a current temperature from a Weather.com external integration. Similarly, data related to "indoor humidity" on the graph visualization 1330 is generated based on data source 1336, a real-time current humidity data point from a stored point role for the cafeteria. In various embodiments, other data sources may be used to add or extend the widget, for example, data associated with assets, external integrations, alerts, events, insights, output of one or more machine learning models, and/or the like.

Figure 13D:
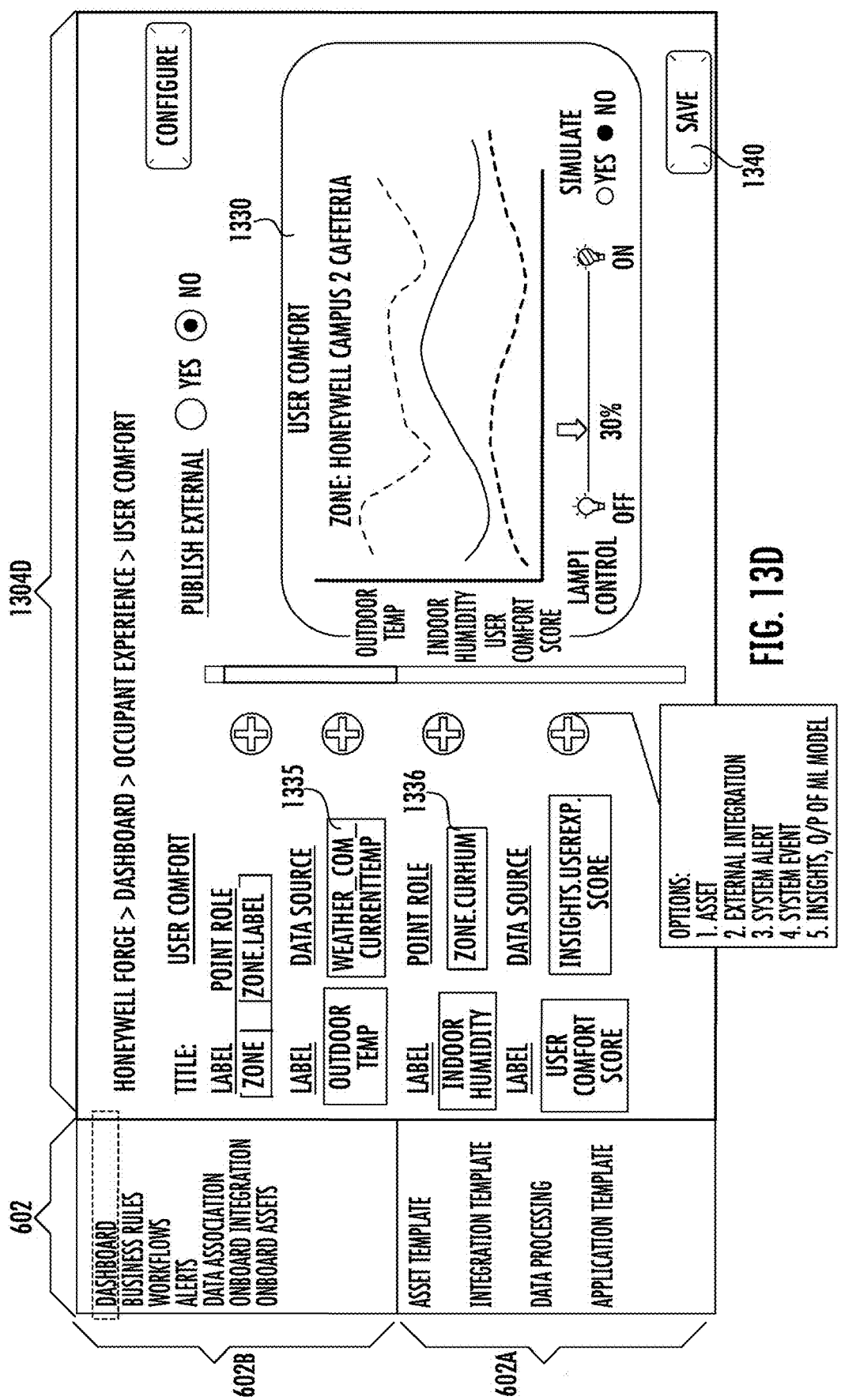
FIG. 13D illustrates an example electronic interface of an example foundation application facilitating generation of asset site-specific widget visualizations, in accordance with one or more embodiments described herein.
Figure 13E:
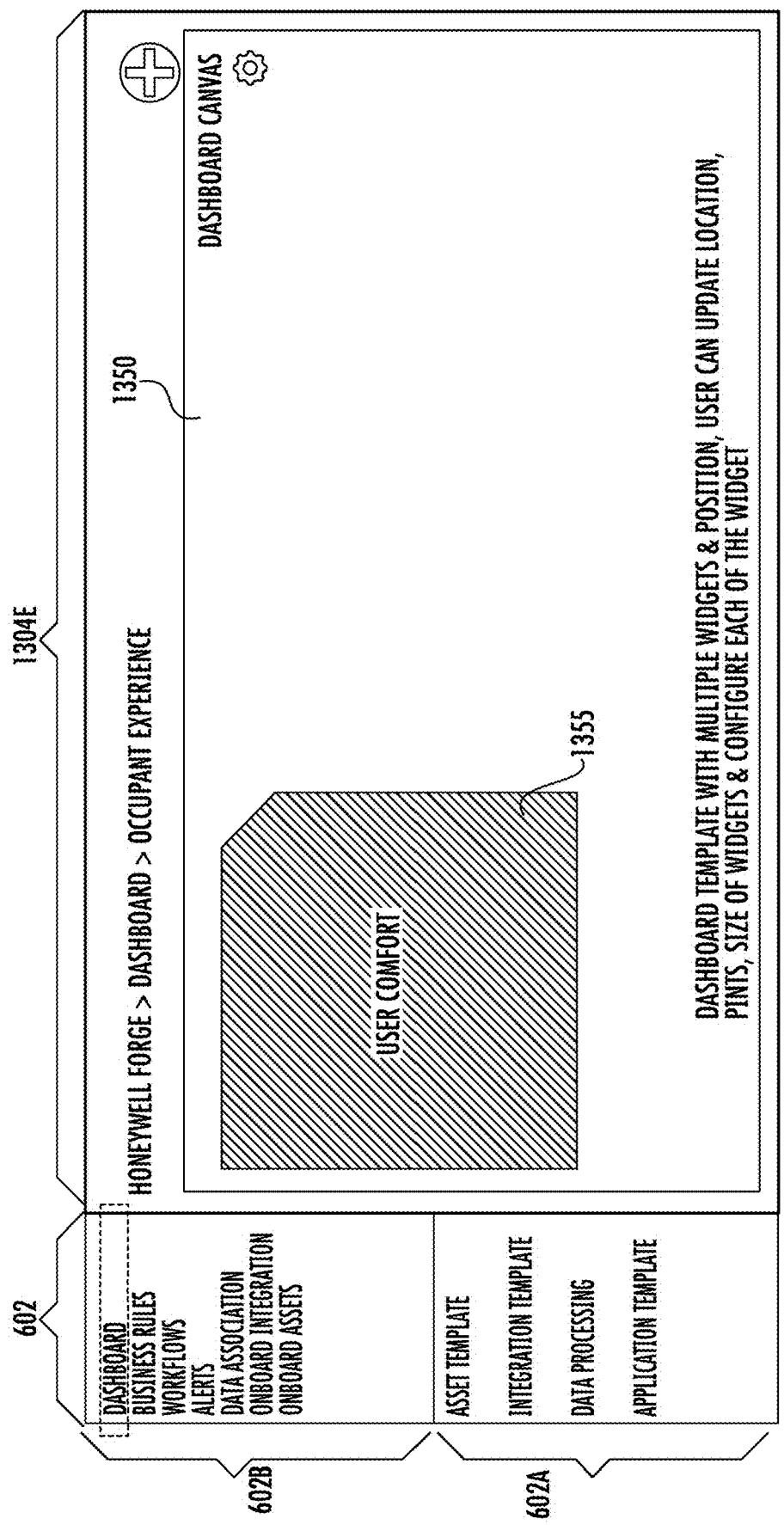
FIG. 13E illustrates an example electronic interface of an example foundation application facilitating a dashboard canvas tool, in accordance with one or more embodiments described herein.

In some embodiments, upon selection of the "save" icon 1340 on sub-interface 1304D, another sub-interface 1304E is rendered at the electronic interface of the foundation application, as shown in FIG. 13E. As shown, sub-interface 1304E provides a dashboard canvas tool 1350. The dashboard canvas tool 1350 facilitates the organization of widgets on the dashboard visualization in a drag-and-drop manner. For example, indications of one or more widgets for the dashboard visualization are presented on the dashboard canvas 1350. As shown, an indication of the user comfort widget 1355 generated above in connection with FIG. 13D is shown. In various embodiments, the widget 1355 are movable, selectable, and resizable. For example, a user may position the widget 1355 in various positions on the dashboard canvas by dragging the widget, resize the widget 1355 by dragging one or more sides of the widget 1355, and/or select the widget to return to sub-interface 1304D in order to further extend the widget 1355.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms "first," "second," etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not, the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A method comprising:
   generating a foundation application on a computing platform comprising an Internet of Things (IoT) platform, the foundation application facilitating a dashboard visualization, comprising a plurality of predefined core services, the predefined core services managing a plurality of assets in real-time, the predefined core services comprising one or more templates associated with at least one asset of the plurality of assets, wherein the one or more templates comprise pre-configured asset properties and one or more operational parameters defining real-time operational behavior of the at least one asset;
   integrating the foundation application with a rules engine, wherein the rules engine comprises a plurality of preexisting workflows for the foundation application, each preexisting workflow defining a sequence of automated actions for asset management;
   receiving, via an electronic interface of the foundation application, an extension request from a user, the extension request comprising an addition or modification to data associated with a selected template of the one or more templates;
   in response to the extension request, determining output data based on the addition or the modification to the data associated with the selected template, wherein the output data comprises one or more actions executed based on the extension request, wherein at least one action corresponds to determination of performance metrics for the plurality of assets, and wherein the output data varies based on the extension request, wherein determining of the output data further comprises:
      identifying, using the rules engine, based on at least one or more user inputs, asset metadata, and operational parameters, a preexisting workflow from a the plurality of preexisting workflows for the foundation application based at least in part on the extension request, wherein the preexisting workflow for the foundation application comprises a series of events to be executed that is associated with a first asset of the plurality of assets and real-time data associated with the first asset;

receiving from the user, configuration parameters associated with a second asset of the plurality of assets, wherein the configuration parameters comprise a simulation of the second asset, asset properties associated with the second asset, and one or more input capabilities for the foundation application;

generating, via the rules engine, a customized workflow associated with the second asset of the plurality of assets based at least in part on the configuration parameters and the preexisting workflow, wherein the customized workflow dynamically adapts the sequence of automated actions based on the real-time data associated with the second asset;

determining whether criteria associated with the customized workflow meets a predefined condition based on the real-time data; and in an instance in which the criteria meets the predefined condition, causing actuation of the second asset of the plurality of assets or a data transformation associated with the second asset of the plurality of assets based on the customized workflow, wherein the actuation adjusts an operational state of the second asset in real-time; and providing a dashboard visualization at the electronic interface of the foundation application, the visualization comprising an indication of the output data and the performance metrics in real-time.

2. The method of claim 1, the visualization comprising a plurality of widgets, each widget associated with one or more predefined core services of the plurality of the predefined core services.

3. The method of claim 2, one or more widgets of the plurality of widgets comprising an indication of real-time data associated with one or more assets.

4. The method of claim 2, at least one widget of the plurality of widgets being selectable.

5. The method of claim 4, the providing of the visualization comprising providing a first view associated with the plurality of assets, and in response to a selection of the at least one widget, providing a second view comprising performance data associated with a subset of the plurality of assets associated with an asset site.

6. The method of claim 5, wherein the performance data comprises one or more key performance indicators (KPI) associated with the asset site.

7. The method of claim 1, wherein the extension request comprises an indication of an onboarding of an asset, the determining of the output data comprising:

in response to the extension request, identifying real-time data associated with the asset; and providing an indication of the real-time data at the electronic interface of the foundation application.

8. The method of claim 7, the determining of the output data comprising:

generating at least one asset template for the asset, the at least one asset template defining one or more properties and one or more point roles for the asset.

9. The method of claim 1, the determining of the output data further comprising:

generating, based on the extension request, at least one rule associated with one or more assets of the plurality of assets for the foundation application.

10. The method of claim 9, the extension request defining parameters of the at least one rule, the parameters based on inputs received at the electronic interface of the foundation application.

11. The method of claim 9, the determining of the output data comprising:

determining whether a condition associated with the at least one rule is met based on real- time data associated with the one or more assets; and in an instance in which the condition associated with the at least one rule is determined to be met:

executing at least one predefined action associated with the at least one rule.

12. The method of claim 11, the executing of the at least one predefined action comprising causing actuation of one or more assets of the plurality of assets.

13. The method of claim 1, the determining of the output data comprising:

generating, based on the extension request, at least one alert associated with one or more assets of the plurality of assets for the foundation application, the at least one alert defining at least one data trend.

14. The method of claim 13, the determining of the output data further comprising:

accessing real-time data associated with the one or more assets of the plurality of assets;

identifying an instance of the at least one data trend based on the real-time data; and causing transmission of a notification indicative of the at least one data trend.

15. The method of claim 1, the determining of the output data comprising:

applying a transformation on the data associated with the selected template based on the extension request, the visualization comprising an indication of a result of the transformation.

16. The method of claim 1, the extension request being received in response to an input to the electronic interface of the foundation application.

17. The method of claim 1, the predefined core services further managing one or more processes of a domain associated with the foundation application.

18. A system, comprising:

at least one processor; and at least one memory that stores executable instructions that, when executed by the at least one processor, cause the at least one processor:

generate a foundation application on a computing platform comprising an Internet of Things (IOT) platform, the foundation application facilitating a dashboard visualization comprising a plurality of predefined core services, the predefined core services managing a plurality of assets, the predefined core services comprising one or more templates associated with at least one asset of the plurality of assets, wherein the one or more templates comprise pre-configured asset properties and one or more operational parameters defining real-time operational behavior of the at least one asset;

integrate the foundation application with a rules engine, wherein the rules engine comprises a plurality of preexisting workflows for the foundation application, each preexisting workflow defining a sequence of automated actions for asset management;

receive, via an electronic interface of the foundation application, an extension request from a user, the extension request comprising an addition or modification to data associated with a selected template of the one or more templates;

in response to the extension request, determine output data based on the addition or the modification to the data associated with the selected template, wherein the output data comprises one or more actions executed based on the extension request, wherein at least one action corresponds to determination of performance metrics for the plurality of assets, and wherein the output data varies based on the extension request, wherein determining of the output data further comprises:
  identifying, using the rules engine, based on at least one or more user inputs, asset metadata, and operational parameters, a preexisting workflow from a the plurality of preexisting workflows for the foundation application based at least in part on the extension request, wherein the preexisting workflow for the foundation application comprises a series of events to be executed that is associated with a first asset of the plurality of assets and real-time data associated with the first asset;
  receiving from the user, configuration parameters associated with a second asset of the plurality of assets, wherein the configuration parameters comprise simulation of the second asset, asset properties associated with the second asset, and one or more input capabilities for the foundation application;
  generating, via the rules engine, a customized workflow associated with the second asset of the plurality of assets based at least in part on the configuration parameters and the preexisting workflow, wherein the customized workflow dynamically adapts the sequence of automated actions based on the real-time data associated with the second asset;
  determining whether criteria associated with the customized workflow meets a predefined condition based on the real-time data; and
in an instance in which the criteria meets the redefined condition causing actuation of the second asset of the plurality of assets or a data transformation associated with the second asset of the plurality of assets based on the customized workflow, wherein the actuation adjusts an operational state of the second asset in real-time; and
provide a dashboard visualization at the electronic interface of the foundation application, the visualization comprising an indication of the output data and the performance metrics in real-time.

19. A non-transitory computer-readable storage medium comprising one or more programs for execution by one or more processors, the one or more programs including instructions which, when executed by the one or more processors, configure the one or more processors for:
  generating a foundation application on a computing platform comprising an Internet of Things (IOT) platform, the foundation application facilitating a dashboard visualization, comprising a plurality of predefined core services, the predefined core services managing a plurality of assets in real-time, the predefined core services comprising one or more templates associated with at least one asset of the plurality of assets, wherein the one or more templates comprise pre-configured asset properties and one or more operational parameters defining real-time operational behavior of the at least one asset;
  integrating the foundation application with a rules engine, wherein the rules engine comprises a plurality of preexisting workflows for the foundation application, each preexisting workflow defining a sequence of automated actions for asset management;
  receiving, via an electronic interface of the foundation application, an extension request from a user, the extension request comprising an addition or modification to data associated with a selected template of the one or more templates;
  in response to the extension request, determining output data based on the addition or the modification to the data associated with the selected template, wherein the output data comprises one or more actions executed based on the extension request, wherein at least one action corresponds to determination of performance metrics for the plurality of assets, and wherein the output data varies based on the extension request, wherein determining of the output data further comprises:
    identifying, using the rules engine, based on at least one or more user inputs, asset metadata, and operational parameters, a preexisting workflow from a the plurality of preexisting workflows for the foundation application based at least in part on the extension request, wherein the preexisting workflow for the foundation application comprises a series of events to be executed that is associated with a first asset of the plurality of assets and real-time data associated with the first asset;
    receiving from the user, configuration parameters associated with a second asset of the plurality of assets, wherein the configuration parameters comprise a simulation of the second asset, asset properties associated with the second asset, and one or more input capabilities for the foundation application;
    generating, via the rules engine, a customized workflow associated with the second asset of the plurality of assets based at least in part on the configuration parameters and the preexisting workflow, wherein the customized workflow dynamically adapts the sequence of automated actions based on the real-time data associated with the second asset;
    determining whether criteria associated with the customized workflow meets a predefined condition based on the real-time data; and
    in an instance in which the criteria meets the predefined condition, causing actuation of the second asset of the plurality of assets or a data transformation associated with the second asset of the plurality of assets based on the customized workflow, wherein the actuation adjusts an operational state of the second asset in real-time; and
  providing a dashboard visualization at the electronic interface of the foundation application, the visualization comprising an indication of the output data and the performance metrics in real-time.

\* \* \* \* \*